(12) United States Patent
Savian

(10) Patent No.: US 10,336,454 B2
(45) Date of Patent: Jul. 2, 2019

(54) PIVOT BIN BUCKET WITH SLOT FOR RECEIVING PIVOT AXLE

(71) Applicant: C&D ZODIAC, INC., Huntington Beach, CA (US)

(72) Inventor: Scott Savian, Huntington Beach, CA (US)

(73) Assignee: C&D ZODIAC, INC., Huntington Beach, CA (US)

( * ) Notice: Subject to any disclaimer, the term of this patent is extended or adjusted under 35 U.S.C. 154(b) by 0 days.

(21) Appl. No.: 15/727,479

(22) Filed: Oct. 6, 2017

(65) Prior Publication Data

US 2018/0029709 A1 Feb. 1, 2018

Related U.S. Application Data

(63) Continuation of application No. 14/796,829, filed on Jul. 10, 2015, now Pat. No. 10,029,794.

(60) Provisional application No. 62/022,801, filed on Jul. 10, 2014.

(51) Int. Cl.
*B64D 11/00* (2006.01)
*B60Q 3/43* (2017.01)

(52) U.S. Cl.
CPC ............. *B64D 11/003* (2013.01); *B60Q 3/43* (2017.02); *B64D 11/0015* (2013.01); *B64D 2011/0038* (2013.01); *B64D 2011/0046* (2013.01); *B64D 2011/0053* (2013.01); *Y02T 50/46* (2013.01); *Y10T 16/5448* (2015.01)

(58) Field of Classification Search
CPC ...... B65D 5/547; B65D 11/18; B65D 11/182; B65D 11/1806; B65D 2519/00601; B65D 2251/1033; B64D 11/003; Y10T 16/544; Y10T 16/5448

USPC .......... 220/263, 480, 481, 482, 676; 16/263
See application file for complete search history.

(56) References Cited

U.S. PATENT DOCUMENTS 2,747,388 A * 5/1956 Dolar ...................... A47J 47/02
217/57
2,754,991 A * 7/1956 Hagerty ................. B61D 35/00
220/481

(Continued)

FOREIGN PATENT DOCUMENTS

CA 2377749 9/2003
CH 202010000528 7/2010

(Continued)

OTHER PUBLICATIONS

EP15818886 Extended European Search Report dated Dec. 11, 2017.

(Continued)

*Primary Examiner* — Medhat Badawi
*Assistant Examiner* — Christopher D Hutchens
(74) *Attorney, Agent, or Firm* — Jeffer Mangels; Butler & Mitchell LLP; Brennan C. Swain, Esq.

(57) ABSTRACT

A bucket for use with an aircraft storage bin that includes a bottom and first and second opposing side walls extending upwardly from the bottom. The first and second side walls each include a top edge. The first side wall includes a first slot that is open to the top edge of the first side wall and is configured to receive a first pivot axle therein, and the second side wall includes a second slot that is open to the top edge of the second side wall and is configured to receive a second pivot axle therein.

12 Claims, 43 Drawing Sheets

(56) References Cited

U.S. PATENT DOCUMENTS

| | | | |
|---|---|---|---|
| 2,765,949 A * | 10/1956 | Hillman | E05D 1/06 16/257 |
| 2,887,802 A | 5/1959 | Burmeister | |
| 3,086,676 A * | 4/1963 | Dilatush | B65D 43/164 220/833 |
| 3,437,374 A | 4/1969 | Bennett | |
| 4,209,114 A * | 6/1980 | Wilson | B65D 47/305 222/536 |
| 4,368,937 A | 1/1983 | Palombo | |
| 4,597,599 A | 7/1986 | Bisbing | |
| 4,637,642 A | 1/1987 | Stoecker | |
| 4,917,747 A | 4/1990 | Chin et al. | |
| 5,108,048 A | 4/1992 | Chang | |
| 5,129,597 A | 7/1992 | Manthey | |
| 5,284,268 A * | 2/1994 | Marsan | B65F 1/006 220/23.83 |
| 5,383,628 A | 1/1995 | Harriehausen | |
| 5,407,261 A | 4/1995 | Mercer | |
| 5,456,529 A | 10/1995 | Cheung | |
| 5,460,252 A | 10/1995 | Kosugi | |
| 5,567,028 A | 10/1996 | Lutovsky et al. | |
| 5,576,929 A | 11/1996 | Uchiyama | |
| 5,651,733 A | 7/1997 | Schumacher | |
| 5,688,004 A | 11/1997 | Karge | |
| 5,709,460 A | 1/1998 | Lester | |
| 5,823,472 A | 10/1998 | Luria | |
| 5,842,668 A | 12/1998 | Spencer | |
| 5,934,615 A | 8/1999 | Treichler et al. | |
| 6,045,204 A | 4/2000 | Frazier et al. | |
| 6,062,416 A | 5/2000 | Smillie | |
| 6,209,941 B1 | 4/2001 | Cross | |
| 6,315,436 B1 | 11/2001 | Schenk et al. | |
| 6,338,517 B1 | 1/2002 | Canni | |
| 6,350,048 B1 | 2/2002 | Stanton | |
| 6,357,842 B1 | 3/2002 | Nott | |
| 6,398,163 B1 | 6/2002 | Welch | |
| 6,402,354 B1 | 6/2002 | Tatewaki | |
| 6,411,525 B1 | 6/2002 | Zeiss | |
| 6,494,404 B1 | 12/2002 | Meyer | |
| 6,513,195 B2 * | 2/2003 | Haase | A61G 11/00 16/266 |
| 6,550,878 B2 | 4/2003 | Nott et al. | |
| 6,574,835 B2 | 6/2003 | Melhuish | |
| 6,634,061 B1 | 10/2003 | Maynard | |
| 6,886,781 B2 | 5/2005 | Lau | |
| 7,090,314 B2 | 8/2006 | Burrows et al. | |
| 7,246,771 B2 | 7/2007 | Wisch | |
| 7,258,406 B2 | 8/2007 | Stephan et al. | |
| 7,302,150 B2 | 11/2007 | Druckman et al. | |
| 7,422,352 B2 | 9/2008 | Sakakibara | |
| 7,601,004 B2 | 10/2009 | Lamoree et al. | |
| 7,823,830 B2 | 11/2010 | Feldkirchner et al. | |
| 7,896,530 B2 | 3/2011 | Budinger | |
| 7,966,696 B2 | 6/2011 | Krammer | |
| 7,992,928 B2 | 8/2011 | Kimisuka | |
| 8,011,618 B2 | 9/2011 | Bock | |
| 8,016,231 B2 | 9/2011 | Hillen et al. | |
| 8,136,897 B2 | 3/2012 | Mascari | |
| 8,146,227 B2 | 4/2012 | Schmitz et al. | |
| 8,262,022 B2 | 9/2012 | Young et al. | |
| 8,556,118 B2 | 10/2013 | Hamaguchi | |
| 8,651,548 B2 | 2/2014 | Shirase | |
| 8,770,515 B1 | 7/2014 | Cloud | |
| 8,783,609 B2 | 7/2014 | Schneider | |
| 9,174,734 B2 | 11/2015 | Savian | |
| 9,296,479 B1 | 3/2016 | Eakins | |
| 2003/0046792 A1 | 3/2003 | Thorn et al. | |
| 2003/0230958 A1 | 12/2003 | Katori | |
| 2004/0245897 A1 | 12/2004 | Stephan et al. | |
| 2006/0151668 A1 * | 7/2006 | Scown | B64D 11/003 244/118.1 |
| 2006/0175368 A1 | 8/2006 | Fallis | |
| 2006/0207471 A1 | 9/2006 | Todori et al. | |
| 2006/0214055 A1 | 9/2006 | Novak et al. | |
| 2007/0053188 A1 | 3/2007 | New et al. | |
| 2007/0095981 A1 | 5/2007 | Bock | |
| 2008/0073462 A1 | 3/2008 | Wolf | |
| 2008/0078871 A1 | 4/2008 | Munson | |
| 2008/0112754 A1 | 5/2008 | Schmitz | |
| 2008/0122331 A1 | 5/2008 | Haeberle | |
| 2009/0300884 A1 | 12/2009 | Morgan et al. | |
| 2010/0206985 A1 | 8/2010 | Rahlff | |
| 2010/0288879 A1 | 11/2010 | Bock | |
| 2011/0139929 A1 | 6/2011 | Young | |
| 2011/0163697 A1 | 7/2011 | Mizukami | |
| 2011/0240796 A1 | 10/2011 | Schneider | |
| 2011/0253837 A1 | 10/2011 | Lee et al. | |
| 2012/0012707 A1 | 1/2012 | Schliwa | |
| 2012/0038254 A1 * | 2/2012 | Rafler | B61D 37/003 312/242 |
| 2012/0074258 A1 | 3/2012 | Papke | |
| 2012/0228426 A1 | 9/2012 | Schneider et al. | |
| 2012/0248790 A1 | 10/2012 | Costabel | |
| 2012/0273615 A1 | 11/2012 | Rafler | |
| 2013/0076216 A1 | 3/2013 | Schmitz | |
| 2013/0119200 A1 | 5/2013 | Graf et al. | |
| 2013/0206903 A1 * | 8/2013 | Savian | B64D 11/0015 244/118.1 |
| 2013/0207529 A1 | 8/2013 | Kearsey et al. | |
| 2013/0209221 A1 | 8/2013 | Kearsey et al. | |
| 2013/0233971 A1 | 9/2013 | Burrows | |
| 2014/0009950 A1 | 1/2014 | Savian | |
| 2014/0197721 A1 | 7/2014 | Savian et al. | |
| 2014/0246968 A1 * | 9/2014 | Geng | B64D 11/003 312/319.2 |
| 2014/0332618 A1 | 11/2014 | McNicholas | |
| 2015/0329207 A1 * | 11/2015 | Funk | B64D 11/003 244/118.1 |

FOREIGN PATENT DOCUMENTS

| | | |
|---|---|---|
| CN | 101296845 | 10/2008 |
| DE | 202010000528 U1 | 7/2010 |
| EP | 0718189 | 6/1996 |
| EP | 1299020 | 12/2005 |
| EP | 1927711 A2 | 6/2008 |
| EP | 2336025 | 6/2011 |
| GB | 2437620 | 10/2007 |
| WO | 2013123070 | 8/2013 |
| WO | 2013133924 | 9/2013 |

OTHER PUBLICATIONS

Supplementary Search Report issued in EP Patent Appl. 15855175.4.
PCT/US2014/016313 International Search Report & Written Opinion dated May 30, 2014.
PCT/US2013/025962 International Search Report & Written Opinion dated Apr. 19, 2013.
PCT/US2015/057655 International Search Report & Written Opinion dated Jan. 20, 2016.
EP13749848.1 Extended European Search Report dated Oct. 14, 2015.
EP15880616 Search Report dated Sep. 28, 2018.
CN201580074889 Office Action dated Oct. 22, 2018.
CN201580037191 Office Action dated Jul. 20, 2018.

* cited by examiner

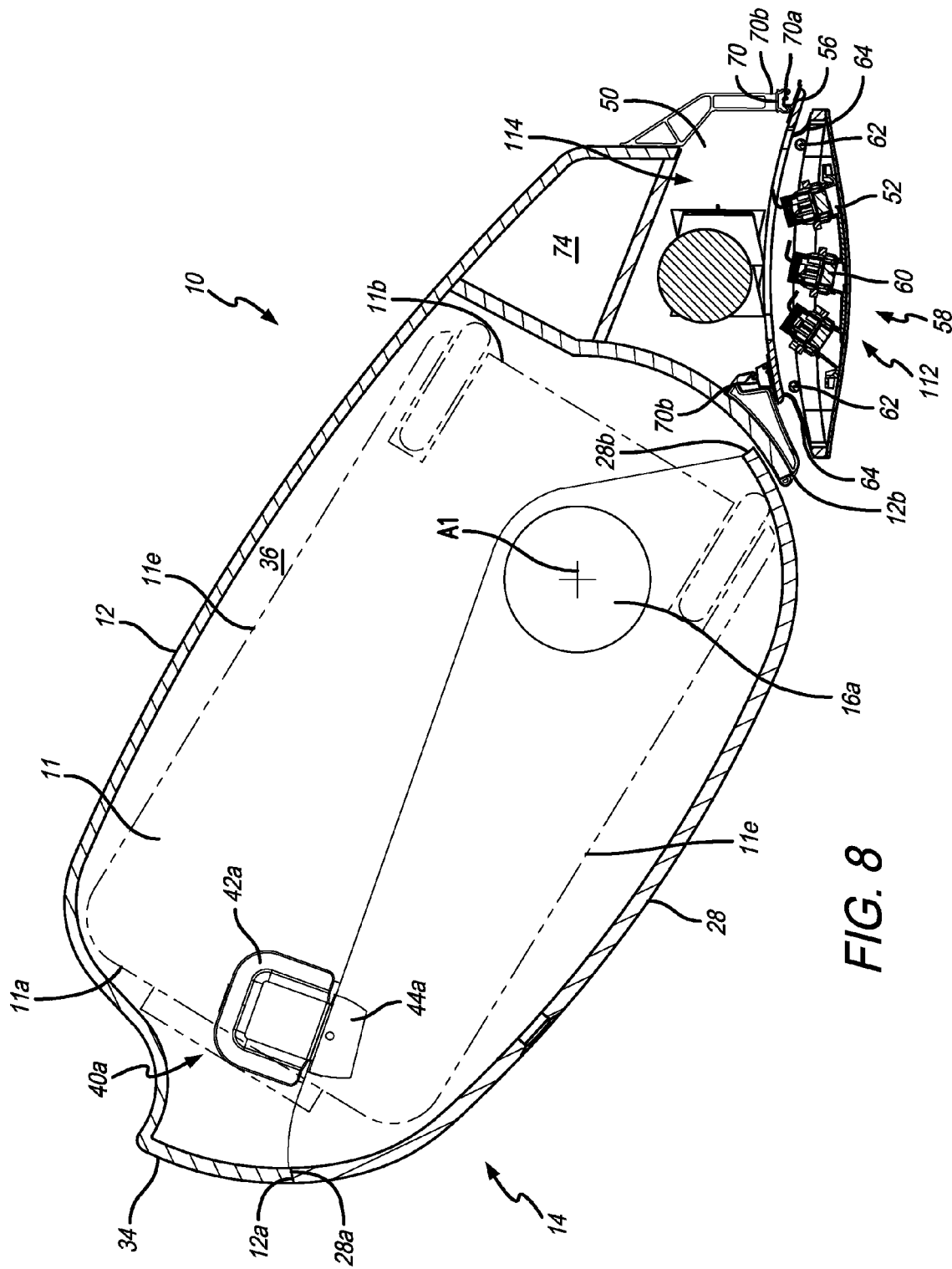

PIVOT BIN BUCKET WITH SLOT FOR RECEIVING PIVOT AXLE

CROSS REFERENCE TO RELATED APPLICATIONS

This application is a continuation of U.S. patent application Ser. No. 14/796,829, filed Jul. 10, 2015, which claims the benefit of U.S. Provisional Application No. 62/022,801, filed Jul. 10, 2014, the entireties of which are incorporated by reference herein.

FIELD OF THE INVENTION

The present invention relates generally to overhead storage bin assemblies, and more particularly to an overhead storage bin assembly that includes a pivot bin having a bucket that pivots outboard.

BACKGROUND OF THE INVENTION

Commercial aircraft, such as the Airbus A320 or Boeing 737 are typically constructed from modular components, the size, weight and construction of which are dictated by many considerations, including fuselage dimensions, aesthetic and safety considerations. Many of these requirements are imposed by law or regulation. Aircraft components, such as overhead stowage compartments, seats, lavatories, galleys, lighting systems, etc. are all required to function within strictly confined spaces.

Manufacturers of aircraft are constantly refining interior aircraft designs to achieve more comfort and utility for passengers and crew within carrier-imposed restraints on cost, weight, maintenance down-time, and safety. Commercial passenger aircraft generally include overhead luggage storage bins mounted from the ceiling, walls or other structural portion of the aircraft over the passenger seats. These bins are designed to accommodate the size, shape, and weight of passenger carry-on luggage.

Other overhead storage bin assemblies are well known in the art. For example, see U.S. Patent Publication No. 2011/0253837 published Oct. 20, 2011, U.S. Pat. No. 4,637,642 issued on Jan. 20, 1987 and U.S. Pat. No. 5,567,028 issued on Oct. 22, 1996, the entireties of which are hereby incorporated by reference.

BRIEF DESCRIPTION OF THE DRAWINGS

FIG. 8 is a cross-sectional view of one of the pivot bin assemblies of FIG. 1 and showing how a standard piece of luggage fits therein;

Like numerals refer to like parts throughout the several views of the drawings.

SUMMARY OF THE PREFERRED EMBODIMENTS

Figure 1:
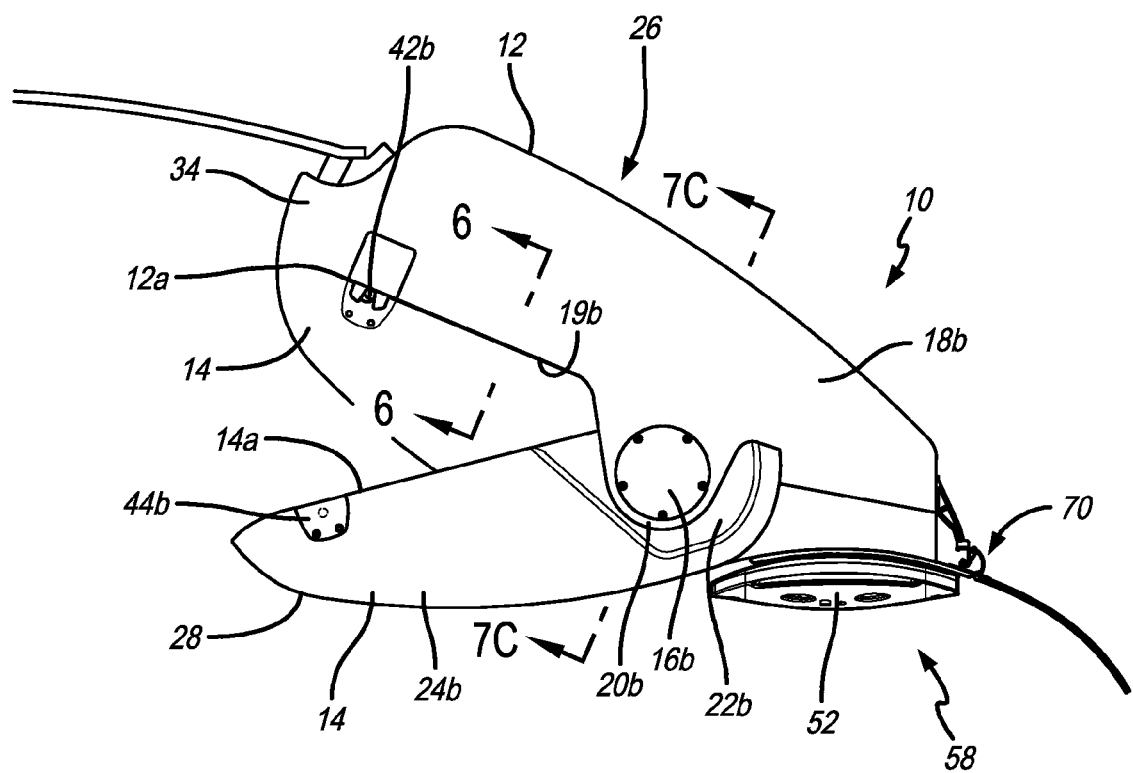
FIG. 1 is a side elevational view of two pivot bin assemblies in accordance with a preferred embodiment of the present invention showing a first pivot bin assembly in an open position and a second pivot bin assembly in a closed position.
Figure 2:
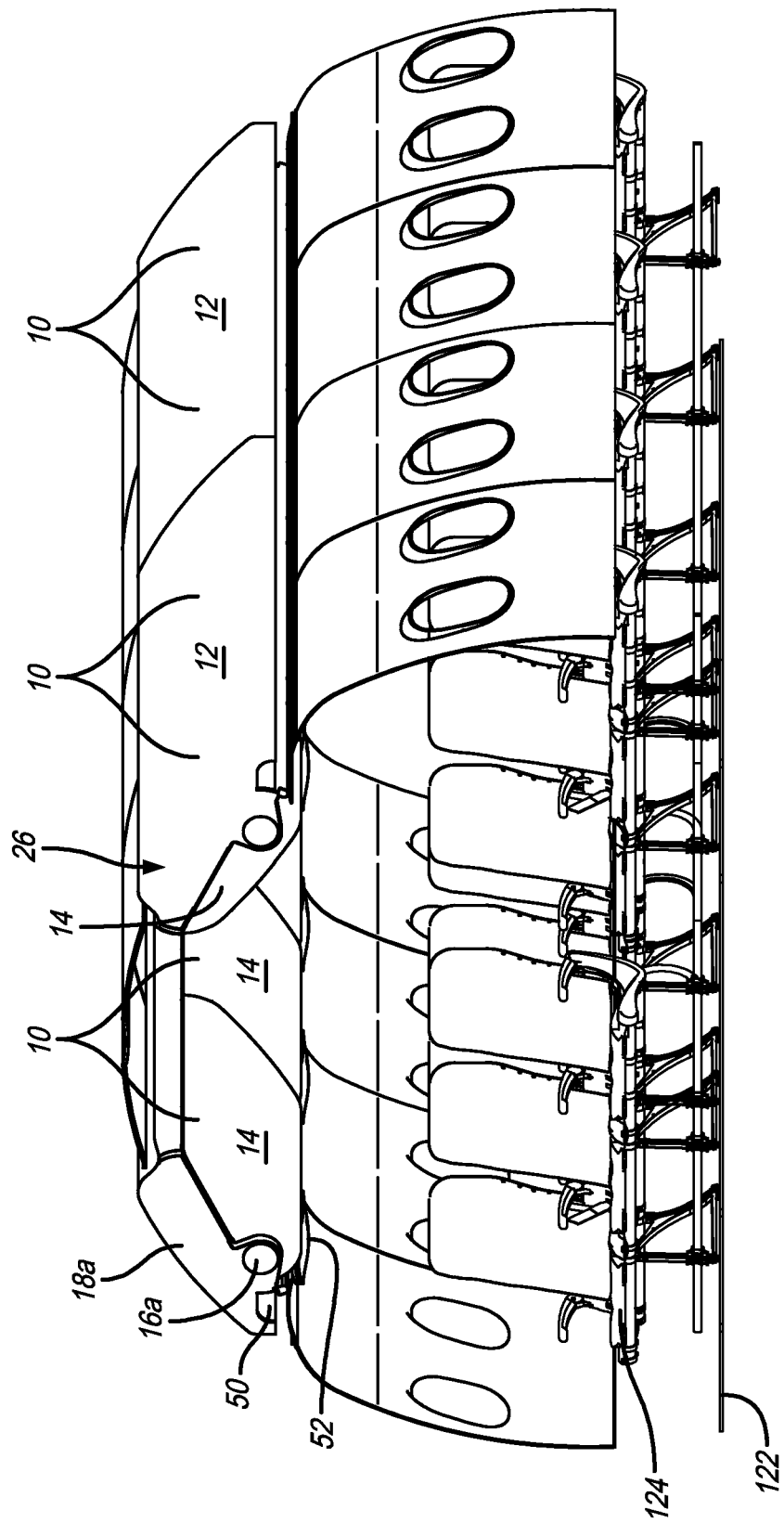
FIG. 2 is a perspective view of a portion of an aircraft cabin with a series of pivot bin assemblies installed therein.

In accordance with a first aspect of the present invention there is provided an aircraft storage bin that includes an upper housing, and a bucket pivotally connected to the upper housing that cooperates with the upper housing to define a bin interior. The bucket includes a bottom, a front edge and first and second opposing side walls extending upwardly from the bottom and pivots about a pivot axis with respect to the upper housing between an open position and a closed position. When the storage bin is installed in an aircraft, a first horizontal distance is defined between a first vertical line that extends through the pivot axis and the front edge of the bucket when the bucket is in the closed position, and a second horizontal distance is defined between the first vertical line and the front edge of the bucket when the bucket is in the open position. The first horizontal distance is greater than the second horizontal distance. In a preferred embodiment the front edge of the bucket defines a vertical opening distance between the open position and the closed position and the pivot axis is positioned vertically above a center point of the vertical opening distance. Preferably, the storage bin includes a first pivot mechanism operatively associated with the first side wall of the bucket and a second pivot mechanism operatively associated with the second side wall of the bucket. The first side wall of the bucket defines a first arcuate slot therein and the second side wall of the bucket defines a second arcuate slot therein and the first arcuate slot receives the first pivot mechanism and the second arcuate slot receives the second pivot mechanism. Preferably, the first and second arcuate slots are open to a top edge of the first and second side walls of the bucket.

In a preferred embodiment, the bucket includes a rear portion that has a bulge portion extending outwardly therefrom and the upper housing includes an indented portion adjacent the bulge portion. Preferably, the bulge portion has an outer surface having a first curvature and the indented portion has an inner surface having a second curvature, and the first and second curvatures are approximately the same. In a preferred embodiment, the first curvature defines a first circle having the pivot axis as a center point and the second curvatures defines a second circle having the pivot axis as a center point. Preferably, the bulge portion and indented portion extend horizontally.

In a preferred embodiment, the storage bin further compres an extension portion extending downwardly and inwardly from the upper housing. The extension portion and the rear portion of the bucket define an opening space that the bucket moves into when it is moved to the open position.

In a preferred embodiment, the aircraft storage bin includes a first pivot mechanism operatively associated with the first side wall of the bucket and a second pivot mechanism operatively associated with the second side wall of the bucket. The upper housing includes first and second side panels that each include a bottom edge and the first and second side walls of the bucket each include a top edge. In the closed position, at least a portion of the top edge of the first side wall of the bucket abuts the bottom edge of the first side panel, and at least a portion of the top edge of the second side wall of the bucket abuts the bottom edge of the second side panel. Preferably, the aircraft storage bin further comprises a first clevis assembly that includes at least one of a first inner plate and a first outer plate, and a second clevis assembly that includes at least one of a second inner plate and a second outer plate. The first clevis assembly is secured to and extends downwardly from the first side panel and the second clevis assembly is secured to and extends downwardly from the second side panel. The first pivot mechanism is operatively associated with the first clevis assembly and the second pivot mechanism is operatively associated with the second clevis assembly.

In a preferred embodiment, the aircraft storage bin includes first and second seat indicia positioned in the bin interior on an inside surface of the upper housing or an inside surface of the bucket. The first seat indicium indicates a first seat number that is associated with a first seat in an adjacent row when the storage bin is positioned in an aircraft, and wherein the second seat indicium indicates a second seat number that is associated with a second seat in an adjacent row when the storage bin is positioned in an aircraft.

In accordance with another aspect of the present invention there is provided a dual pivot bin assembly that includes first and second aircraft storage bins positioned adjacent one another that include a common upper housing. A center side panel having first and second opposite sides is positioned between the first and second aircraft storage bins. The first clevis assembly of the first aircraft storage bin is secured to the first side of the center side panel and the second clevis assembly of the second aircraft storage bin is secured to the second side of the center side panel.

In accordance with another aspect of the present invention there is provided an aircraft storage bin that includes an upper housing that includes first and second side panels, a bucket that includes a bottom and first and second side walls and that cooperates with the upper housing to define a bin interior, a first clevis assembly that includes at least one of a first inner plate and a first outer plate and that extends between the first side panel of the upper housing and the first side wall of the bucket, a second clevis assembly that includes at least one of a second inner plate and a second outer plate and that extends between the second side panel of the upper housing and the second side wall of the bucket, a first pivot mechanism operatively associated with the bucket and the first clevis assembly, and a second pivot mechanism operatively associated with the bucket and the second clevis assembly. The bucket pivots about a pivot axis with respect to the upper housing between an open position and a closed position. When the storage bin is installed in an aircraft, a first horizontal distance is defined between a first vertical line that extends through the pivot axis and the front edge of the bucket when the bucket is in the closed position and a second horizontal distance is defined between the first vertical line and the front edge of the bucket when the bucket is in the open position. The first horizontal distance is greater than the second horizontal distance.

In accordance with another aspect of the present invention there is provided a pivot bin assembly that is configured to receive luggage and be positioned in the interior of an aircraft. The pivot bin assembly includes an upper housing that includes a strongback and first and second side panels, a bucket that cooperates with the upper housing to define a bin interior, a first pivot mechanism operatively associated with the first side panel and the bucket, and a second pivot mechanism operatively associated with the second side panel and the bucket. The first and second pivot mechanisms are axially aligned along a pivot axis such that the bucket pivots about the pivot axis with respect to the upper housing between an open position and a closed position. In a preferred embodiment, the bucket includes a bottom and first and second opposing sides, and, when the pivot bin assembly receives luggage in the bin interior, the luggage is positioned on the bottom of the bucket, which bears the load of the luggage. The first and second side panels include a bottom edge and the first and second sides of the bucket include a top edge, and in the closed position, at least a portion of the top edge of the first side of the bucket abuts the bottom edge of the first side panel, and at least a portion of the top edge of the second side of the bucket abuts the bottom edge of the second side panel. Preferably, the bottom of the bucket includes a top edge that abuts a front bottom edge of the strongback when the bucket is in the closed position. The top edge of the bottom and sides of the bucket forms a generally continuous abutment edge that abuts the front bottom edge of the strongback and at least a portion of the bottom edge of the first and second side panels.

In a preferred embodiment, the pivot bin assembly includes a first clevis assembly that includes a first inner plate and a first outer plate and a second clevis assembly that includes a second inner plate and a second outer plate. The first clevis assembly is secured to and extends downwardly from the first side panel and the second clevis assembly is secured to and extends downwardly from the second side panel. The first pivot mechanism extends through the first side of the bucket and between the first inner and outer plates and the second pivot mechanism extends through the second side of the bucket and between the second inner and outer plates.

The pivot bin assembly further includes at least one latch assembly for securing the bucket to the upper housing in the closed position. In a preferred embodiment, the pivot bin assembly includes first and second latch assemblies and the first latch assembly is associated with the first side panel and the first side of the bucket, and the second latch assembly is associated with the second side panel and the second side of the bucket. Preferably, the first latch assembly includes a first hook portion and a first striker portion and the second latch assembly includes a second hook portion and a second striker portion. One of the first hook portion and the first striker portion is associated with the first side panel and the other of the first hook portion and the first striker portion is associated with the first side of the bucket and one of the second hook portion and the second striker portion is associated with the second side panel and the other of the second hook portion and the second striker portion is associated with the second side of the bucket. In a preferred embodiment, the first hook portion extends downwardly from the bottom edge of the first side panel and the first striker portion is positioned in a first recess defined in the top edge of the first side of the bucket, and the second hook portion extends downwardly from the bottom edge of the second side panel and the second striker portion is positioned in a second recess defined in the top edge of the second side of the bucket. In another preferred embodiment, the first hook portion extends upwardly from the top edge of the first side of the bucket and the first striker portion is positioned in a first recess defined in the bottom edge of the first side panel, and the second hook portion extends upwardly from the top edge of the second side of the bucket and the second striker portion is positioned in a second recess defined in the bottom edge of the second side panel. In a preferred embodiment, the first and second latch assemblies are in electrical communication with an operating member disposed on the bucket.

Preferably, the first and second pivot mechanisms include first and second rotary dampers associated therewith. The co-axial rotary dampers damp the bucket when it pivots to the open position. Preferably, the first pivot mechanism also includes a first assist spring associated therewith and the second pivot mechanism includes a second assist spring associated therewith. The first and second assist springs are preloaded when the bucket is pivoted to the open position. In a preferred embodiment, the first assist spring is a coil spring that is co-axial with the first pivot mechanism.

In a preferred embodiment, the upper housing includes a passenger service unit ("PSU") channel integral therewith that is positioned adjacent to the bucket. Preferably, the PSU channel includes at least a first PSU pod extending downwardly therefrom. The upper housing includes first and second rails, and the PSU pod extends downwardly from a panel that includes first and second connectors that are secured to the first and second rails, respectively. Preferably, the PSU channel includes systems components disposed therein, and the PSU pod includes passenger components disposed therein. In a preferred embodiment, the upper housing includes an ECS channel integral therewith that is separate from the PSU channel.

In a preferred embodiment, the pivot bin assembly includes a first connecting unit having a first end pivotally connected to the first side of the bucket and a second end pivotally connected to the first side panel and a second connecting unit having a first end pivotally connected to the second side of the bucket and a second end pivotally connected to the second side panel. The first and second connecting units provide one or both of damping when the bucket pivots to the open position and/or assistance when the bucket pivots to the closed position. Preferably, the first side panel defines a cut out in which the first connecting unit is positioned and the second side panel defines a cut out in which the second connecting unit is positioned. In an embodiment that includes the first and second clevis assemblies, the first connecting unit is positioned between the first inner plate and the first outer plate and the second connecting unit is positioned between the second inner plate and the second outer plate.

In a preferred embodiment, the pivot bin assembly can fit therein four pieces of standard luggage. Each piece of standard luggage includes a top, a bottom, a front, a back and two sides and the four pieces of standard luggage are received in the bin interior and positioned such that one of the two sides of each piece of standard luggage is resting on the bucket bottom when the bucket is in the closed position. In a preferred embodiment, the bucket is made of a single piece that is created or formed on a mold in a single operation. Preferably, the bucket defines a lower portion of the bin interior and the upper housing defines an upper portion of the bin interior. In a preferred embodiment, the bottom of the bucket includes a closing channel defined in an outer surface thereof, and the closing channel includes a closing surface. Preferably, the bottom of the bucket includes a luggage indentation defined in an inner surface thereof.

In accordance with another aspect of the present invention there is provided a pivot bin assembly that is configured to receive luggage and be positioned in the interior of an aircraft. The pivot bin assembly includes an upper housing that includes a strongback and first and second side panels, a bucket that cooperates with the upper housing to define a bin interior and is pivotally connected to the upper housing such that it pivots about a pivot axis with respect to the upper housing between an open position and a closed position. The bucket includes a bottom and first and second sides. The pivot bin assembly also includes first and second latch assemblies. The first latch assembly is associated with the first side panel and the first side of the bucket, and the second latch assembly is associated with the second side panel and the second side of the bucket.

In accordance with another aspect of the present invention there is provided a pivot bin assembly that includes an upper housing that includes a strongback and first and second side panels and a bucket that includes a bottom and first and second sides and that cooperates with the upper housing to define a bin interior. The bucket is operably associated with the upper housing and is movable with respect to the upper housing between a first position where the bucket is closed, a second position where the bucket is partially open and a third position where the bucket is fully open. The pivot bin assembly also includes at least one latch assembly for latching the bucket to the upper housing in the closed position. The bucket is damped when it moves from the first position to the second position, and at least a first assist spring is preloaded when the bucket moves from the second position to the third position. In a preferred embodiment, when the bucket is unlatched from the upper housing, the bucket moves from the first position to the second position by gravity (as used herein "gravity" means the earth's gravity). The first assist spring maintains the bucket in the second position when the bucket is empty, and when a force greater than gravity is placed on the bucket, the bucket moves from the second position to the third position. When the bucket is not empty the first assist spring reduces the force required by a user to move the bucket from the third position to the second position than if the first assist spring was not present.

In a preferred embodiment, the bucket is pivotally connected to the upper housing and pivots about a pivot axis with respect to the upper housing between the first, second and third positions, and the pivotal connection between the bucket and the upper housing includes first and second pivot axles. Preferably, the first assist spring is a coil spring that is co-axial with one of the first or second pivot axles and at least one of the first and second pivot axles includes a rotary damper co-axial therewith that damps the bucket when the bucket moves from the first to the second position.

In a preferred embodiment, the pivot bin assembly includes a first connecting unit having a first end pivotally connected to the first side of the bucket and a second end pivotally connected to the first side panel and a second connecting unit having a first end pivotally connected to the second side of the bucket and a second end pivotally connected to the second side panel. Preferably, the first assist spring is associated with the first connecting unit and at least one of the first and second connecting units damp the bucket when it moves from the first position to the second position.

In accordance with another preferred embodiment of the present invention, there is provided a pivot bin assembly that includes an upper housing that includes a strongback and first and second side panels, a first clevis assembly that includes at least one of a first inner plate and a first outer plate and that is secured to and extends downwardly from the first side panel, a second clevis assembly that includes at least one of a second inner plate and a second outer plate and that is secured to and extends downwardly from the second side panel, a bucket that includes a bottom and first and second sides and cooperates with the upper housing to define a bin interior, a first pivot axle operatively associated with the bucket and the first clevis assembly, and a second pivot axle operatively associated with the bucket and the second clevis assembly. The first and second pivot axles are axially aligned along a pivot axis, and the bucket pivots about the pivot axis with respect to the upper housing between an open position and a closed position. In a preferred embodiment, the pivot bin assembly includes a first connecting unit having a first end pivotally connected to the first side of the bucket and a second end pivotally connected to the first side panel, and a second connecting unit having a first end pivotally connected to the second side of the bucket and a second end pivotally connected to the second side panel. The first and second connecting units provide one or both of damping when the bucket pivots to the open position and assistance when the bucket pivots to the closed position. Preferably, the first clevis assembly includes both the first inner plate and the first outer plate and the first pivot axle extends between the first inner plate and the first outer plate. Preferably, the second clevis assembly includes both the second inner plate and the second outer plate and the second pivot axle extends between the second inner plate and the second outer plate. Preferably, the first connecting unit is positioned between the first inner plate and the first outer plate and the second connecting unit is positioned between the second inner plate and the second outer plate. In a preferred embodiment, at least one of the first or second pivot axles includes an assist spring associated therewith, and the assist spring is preloaded when the bucket is pivoted to the open position. In this embodiment, in use, the empty bucket rests in a partially open position. When a user pulls down on the bucket and overcomes the spring force, the spring is preloaded. If the user lets go without placing any luggage in the bucket, it will spring back to the partially open position. If the user places enough luggage/weight in the bucket to overcome the spring force, the bucket will remain in the fully open position.

In accordance with another aspect of the present invention, there is provided a dual pivot bin assembly that includes first and second pivot bin assemblies as described above positioned adjacent one another, but that include a common strongback.

In accordance with another aspect of the present invention, there is provided an aircraft that comprises a cabin having a side wall, and that has at least first and second of the pivot bin assemblies described above that are connected to the side wall.

In accordance with another aspect of the present invention, there is provided a pivot bin assembly that is configured to receive luggage and be positioned in the interior of an aircraft. The pivot bin assembly includes an upper housing that includes first and second side panels and a strongback that includes an integral PSU channel formed therewith, a bucket that cooperates with the upper housing to define a bin interior, a first pivot mechanism operatively associated with the first side panel and the bucket, and a second pivot mechanism operatively associated with the second side panel and the bucket. The bucket pivots about the pivot axis with respect to the upper housing between an open position and a closed position. In a preferred embodiment, the strongback includes first and second rails that, when the pivot bin assembly is positioned in an aircraft, extend generally parallel to a longitudinally extending axis of the aircraft, and the pivot bin assembly includes at least one panel that is connected to the first and second rails and partially defines the PSU channel. Preferably, the at least one panel includes a PSU pod extending downwardly therefrom that includes reading lights disposed therein and has cabin lighting associated therewith.

In a preferred embodiment, the pivot bin assembly includes a system that provides a means for an airline customer or flight attendant to close an opened bucket with minimal force, and also provide the means for a fully loaded closed bin bucket to open in a controlled manner.

In a preferred embodiment, the pivot bin assembly includes at least one rotary damping mechanism. For example, the rotary damping mechanism can be that taught in U.S. Patent Pub. No. 2013/0207529 (the "'529 publication"), the entirety of which is incorporated by reference. In another embodiment, the rotary damping mechanism can be the rotary damper taught in U.S. Patent Pub. No. 2013/0209221 (the "'221 publication"), the entirety of which is incorporated by reference. Preferably, the rotary damping mechanism also includes spring assistance over at least one direction of the rotational travel of the device (e.g., closing of the bucket). The spring assistance can be limited to a portion of the entire range of travel of the pivoting bucket or over the entire range of travel. It will be appreciated by those of ordinary skill in the art that this eases the force required by a passenger to close the bucket.

In a preferred embodiment, the lifting force applied through part of the travel of the bucket rotation is achieved through the inclusion of a spring feature associated with the rotary damping mechanism and/or the pivot mechanism. The spring feature is oriented such that compression occurs during all or part of the range of travel of the bucket. While the bucket is open, the spring is preloaded to provide the load assist. This can be advantageous particularly at the beginning of the range of motion of the bucket as hand loads for a passenger closing the bucket are typically highest at this point.

DETAILED DESCRIPTION OF THE PREFERRED EMBODIMENTS

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Referring now to the drawings, wherein the showings are for purposes of illustrating the present invention and not for purposes of limiting the same, FIGS. 1-16 show a pivot bin assembly 10. In particular, the invention can be used on commercial passenger aircraft. However, this is not a limitation on the present invention and the pivot bin assembly can be used elsewhere.

The present invention pivot bin assembly 10 employs a "clamshell design." In a preferred embodiment, the pivot bin assembly 10 allows as much of the entire volume inside the bin as possible to be used, increasing volume and baggage capacity when compared to the prior art. The design and structure also provides a way to integrate systems such as environmental control system ("ECS") ducting and electrical.

As will be appreciated by those skilled in the art, within the cabin of an aircraft, overhead stowage bins are typically secured to attachment points, such as hard points and overhead and side attachments. Accordingly, a description of the attachment of the pivot bin assembly will be omitted.

FIGS. 1-16 show a dual pivot bin assembly that is essentially two pivot bin assemblies 10 with a common strongback 12 and that can be installed together in the cabin of an aircraft. However, it will be understood by those of ordinary skill in the art, that a single and separate pivot bin assembly 10 with a single strongback 12 is within the scope of the present invention and is described and claimed herein. In another embodiment, more than two or multiple pivot bin assemblies 10 can include a common strongback 12. The figures show pivot bin assemblies 10 that are positioned outboard on the aircraft. However, it will be appreciated, that the pivot bin assembly 10 can be used inboard on a wide body aircraft. For example, two sets of back to back outboard facing pivot bin assemblies 10 can include a common strongback 12.

In a preferred embodiment, the pivot bin assembly 10 includes the strongback 12, a tray or bucket 14 with a first and a second pivot mechanism or pivot axle 16*a* and 16*b* on each side, and first and second side panels 18*a* and 18*b*. With respect to each pivot bin assembly 10, the strongback 12 and first and second side panels 18*a* and 18*b* are referred to herein together as the upper housing 26. Generally, the pivot bin assembly 10 includes the upper housing 26, which includes the strongback 12 and the first and second side panels 18*a* and 18*b*, and the bucket 14. The bucket 14 and upper housing 26 cooperate to define a bin interior 36. In a preferred embodiment, the bucket 14 defines the lower portion of the bin interior 36 and the upper housing defines the upper portion of the bin interior 36. It will be appreciated that because the pivot bin assembly includes two sides that each have a pivot mechanism and associated components. Throughout the description, many of the components are denoted as a "first" component with an "a" and as a "second" component with a "b". However, because many of the components are structurally the same, in some portions of the specification and drawings, the "a" and "b" are omitted. For example, the first and second pivot mechanisms/axles are denoted as "16*a*" and "16*b*". In some portions of the specification and drawings, the pivot mechanism/axle may be denoted generally as "16".

In the embodiment shown in the figures, the strongback 12 and first and second side panels 18*a* and 18*b* are separate components. However, in another embodiment, the strongback 12 and first and second side panels 18*a* and 18*b* (the upper housing 26) can be a unitary component. In a preferred embodiment, the pivot bin assembly 10 includes a single piece bucket 14 that includes a bottom 28 and first and second opposing sides 24*a* and 24*b*. In another embodiment, the bucket 14 can include multiple pieces, e.g., a three piece design that includes the bottom 28 and first and second opposing sides 24*a* and 24*b* as separate components. It will be appreciated by those of ordinary skill in the art that the bucket 14 and upper housing 26 provide a "clamshell design," where at least a portion of the bottom edge 19*a* of the first side panel 18*a* and the bottom edge 19*b* of the second side panel 18*b* and the front bottom edge 12*a* of the strongback 12 meet edge to edge with or abut the top edge or front lip 14*a* of the bucket 14. In a preferred embodiment, in the closed position, other than the rear top edge 28*b* of the bottom 28 of the bucket 14 and the area adjacent thereto and the strongback 12 (see FIG. 8), there is little to no overlap between the bucket 14 and the upper housing 26. In the embodiment shown in FIG. 1, other than the localized overlap between the first and second ears 20*a* and 20*b* and the first and second indented portions 22*a* and 22*b*, in the closed position, there is no overlap between the first and second side panels 18*a* and 18*b* and the first and second sides 24*a* and 24*b* of the bucket 14. In other words, in a preferred embodiment, the bucket 14 does not enter the upper portion of the bin interior 36, which is defined by the upper housing 26, when the bucket 14 is pivoted to the closed position. It will be appreciated by those skilled in the art, that not only does this increase stowage volume and reduce weight by eliminating redundant paneling, but also significantly decreases the number of parts needed for the entire pivot bin assembly 10, compared to the prior art. As shown in the figures, the strongback 12 can include an integral valence 34 for lighting, ducting and/or other system components that can be generally hidden from passenger view. In a preferred embodiment, the valence 34 is formed as a unitary portion of the strongback 12. However, this is not a limitation on the present invention and the valence 34 can be omitted or be a separate component.

When the bucket 14 is pivoted to the closed position, the first and second sides 24*a* and 24*b* of the bucket 14 are not received in the upper portion of the bin interior 36. In other words, in the portion of the first and second side panels 18*a* and 18*b* that do not include the first and second ears 20*a* and 20*b* and first and second indented portions 22*a* and 22*b*, the first and second top edges 25*a* and 25*b* do not pass or overlap with the first and second bottom edges 19*a* and 19*b* when the bucket 14 is pivoted to the closed position. Preferably, the first and second top edges 25a and 25b and first and second bottom edges 19a and 19b abut one another. However, an embodiment is possible where the first and second top edges 25a and 25b and first and second bottom edges 19a and 19b are horizontally separated from one another, but, in a vertical direction, the first and second top edges 25a and 25b do not pass or overlap with the first and second bottom edges 19a and 19b when the bucket 14 is pivoted to the closed position.

In a preferred embodiment, the strongback 12, bucket 14 and first and second side panels 18a and 18b are made out of crush-core panel. However, this is not a limitation on the present invention and other materials can be used. In an exemplary embodiment, the single piece bucket 14 is made using crush core match metal molding. This creates a continuous composite structure with a C-frame cross section that can be made from a single mold. The continuous piece acts as a structural I-beam. However, this structure is not a limitation on the present invention.

Figure 11:
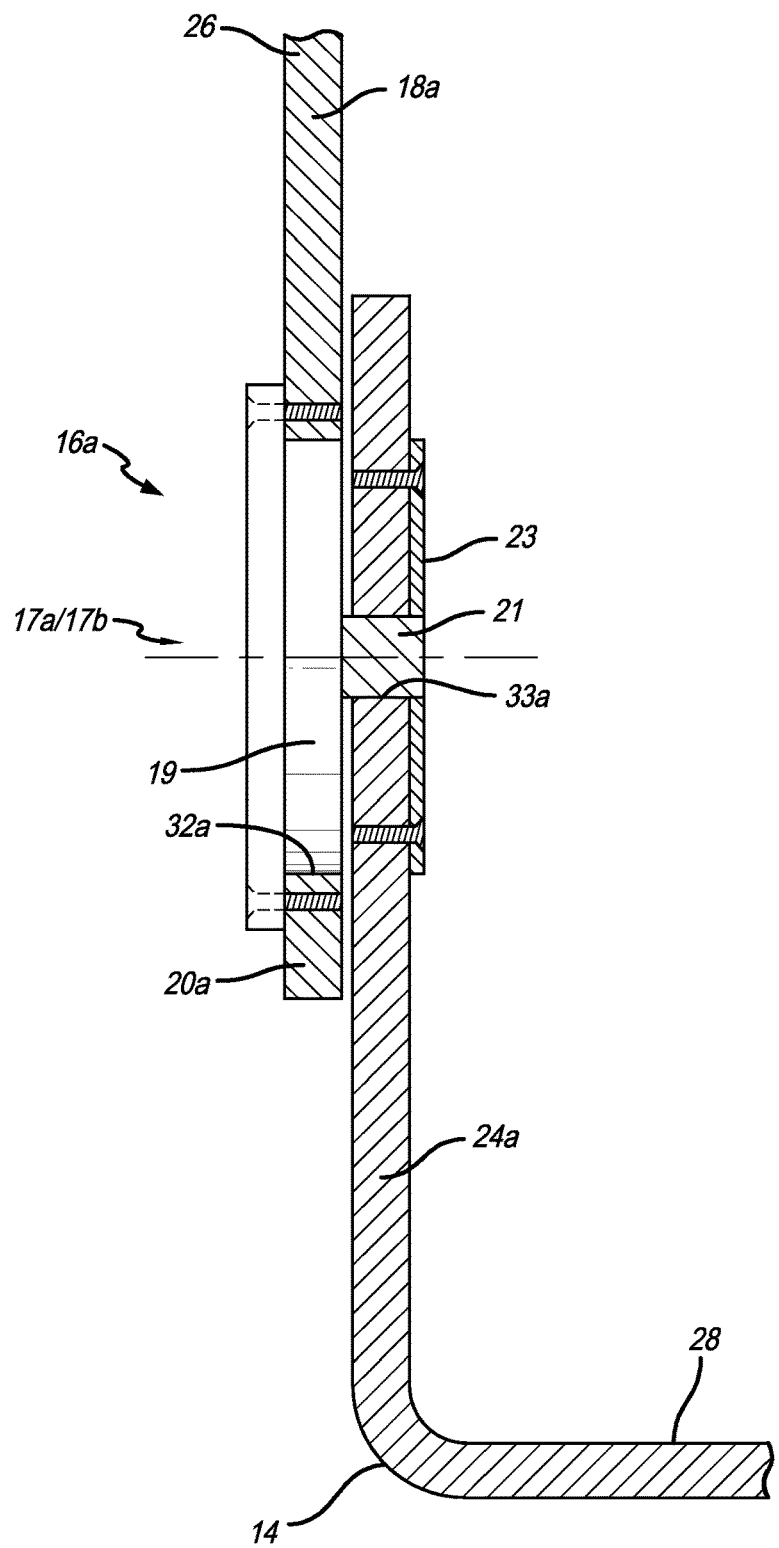
FIG. 11 is a detailed cross-sectional view showing a rotary damper pivot mechanism providing the pivot point between the side panel and the bucket.
Figure 12:
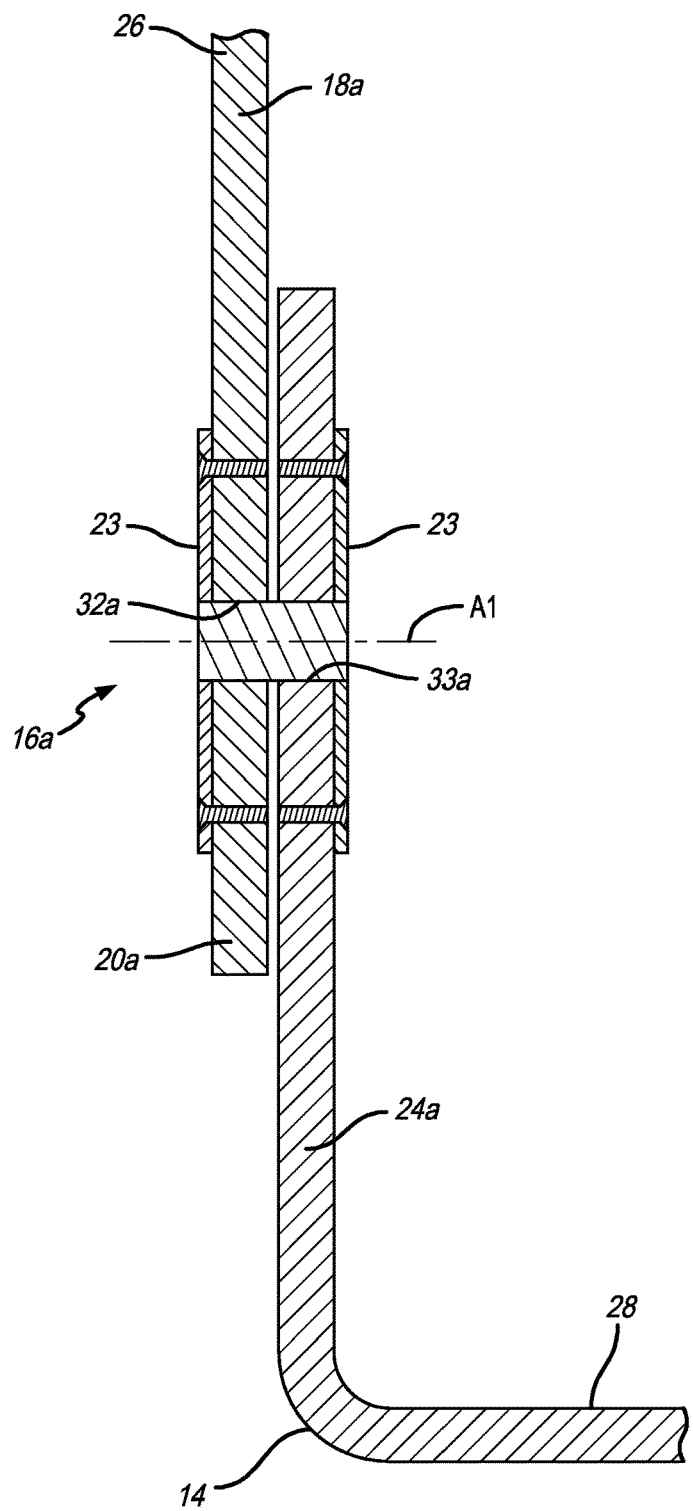
FIG. 12 is a detailed cross-sectional view showing a pivot axle as the pivot mechanism providing the pivot point between the side panel and the bucket.

As shown in FIGS. 1-12, generally, first and second side panels 18a and 18b include first and second pivot mechanisms 16a and 16b that are operatively associated with the bucket 14, and allow the bucket 14 to pivot with respect to the upper housing 26 between an open position and a closed position. Any type of pivot mechanism that allows the bucket 14 to pivot with respect to the upper housing 26 is within the scope of the present invention. For example, the first and second pivot mechanisms 16a and 16b can be pivot axles, as shown in FIG. 12. It will be appreciated that the first and second pivot mechanisms 16a and 16b or axles pivot or rotate about a pivot axis. In a preferred embodiment, the first and second pivot mechanisms 16a and 16b are axially aligned such that the pivot axles rotate about the same axis A1, as shown in FIGS. 7C and 8.

In a preferred embodiment, the first side panel 18a includes a first ear 20a and the second side panel 18b includes a second ear 20b extending downwardly therefrom. The first and second ears 20a and 20b mate with or are received in first and second indented portions 22a and 22b that are formed in the first and second sides 24a and 24b of the bucket 14. As shown in the figures, preferably, the first and second indented portions 22a and 22b extend inwardly into the interior of the bucket 14. However, in another embodiment, the indented portions can extend outwardly. Furthermore, in another embodiment, the ears can extend upwardly from the bucket and the indented portions can be defined inwardly or outwardly on the side panels of the upper housing.

Figure 6:
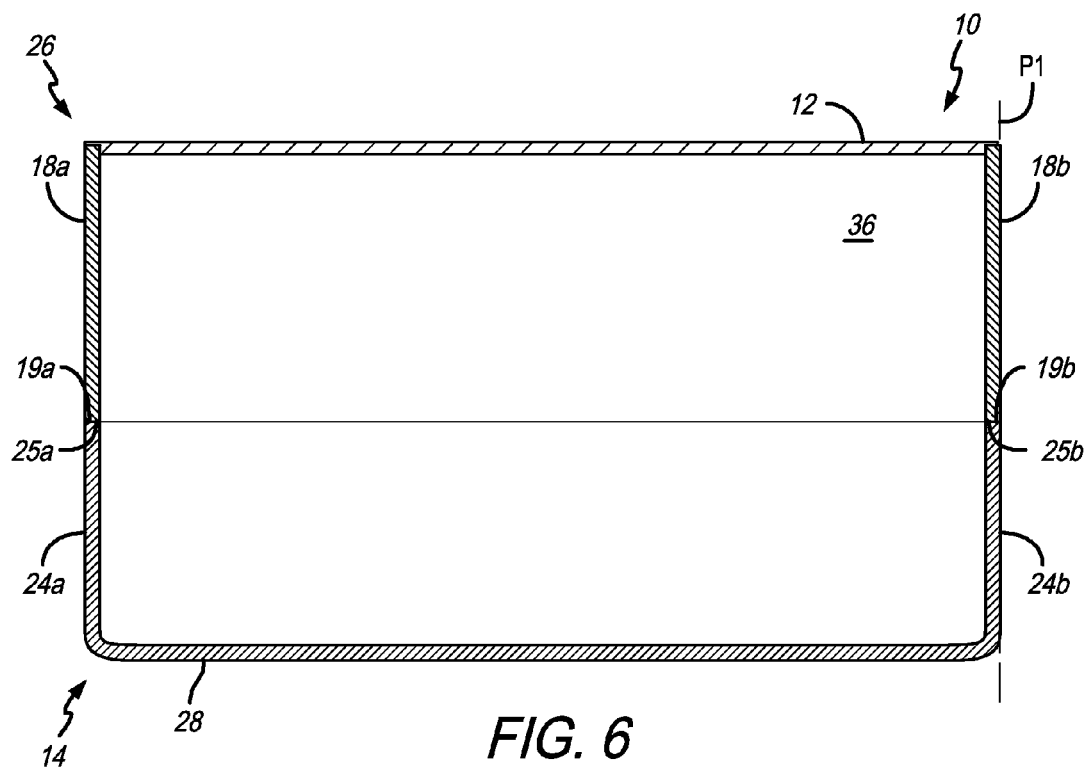
FIG. 6 is a cross-sectional view taken along line 6-6 of FIG. 1.
Figure 7A:
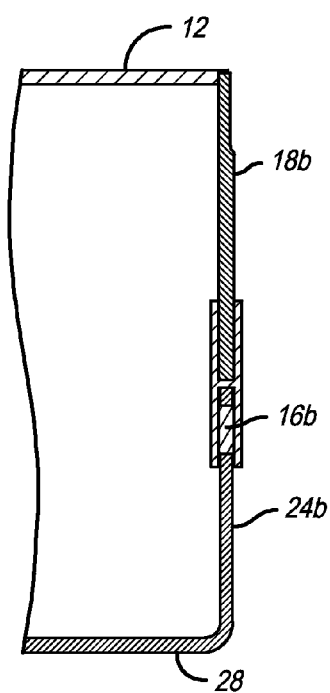
FIG. 7A is a cross-sectional view taken along the same line as FIG. 6, but showing an alternative embodiment for securing the bucket to the upper housing.
Figure 7B:
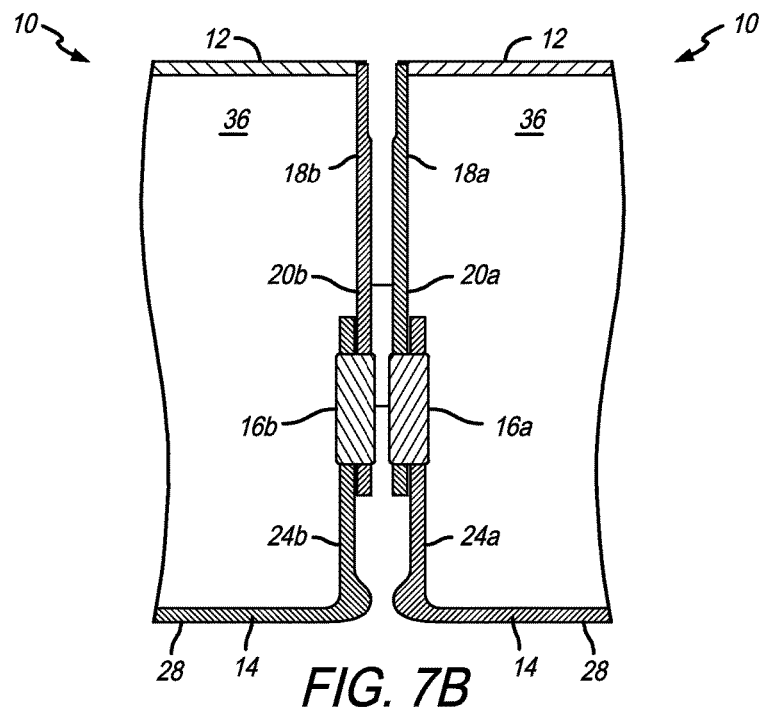
FIG. 7B is a cross-sectional view of a portion of the pivot bin assemblies of FIG. 1.
Figure 7C:
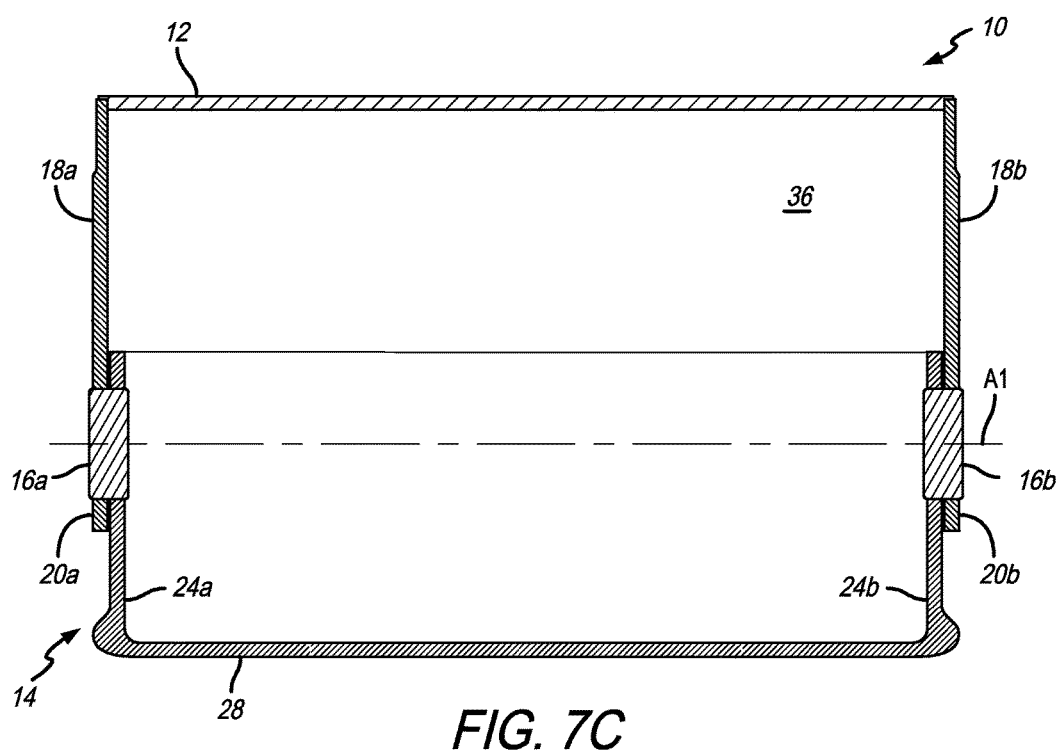
FIG. 7C is a cross-sectional view taken along line 7C-7C of FIG. 1.
Figure 9:
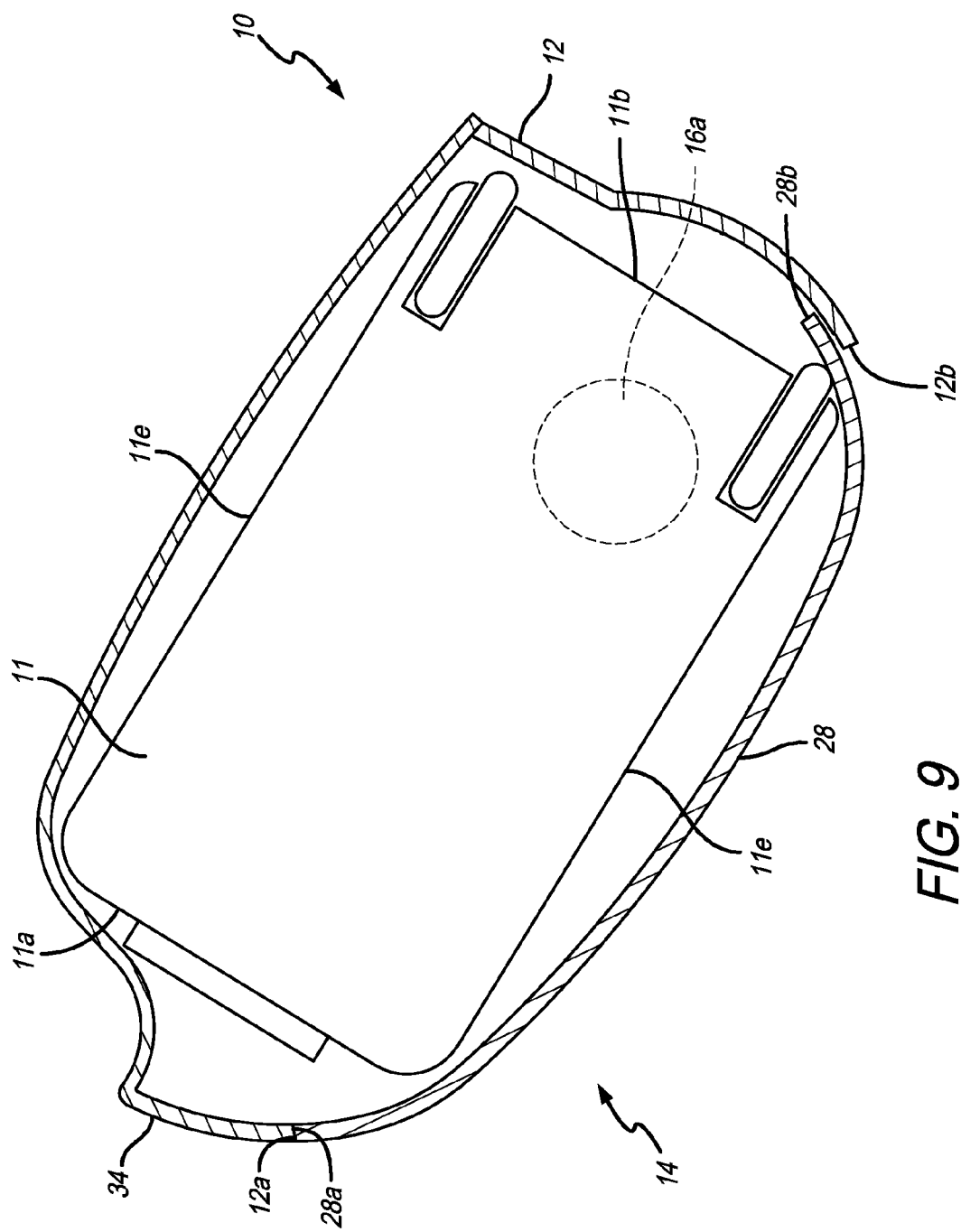
FIG. 9 is a cross-sectional view of one of the pivot bin assemblies of FIG. 1 with the PSU channel omitted.
Figure 10:
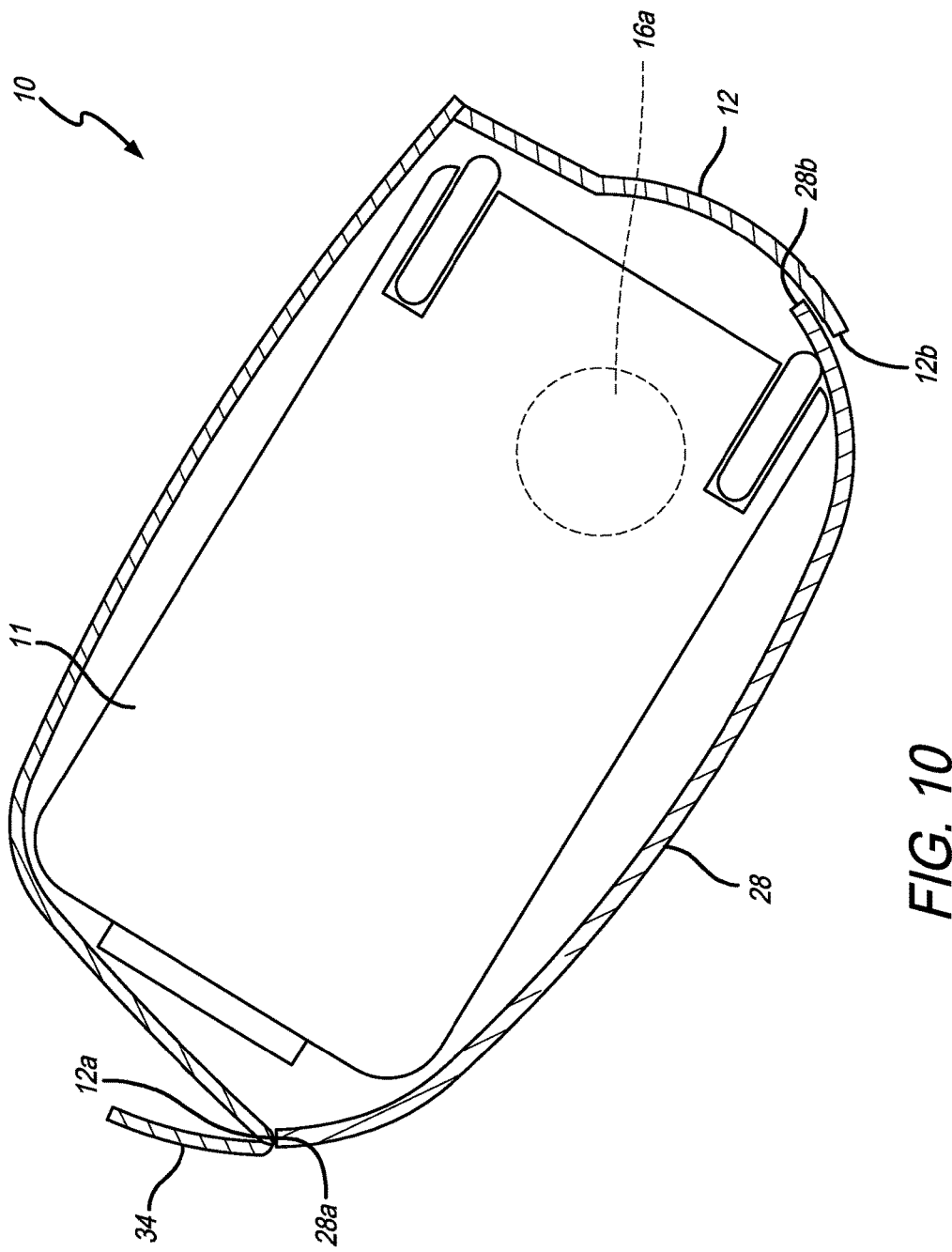
FIG. 10 is a cross-sectional view of a pivot bin assembly with a different valence.

In a preferred embodiment, the first side panel 18a, first ear 20a and the first side 24a of the bucket 14 (other than the first indented portion 22a) all are positioned in a generally common plane P1 (see FIG. 6). Likewise, the second side panel 18b, second ear 20b and the second side 24b of the bucket 14 (other than the second indented portion 22b) all are positioned in a generally common plane. In another embodiment, the first and second ears 20a and 20b can be part of the bucket 14 and the first and second indented portions 22a and 22b can be defined in the first and second side panels 18a and 18b.

Figure 3:
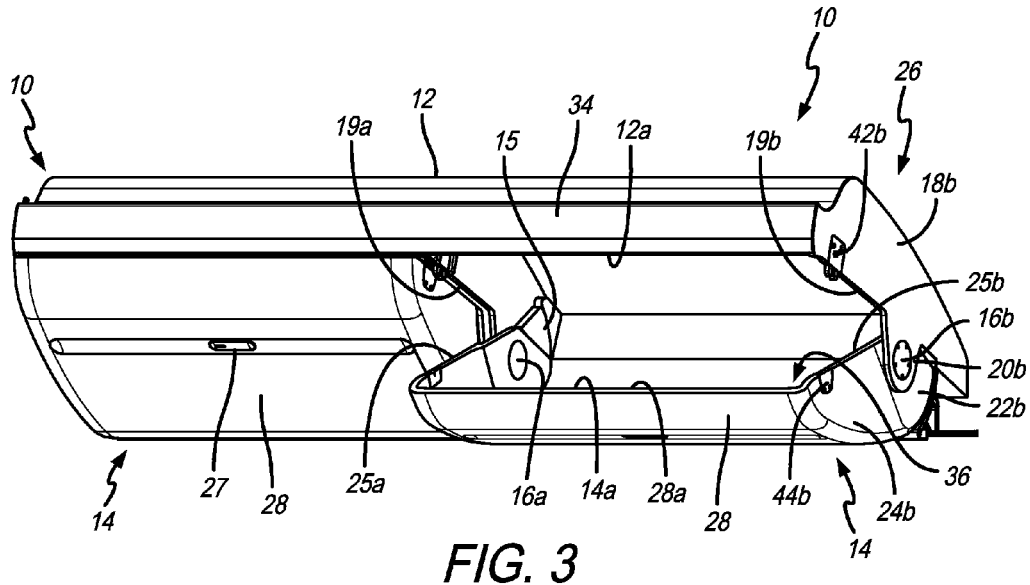
FIG. 3 is a perspective view of the pivot bin assemblies of FIG. 1.
Figure 14:
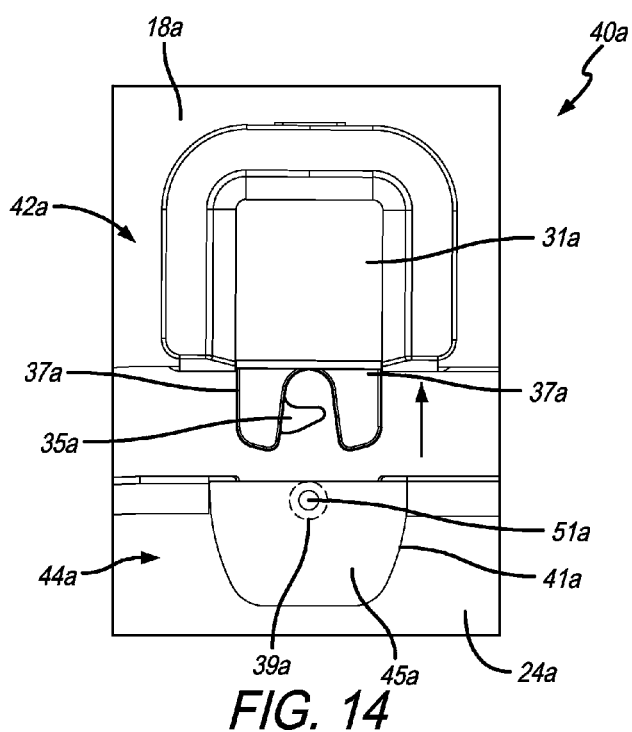
FIG. 14 is an elevational view showing the first latch assembly in the unlatched position.
Figure 23A:
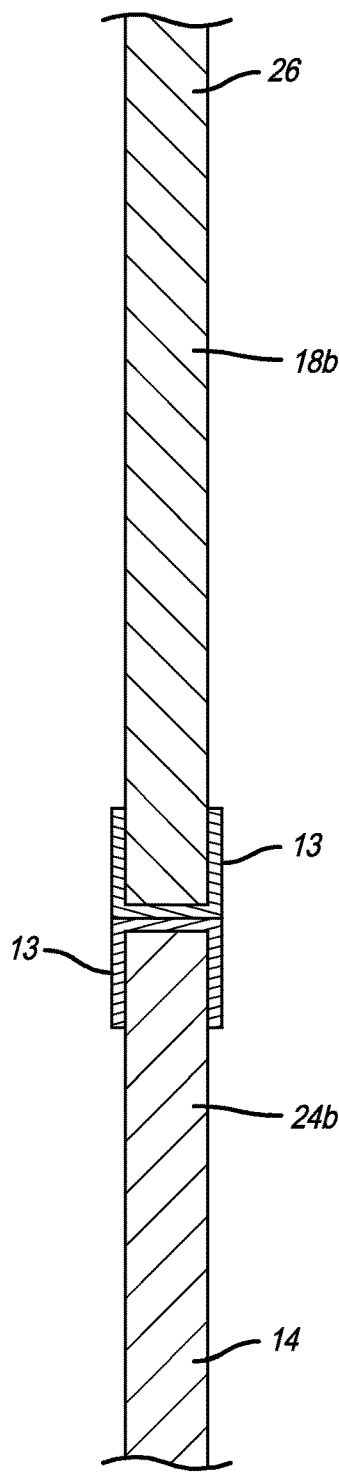
FIG. 23A is a cross-sectional view taken along line 23A-23A of FIG. 22.
Figure 23B:
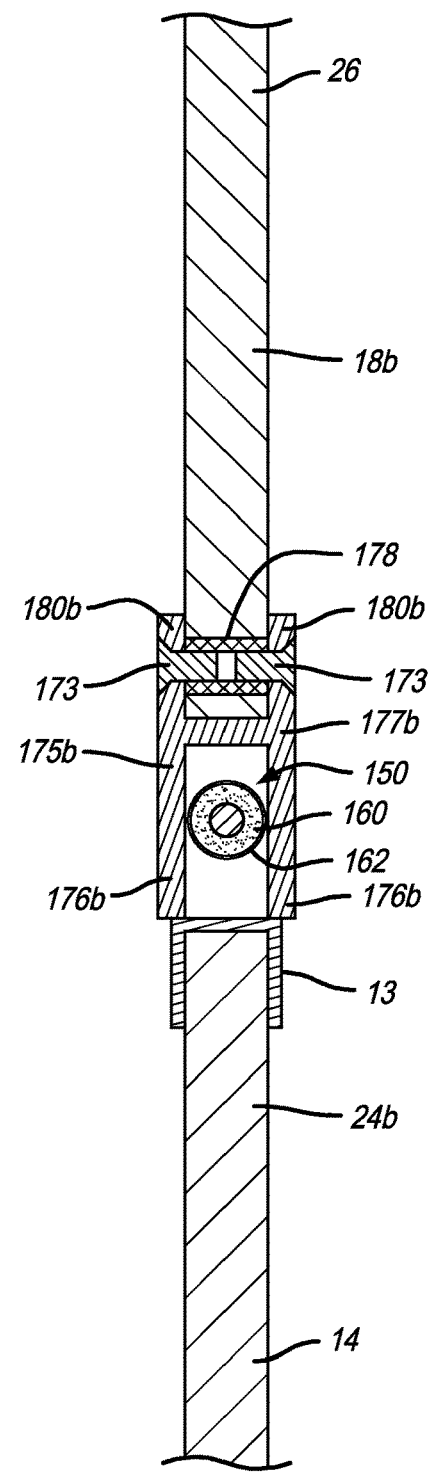
FIG. 23B is a cross-sectional view taken along line 23B-23B of FIG. 22.

As discussed above, and as shown in FIGS. 6 and 8, in a preferred embodiment, in the closed position, the bottom edges of the first and second side panels 18a and 18b abut the top edges 25a and 25b of the first and second sides 24a and 24b of the bucket 14 (FIG. 6) and the front bottom edge 12a of the strongback 12 abuts the front top edge 28a of the bottom 28 of the bucket 14 (FIGS. 8 and 14). It will be appreciated that the front bottom edge 12a of the strongback can include the valence 34. In other words, as used herein, front bottom edge 12a is the open edge that is abutted by the bucket 14, whether it actually is the strongback, valence or a panel extending from the strongback. As is also shown in FIGS. 8 and 14, the bottom 28 of they bucket 14 includes a rear top edge 28b that is positioned adjacent to but does not abut a rear bottom edge 12b of the strongback 12. This allows a portion of the bottom 28 of the bucket to overlap with the strongback 12 when the bucket 14 pivots to the open position. It will be appreciated by those skilled in the art that in a commercial embodiment, the bucket and/or upper housing may include edge trim, seals or the like that cover the top edges of the bucket or the bottom edges of the upper housing. However, this is not a limitation on the present invention and any such components are considered part of the upper housing or bucket for purposes of the claims appended hereto. For example see the trim 13 shown in FIGS. 23A and 23B. In a preferred embodiment, the pivot bin assembly 10 includes at least one stop member 15 (and preferably a plurality of stop members) positioned within the bin interior 36 and that maintain the bucket 14 in the open position and prevents it from pivoting too far. Any type of stop member 15 is within the scope of the present invention. For example, as shown in FIG. 3, the stop member 15 can abut the angled top edge 14b of the back of the bucket 14 and/or the rear top edge 28b of the bottom 28 of the bucket 14. The stop member 15 can be a separate component or be built in to the upper housing 26 (e.g., a ledge).

In a preferred embodiment, the first pivot mechanism 16a extends between the first ear 20a and the first side 24a of the bucket 14 and the second pivot mechanism 16b extends between the second ear 20b and second first side 24b of the bucket 14. As discussed above, the first and second pivot mechanisms can be pivot axles on which the bucket 14 can rotate. As shown in FIGS. 5-6 and 7B-7C, a portion of the first pivot mechanism 16a can be positioned in corresponding openings 32a and 33a in the first ear 20a and first side 24a, respectively, and a portion of the second pivot mechanism 16b can be positioned in corresponding openings 32b and 33b in the second ear 20b and second side 24b, respectively. In another embodiment, a pivot axle can extend from the bucket and into an opening in the ear or vice versa. Any pair of pivot mechanisms that are axially aligned and that allow the bucket 14 to pivot with respect to the upper housing 26 is within the scope of the present invention.

As shown in FIG. 11, in a preferred embodiment, the first and second pivot mechanisms comprise first and second rotary dampers 17a and 17b. With respect to the first rotary damper 17a, one of the housing 19 or the axle 21 is secured within opening 32a and the other is secured within opening 33a. With respect to the second rotary damper 17b, one of the housing 19 or the axle 21 is secured within opening 32b and the other is secured within opening 33b. It will be appreciated that FIG. 11 only shows the first rotary damper 17a, but that second rotary damper 17b is a mirror image thereof. The first and second rotary dampers 17a and 17b can include covers 23 to secure them in place.

It will be understood that the first and second rotary dampers 17a and 17b provide the ability to damp or control the descent or pivoting of the bucket when it pivots to the open position. In a preferred embodiment, the first and second rotary dampers are either of the rotary dampers taught in the '529 publication or the '221 publication. In another embodiment, each of the first and second side panels 18a and 18b can include a cover 23 positioned on the outside or the inside of the bin interior 36 and that secures the first and second side panels 18a and 18b to the bucket 14 and that covers and houses the first and second pivot mechanism 16*a* and 16*b*. It will be appreciated that any type of power assist (for raising or lowering the bucket) or damper is within the scope of the present invention. For example, the present invention can utilize a prior art damper, such as a linear damper that includes a cylinder with a piston and damping fluid therein or a spring for assist (as described below).

Figure 13:
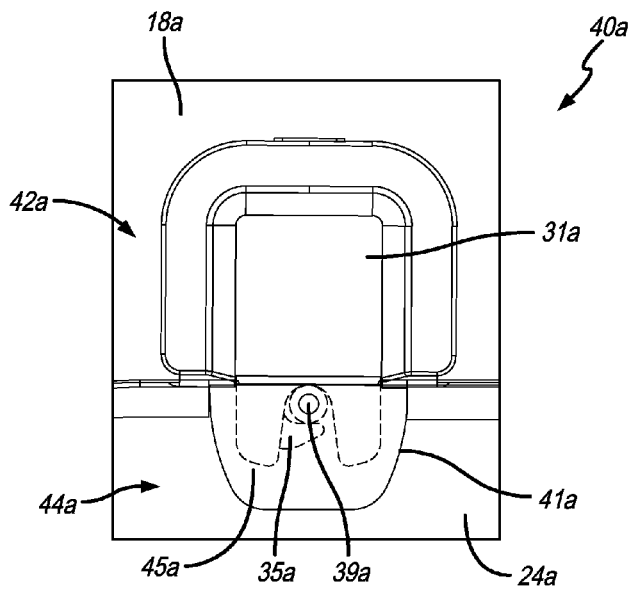
FIG. 13 is an elevational view showing the first latch assembly in the latched position.
Figure 15:
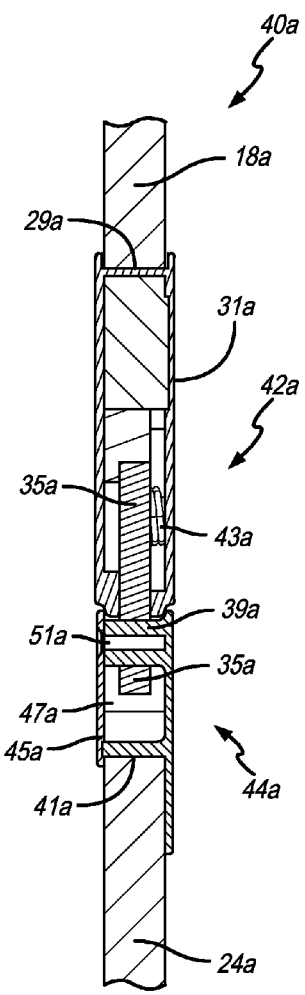
FIG. 15 is a cross-sectional view of the first latch assembly in the latched position.
Figure 16:
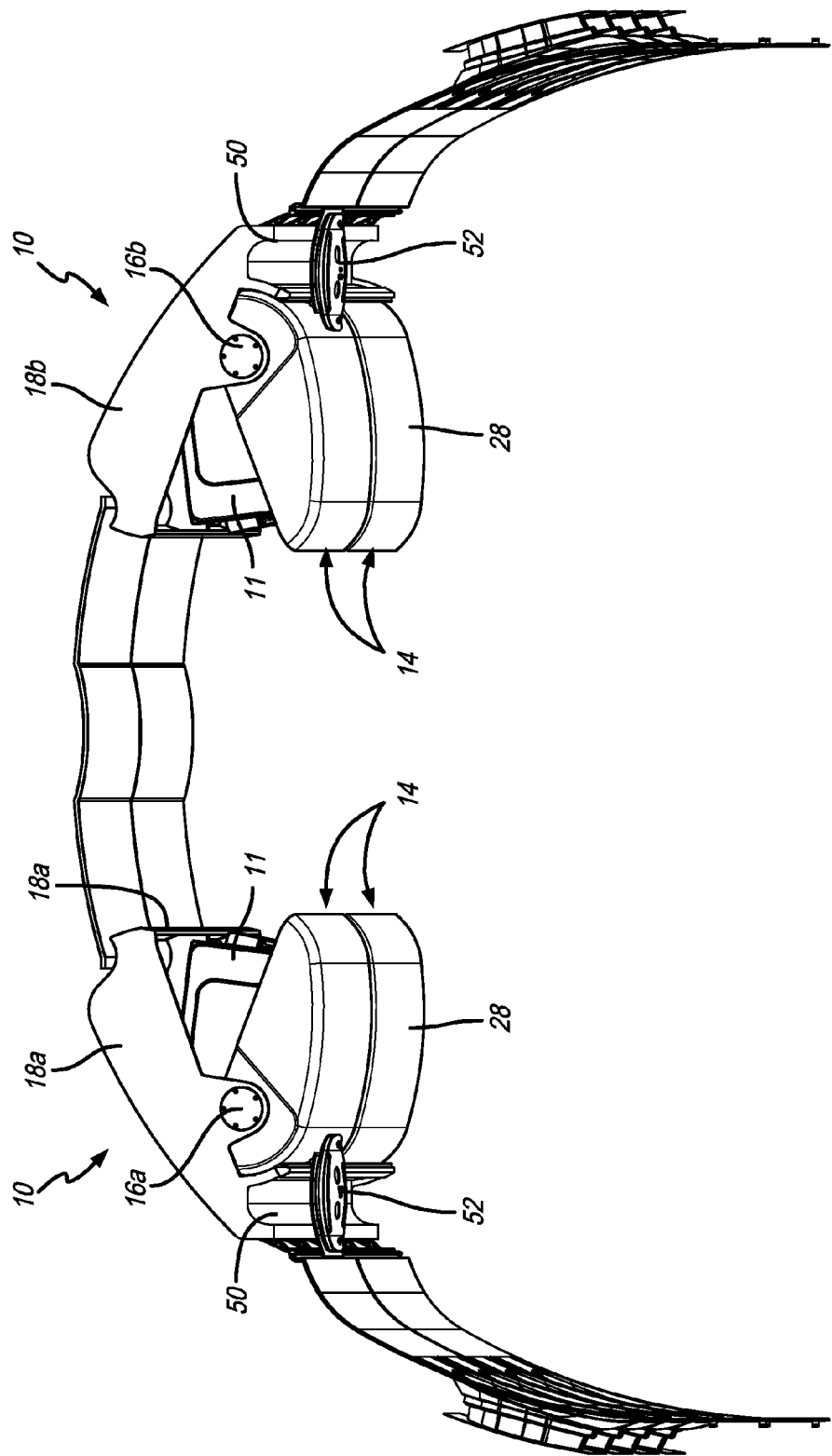
FIG. 16 is a perspective view of a portion of an aircraft cabin showing a plurality of pivot bin assemblies and PSU pods installed therein and showing an empty PSU channel.

As shown in FIGS. 1-5 and, more specifically in FIGS. 13-15, in a preferred embodiment, the pivot bin assembly 10 includes first and second latch assemblies 40*a* and 40*b* operatively associated with the first and second side panels 18*a* and 18*b* and the first and second sides 24*a* and 24*b* of the bucket 14. Preferably, the first latch assembly 40*a* includes a first hook portion 42*a* and a first striker portion 44*a* and the second latch assembly 40*b* includes a second hook portion 42*b* and a second striker portion 44*b*. In a preferred embodiment, the first hook portion 42*a* extends downwardly from the bottom edge 19*a* of the first side panel 18*a* and the first striker portion 44*a* is positioned in a first recess 41*a* defined in the top edge 25*a* of the first side 24*a* of the bucket 14 and the second hook portion 42*b* extends downwardly from the bottom edge 19*b* of the second side panel 18*b* and the second striker portion 44*b* is positioned in a second recess 41*b* defined in the top edge 25*b* of the second side 24*b* of the bucket 14.

In another embodiment, the first hook portion 42*a* extends upwardly from the top edge 25*a* of the first side 24*a* of the bucket 14 and the first striker portion 44*a* is positioned in a first recess defined in the bottom edge of the first side panel 18*a*, and the second hook portion 42*b* extends upwardly from the top edge 25*b* of the second side 24*b* of the bucket 14 and the second striker portion 44*b* is positioned in a second recess defined in the bottom edge of the second side panel 18*b*.

In another preferred embodiment, the first striker portion 44*a* extends downwardly from the bottom edge 19*a* of the first side panel 18*a* and the first hook portion 42*a* is positioned in a first recess 41*a* defined in the top edge 25*a* of the first side 24*a* of the bucket 14 and the second striker portion 44*b* extends downwardly from the bottom edge 19*b* of the second side panel 18*b* and the second hook portion 42*b* is positioned in a second recess 41*b* defined in the top edge 25*b* of the second side 24*b* of the bucket 14.

Figure 5:
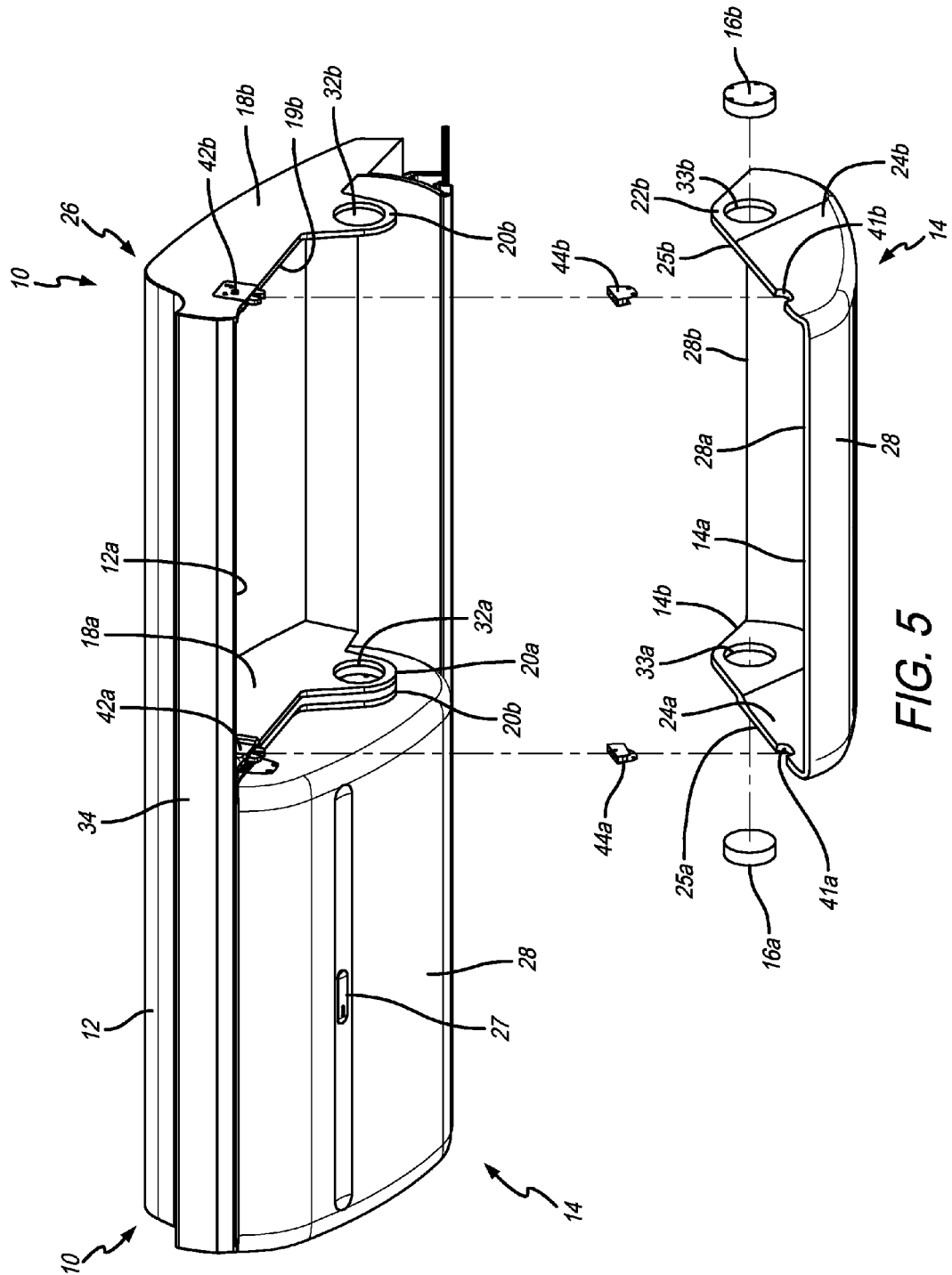
FIG. 5 is a perspective view of the pivot bin assemblies of FIG. 1 with one of the buckets exploded therefrom.

In another embodiment, the first striker portion 44*a* extends upwardly from the top edge 25*a* of the first side 24*a* of the bucket 14 and the first hook portion 42*a* is positioned in a first recess defined in the bottom edge of the first side panel 18*a*, and the second striker portion 44*b* extends upwardly from the top edge 25*b* of the second side 24*b* of the bucket 14 and the second hook portion 42*b* is positioned in a second recess defined in the bottom edge of the second side panel 18*b*. The first and second latch assemblies 40*a* and 40*b* can be actuated manually or electronically. As shown in FIG. 5, the pivot bin assembly 10 preferably includes an operating member or release button 27 disposed on the bucket 14. In a preferred embodiment, the operating member 27 comprises a switch that is in electrical communication (with wires or wirelessly) with the first and second latch assemblies 40*a* and 40*b*.

It will be appreciated that any type of latching mechanism that allows the bucket 14 to connect to the upper housing 26 is within the scope of the present invention. Furthermore, it will be appreciated that the terms first hook portion and second hook portion refer to the entire assembly secured to the upper housing in the figures. And, the terms first striker portion and second striker portion refer to the entire assembly secured to the upper housing in the figures. The hook portion can be any latching mechanism that includes a hook or latch that mates with or latches to a striker.

FIGS. 13-15 show an exemplary embodiment of the first latch assembly 40*a*. It will be understood that the second latch assembly 40*b* includes essentially the same components. FIGS. 13 and 15 show the first latch assembly 40*a* in the latched position and FIG. 14 shows the first latch assembly 40*a* in the unlatched position. Preferably, the first hook portion 42*a* is mounted in a recess 29*a* in the first side panel 18*a* and includes a housing 31*a*, a hook 35*a* and guide members 37*a* that help guide the striker 39*a* (which can be secured in place by a threaded fastener 51*a*) into the desired position. As is known in the art, the hook 35*a* can be mounted on a pivot pin and include a spring 43*a* for urging it into the desired position. Preferably the first striker portion 44*a* includes a housing 45*a* that defines a guide recess 47*a* defined therein and that is spanned by the striker 39*a*. In use, when the bucket 14 is pivoted to the closed position, the guide members 37*a* are received in the guide recess 47*a*, and, as a result of the angle on the bottom edge of the hook 35*a* and the round shape of the striker 39*a*, the hook 35*a* is pivoted out of the way and the striker 39*a* is received fully between the guide members 37*a*. As a result of the spring 43*a*, the hook 35*a* is urged into the position shown in FIG. 13, and the first latch assembly 40*a* is now in the latched position.

It will be appreciated by those skilled in the art that by the first and second hook portions 42*a* and 42*b* extending downwardly from the first and second side panels 18*a* and 18*b* and latching to first and second striker portions 44*a* and 44*b*, which are essentially embedded in the first and second sides 24*a* and 24*b* of the bucket 14 allows the top edge 14*a* of the bucket 14 (i.e., top edges 25*a* and 25*b* and front top edge 28*a* to abut the bottom edge (bottom edges 19*a* and 19*b* and front bottom edge 12*a*) of the upper housing 26. In other words, the first side panel 18*a*, the first side 24*a* of the bucket 14 and the first latch assembly 40*a* are all lined up generally vertically and the second side panel 18*b*, the second side 24*b* of the bucket 14 and the second latch assembly 40*b* are all lined up generally vertically.

The first and second latch assemblies 40*a* and 40*b* shown in the figures are not a limitation on the present invention and any type of latch assembly or mechanism for securing the bucket 14 to the upper housing 26 is within the scope of the present invention. For example, the pivot bin assembly can include a center latch that connects the bucket to the strongback.

Figure 4:
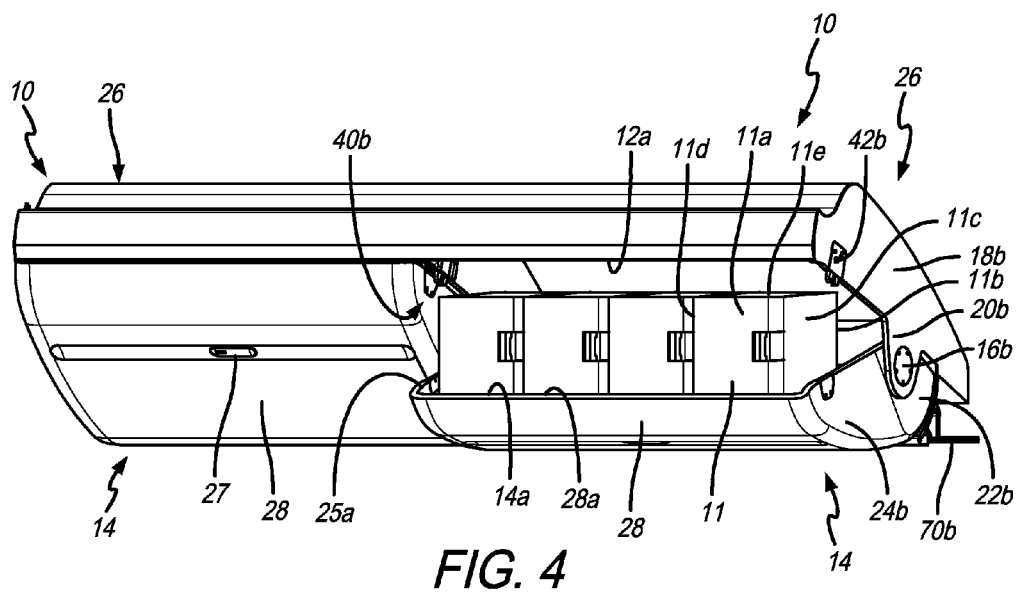
FIG. 4 is a perspective view of the pivot bin assemblies of FIG. 1 with luggage therein.

As shown in FIGS. 4, 8 and 14, the inventive pivot bin assembly 10 is designed to stow standard Travel Pro 22" bags or luggage 11 wheels first on their edge (this type of bag is referred to herein as "standard luggage"). As will be understood by those of ordinary skill in the art, storage of a maximum amount of luggage within overhead stowage bins is of utmost importance in passenger aircraft and the standard luggage discussed herein is used as an industry standard when determining the amount of cargo that will fit into overhead stowage bins. As shown in FIG. 4, a piece of standard luggage 11 includes a top 11*a*, a bottom 11*b*, a front 11*c*, a back 11*d* and two sides 11*e*. Typically, the standard luggage 11 includes wheels on the bottom 11*b* thereof. In a preferred embodiment of the present invention, a pivot bin assembly 10 can stow up to four pieces of standard luggage within the bin interior. However, this is not a limitation on the present invention. In another embodiment, the present invention can store more or less standard luggage.

In a preferred embodiment, the pivot axis A1 or pivot point provided by the first and second pivot mechanisms 16*a* and 16*b* is not along the same lengthwise axis as the luggage stored within the bin interior, but is instead non-centrally located. Furthermore, the center of gravity of the luggage in the bin interior is moved outboard when compared to the prior art and closer to the pivot axis A1, thereby making the bucket 14 easier to close. Furthermore, compared to prior art pivot bins, the pivot bin assembly 10 can be moved further outboard from the aisle, thereby providing more passenger space and an open cabin feel. However, none of the statements that include comparisons to the prior art are intended to be a limitation on the present invention.

Figure 19A:
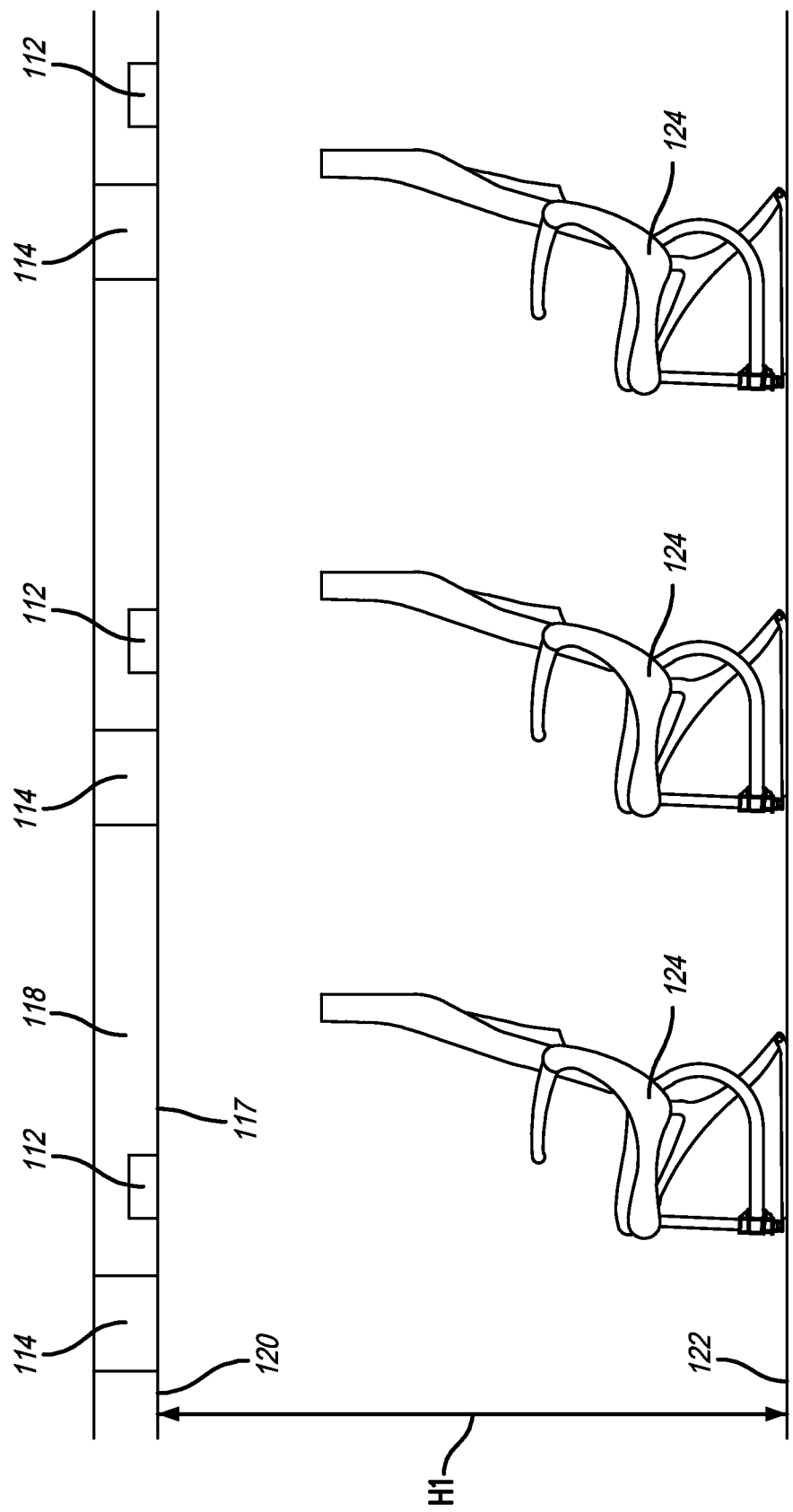
FIG. 19A is a side schematic view of a portion of a prior art aircraft showing a series of seats with the passenger components and system components located thereabove in the PSU channel.
Figure 19B:
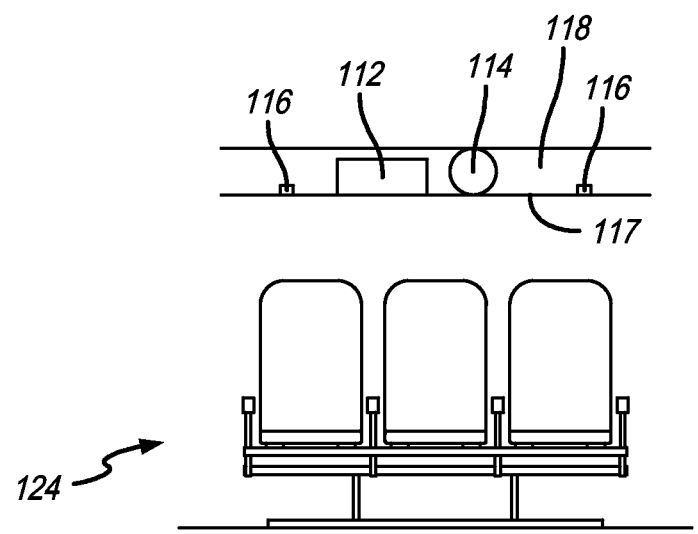
FIG. 19B is an end schematic view of a portion of a prior art aircraft showing a series of seats with the passenger components and system components located thereabove in the PSU channel.

With reference to FIGS. 19A-19B, as will be appreciated by those of ordinary skill in the art, passenger aircraft typically include what is referred to as a passenger service unit ("PSU"), which is situated generally above each seat row (although not typically at the same pitch with respect to each seat row) in the overhead panel above the passenger seats in the cabin of airliners. Amongst other things a PSU contains reading lights, loudspeakers, illuminated signs and automatically deployed oxygen masks and also gaspers providing conditioned air. Passenger service units typically include individual PSU panels 117 that are specialized for each function (e.g., speaker panels, reading light panels, spacer panels, etc.) and that are positioned on rails 116 that run the length of the interior of the cabin. These individual functional specific panels are then configured to meet the aircraft and passenger needs, typically resulting in the configuration and installation of three hundred or more specialized panels. These panels 117 are installed within and cover a PSU channel 118 that is filled with both passenger elements 112 (e.g., reading lights, gaspers, flight attendant buttons, etc.) and systems elements 114 (wiring, oxygen tanks/components, cabin lights and associated electronics, ducting, etc.) creating a ceiling 120 above the passenger that restricts\bounds the passenger's head room. As shown in FIG. 19A, there is a fixed distance or height H1 from the floor 122 to the "ceiling" 120.

Figure 17A:
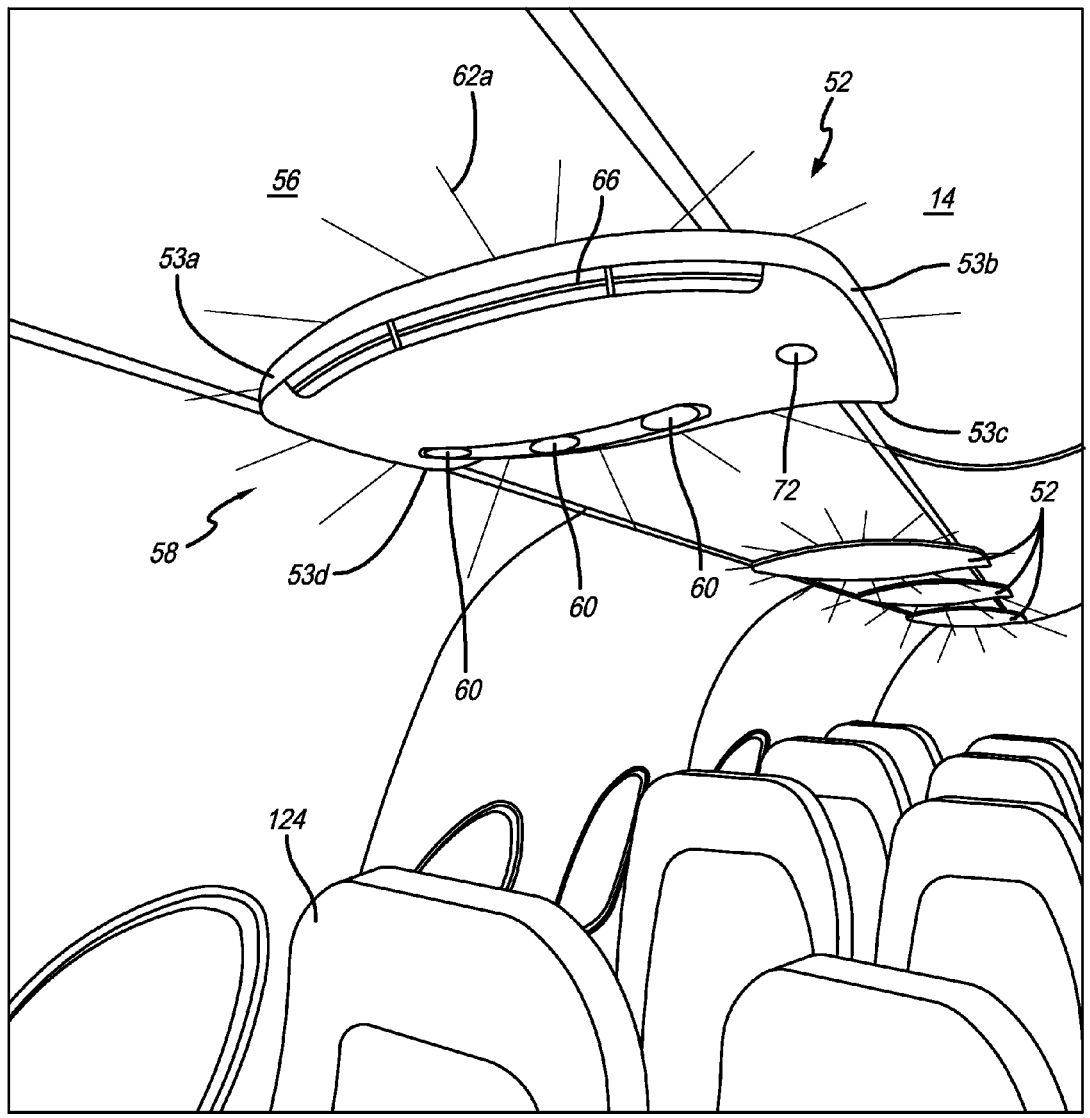
FIG. 17A is a perspective view of the interior of an aircraft showing a series of PSU pod assemblies installed therein with cabin lighting shining upwardly.
Figure 17B:
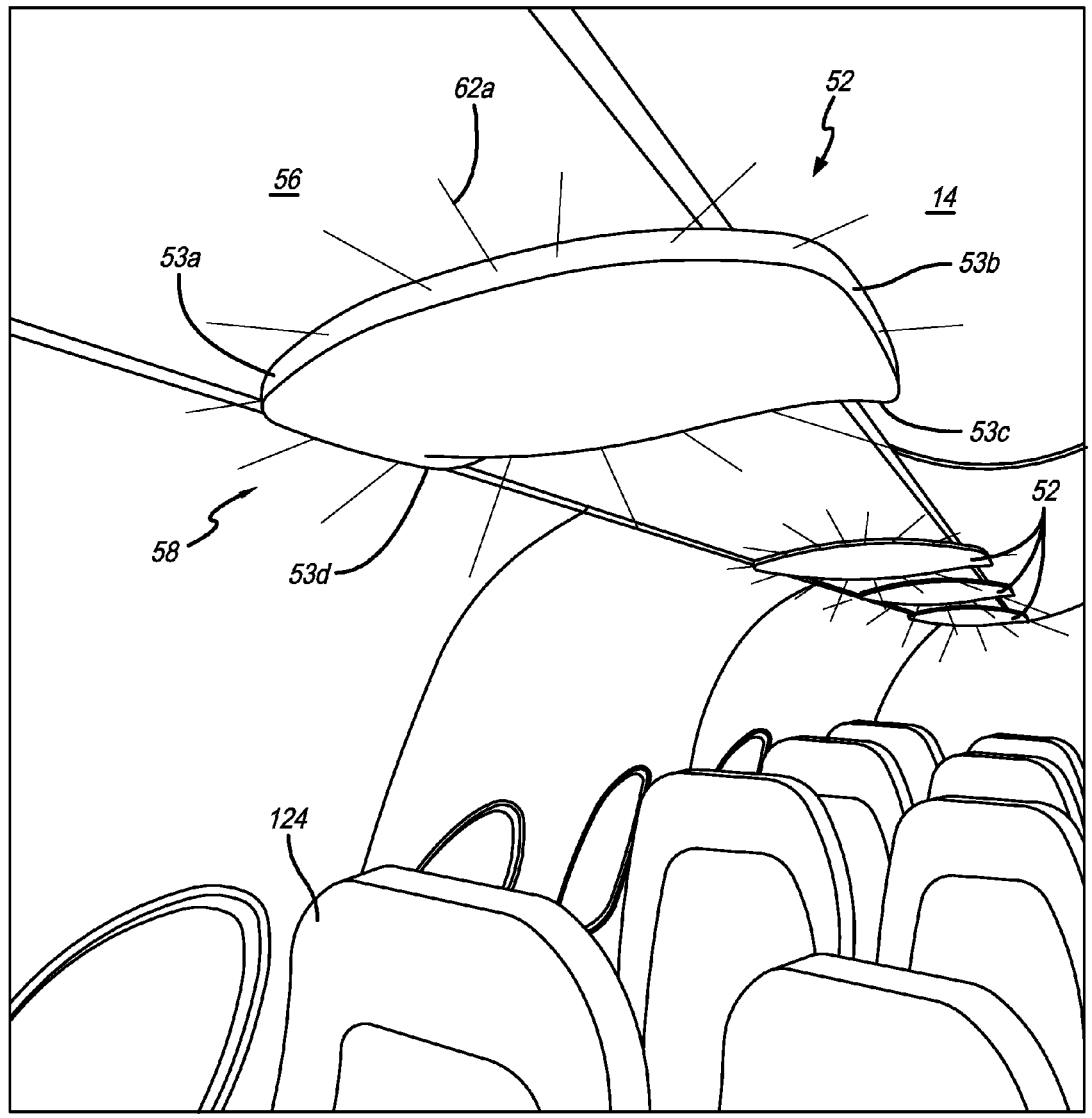
FIG. 17B is a perspective view of the interior of an aircraft showing a series of PSU pod assemblies installed therein with cabin lighting shining outwardly.
Figure 17C:
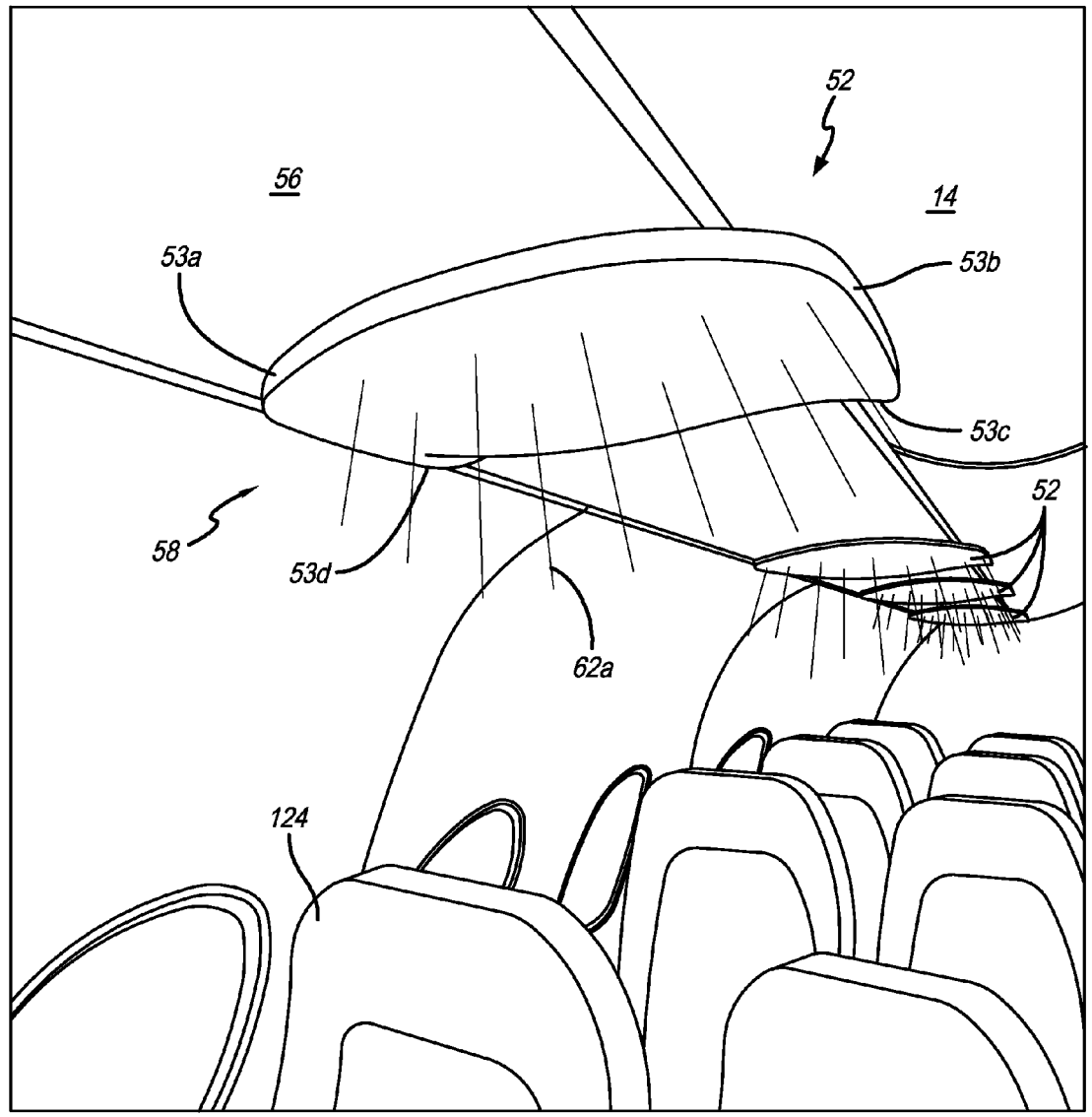
FIG. 17C is a perspective view of the interior of an aircraft showing a series of PSU pod assemblies installed therein with cabin lighting shining downwardly.
Figure 18:
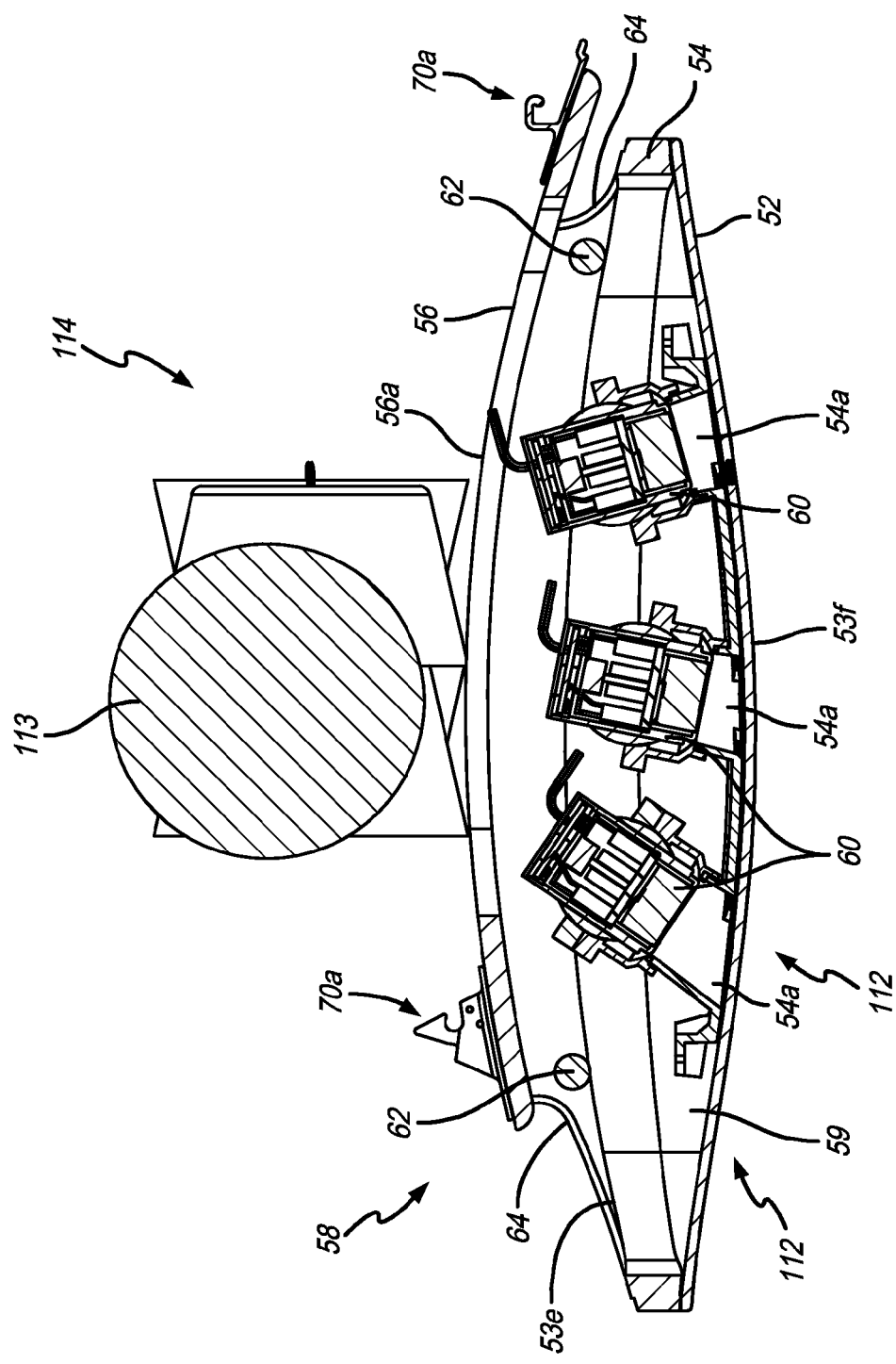
FIG. 18 is a cross-sectional view of a PSU pod assembly and showing the passenger components and system components.

With reference to at least FIGS. 16-20B, in a preferred embodiment, the pivot bin assembly 10 includes an integrated PSU channel 50 and a PSU pod 52 for each passenger row. As discussed above, aircraft PSUs typically include two types of elements: passenger elements 112 (reading lights, gaspers/air vents and flight attendant call buttons) and systems elements 114 (wiring, oxygen tanks 113/components, cabin lights and associated electronics, ducting, etc.). As shown in FIG. 18, the PSU pod 52 provides a way to at least partially separate the passenger element bundle 112 for each row from the systems elements bundle 114 for each row. By separating the passenger elements 112 from the systems elements 114 that are typically installed in a PSU, a PSU pod 52 (for the passenger elements 112) is configured or positioned independent of the systems elements 114, which are positioned in the PSU channel 50. As shown in FIGS. 18 and 20A, in a preferred embodiment, the passenger elements bundle 112 is positioned below the systems elements bundle 114. It will be appreciated that in another embodiment of the invention, the PSU pod 52 and PSU pod assembly 58 can be used with overhead bins different than the clamshell design described herein. For example, the PSU pod assembly 58 can be used with other types of pivot bins or an overhead stowage bin that is fixed but includes a pivotal door. The PSU pod assembly can be used with any overhead stowage bin that includes an enclosure for luggage and a PSU channel formed integrally therewith.

In a preferred embodiment, the PSU pod 52 preferably includes a housing 54 that includes first, second, third and fourth sides 53*a*, 53*b*, 53*c* and 53*d*, a top 53*e* and a bottom 53*f* that cooperate to define a pod interior 59, a plurality of reading lights 60 (that are aligned with and either extend through or shine light through reading light openings 54*a*), cabin lighting 62, a lens assembly 64 and a vent or gasper 66 defined in the housing for gasping conditioned air. It will be appreciated that the housing can be circular, ovular or elliptical in shape. For purposes of this disclosure, these shapes are considered to have first, second, third and fourth sides. In a preferred embodiment, the PSU pod 52 is part of a PSU pod assembly 58 that includes a panel 56 that has connectors 70*a* (such as hooks), that mate with rails or connectors 70*b* that are a part of the strongback 12 and extend in a direction that is generally parallel to the axis of the aircraft. In the figures, "70" is used to designate the connection between 70*a* and 70*b*. It will be appreciated that any type of connection, such as hooks, rivets, threaded fasteners, magnets, snap fit arrangements or any other method of securing the panels 56 and PSU pod 52 to the upper housing 26 or strongback 12 is within the scope of the present invention. The PSU pod 52 is connected to and extends or hangs downwardly from the panel 56, thereby creating the PSU pod assembly 58. In another embodiment, the panel can be omitted and the PSU pod itself can be connected to the rails 70*b*. When installed in an aircraft, wires for electrical connection (to both the reading lights 60 and the cabin lighting 62) and ducting for the gasper(s) 66 extends from the PSU channel 50 through an opening 56*a* (or openings) in the panel 56 and down into the housing 54. The PSU pod 52 can include a flight attendant call button 72 thereon.

As discussed above, in a preferred embodiment, the PSU pod assembly 58 also includes cabin lighting 62 that is associated with the PSU pod 52. The cabin lighting 62 can be any type of lighting (e.g., LEDs, incandescent, halogen, etc.) and can be positioned within or on housing 54. In a preferred embodiment, the PSU pod assembly 58 also includes a lens assembly 64 that helps direct light that shines from the cabin lighting 62 as desired. As is best shown in FIG. 17A, the light 62*a* from the cabin lighting 62 shines from the top of the PSU pod 52 and washes along and down the panels 56, bucket 14 and sidewalls, etc. of the aircraft. As a result of this arrangement, in a preferred embodiment, the PSU pods 52 provide passenger specific reading lights 60 that shine generally downwardly and outwardly and row specific cabin lighting that shines generally upwardly and outwardly. FIG. 17B shows another embodiment, where the reading lights, vent and flight attendant call button are omitted and the PSU pod 52 includes cabin lighting shining out the first, second, third and fourth sides 53*a*-53*d*. FIG. 17C shows another embodiment, where the reading lights, vent and flight attendant call button are omitted and the PSU pod 52 includes cabin lighting shining out the bottom of the housing 54. These embodiments can also include the reading lights, vent and flight attendant call button. These embodiments all create cabin lighting specifically for each row by positioning the cabin lighting on or in the PSU pods 52.

Figure 20A:
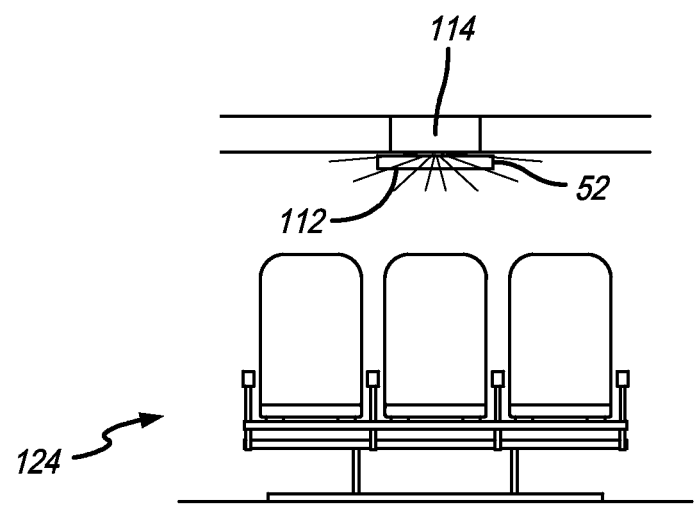
FIG. 20A is an end schematic view of a portion of an aircraft showing a series of seats with the passenger components and system components located thereabove.
Figure 20B:
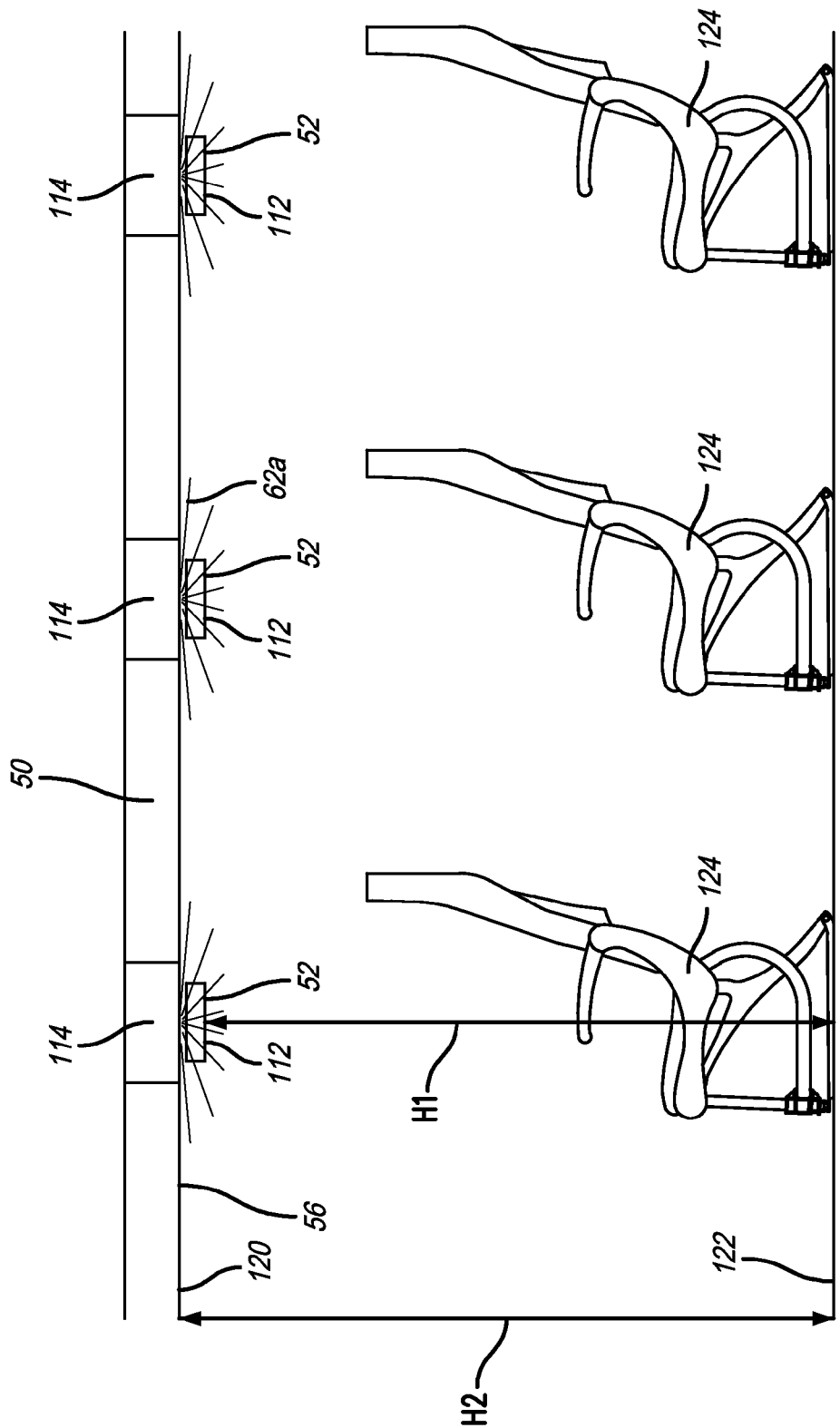
FIG. 20B is a side schematic view of a portion of an aircraft showing a series of seats with the passenger components and system components located thereabove.

With reference to FIGS. 20A-20B, as discussed above, generally, in the present invention, a passenger element bundle 112 is included in each PSU pod 52 and the systems elements 114 are disposed within the PSU channel 50 or at some other position above the ceiling defined by either the overhead bins or the panels 56 used to hide the systems elements 114. It will be understood that the systems elements 114 include both row specific elements (e.g., oxygen tanks/masks) and non-row specific elements (air ducts, electrical wiring, etc.). These elements are shown schematically in FIGS. 19A-20B as a box or bundle. However, it will be appreciated by those skilled in the art, that systems elements 114 can be located at any position along the PSU channel 50. In a preferred embodiment, the systems elements 114 are stacked generally above the PSU pod 52 and the passenger elements 112. In other words, the PSU pod 52 is positioned below the PSU channel 50 that houses the systems elements 114. However, as discussed above, not all systems elements 114 will be positioned directly above the passenger elements 112 or PSU pod 52. In other words, the passenger elements 112 or PSU pod 52 or located at a first level and the systems elements 114 are located at a second level or height that is higher than the passenger elements 112 or PSU pod 52.

The PSU pod 52 changes the configuration and installation methodology of the prior art by using a row specific design and a completed channel 50 built in to and defined within the pivot bin assembly 10. Compared to the prior art, this helps eliminate or reduce unnecessary spacer panels. In a preferred embodiment, each PSU pod 52 has the same pitch or alignment with respect to each row of seats 124. It will be appreciated that the positioning of the PSU pod assembly 58 can be adjusted as a result of the connection 70 between the connectors 70a and the rails 70b. In other words, the PSU pod assembly 58 can slide fore or aft on the rails 70b. Furthermore, by reducing the number of components in the PSU channel, the height of the panels can be raised (compared to the prior art), to a height H2, that is greater than the height H1 in a similar prior art aircraft. Furthermore, although the PSU pod 52 extend downwardly below the panels 56, in a preferred embodiment, it can be positioned at a height H1 that is the same or similar to the height of the prior art ceiling 120/panel 117 height. This allows the PSU pod 52 to be positioned such that the height H2 provides more passenger space or headroom than the prior art and positions the PSU pod 52 and the elements therein or thereon (e.g., reading lights, vents, cabin lighting, etc.) at a consistent position or pitch for each row of passengers. In other words, passenger headroom height between PSU pods 52 is increased when compared to the prior art. However, the positioning of the PSU pod 52 is not a limitation on the present invention. In another embodiment, they can be positioned lower than the prior art height H1 and/or they can be positioned such that they have a different pitch than each row.

In another embodiment, the cabin lighting can be omitted or more or less reading lights can be included. The switches or buttons for the reading lights 60 can be positioned on the PSU pod 52 or elsewhere within reach of the passenger for which each reading light 60 is intended. In a preferred embodiment, the reading lights 60 are controlled by the passengers seated in the row for which the PSU pod 52 is designated and the cabin lighting 62 is controlled by the crew from a location remote from the passengers.

With reference to FIG. 8, in a preferred embodiment, the pivot bin assembly 10 includes an environmental control system ("ECS") that includes ducting and electrical. In a preferred embodiment, the strongback 12 serves as the enclosure of the ECS ducting. As discussed above, at least a portion of the ECS components are positioned in the PSU channel 50. However, the pivot bin assembly 10 can also include at least one further separate ECS channel 74. Electrical wire harnesses can be directly attached to the pivot bin assembly 10 instead of the aircraft for an easier and cleaner installation, when compared to the prior art. However, the ECS channel can be omitted and the ducting, electrical, etc. can be connected to the aircraft in another embodiment.

With reference to FIGS. 21-34, another embodiment of a pivot bin assembly 140 is shown. Pivot bin assembly 140 is similar to the pivot bin assembly 10 shown in FIGS. 1-16, however, the ears and corresponding indented portions are omitted and are replaced with clevis assemblies 142a and 142b that pivotally connect the upper housing 26 and the bucket 14. In other words, instead of integral ears extending downwardly from the upper housing, the clevis assemblies 142a and 142b (together with the pivot axles 16a and 16b) provide the pivotal connection of the bucket to the upper housing. It will be appreciated that most of FIGS. 22-34 do not include latch assemblies. However, the latch assemblies described above and shown in connection with pivot bin assembly 10 can be used with pivot bin assembly 140. In another embodiment, other latching mechanisms can be used.

Figure 21:
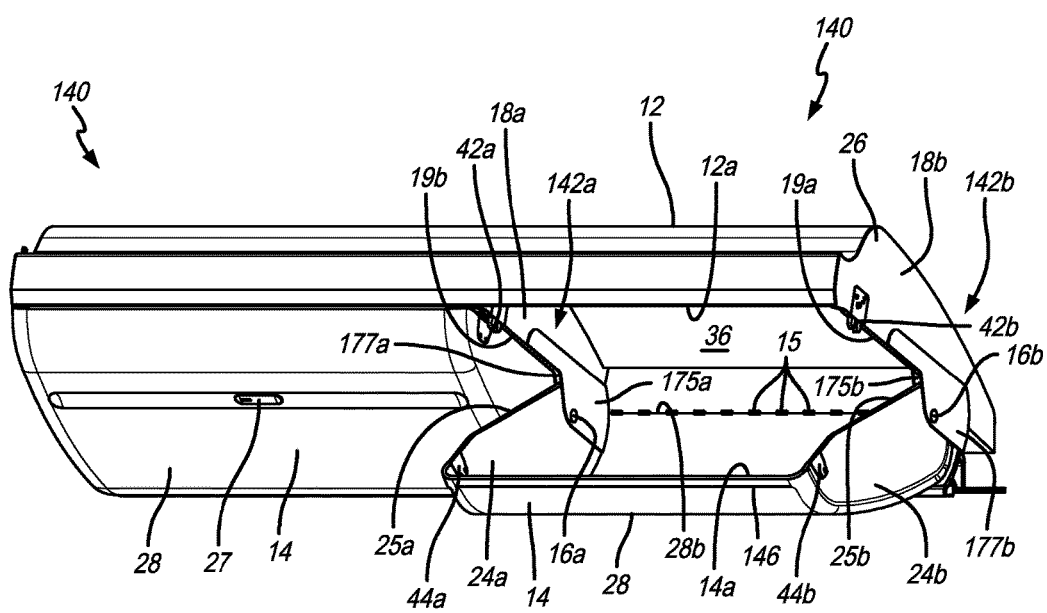
FIG. 21 is a perspective view of two pivot bin assemblies in accordance with another preferred embodiment of the present invention showing a first pivot bin assembly in an open position and a second pivot bin assembly in a closed position.

As shown in FIG. 21, pivot bin assembly 140 generally includes strongback 12, a tray or bucket 14 (or buckets) with a first and a second pivot mechanism or pivot axle 16a and 16b on each side, and first and second side panels 18a and 18b and first and second clevis assemblies 142a and 142b. With respect to each pivot bin assembly 140, the strongback 12 and first and second side panels 18a and 18b are referred to herein together as the upper housing 26. Generally, the pivot bin assembly 140 includes the upper housing 26, which includes the strongback 12 and the first and second side panels 18a and 18b, and the bucket 14. The bucket 14 and upper housing 26 cooperate to define a bin interior 36. In a preferred embodiment, the bucket 14 defines the lower portion of the bin interior 36 and the upper housing defines the upper portion of the bin interior 36. As shown in FIG. 21, in a preferred embodiment, the pivot bin assembly 140 includes a plurality of stop members 15 positioned on the strongback 12 and the bucket 14 that stop the bucket 14 from opening further than the preferred opening position (described below). In another embodiment, the stop members 15 can be a long strip that spans most or all of the back of the bucket 14 (see FIGS. 33-34). In another embodiment, the stop members 15 can be located elsewhere.

In the embodiment shown in the figures, the strongback 12 and first and second side panels 18a and 18b are separate components. However, in another embodiment, the strongback 12 and first and second side panels 18a and 18b (the upper housing 26) can be a unitary component. In a preferred embodiment, the pivot bin assembly 140 includes a single piece bucket 14 that includes a bottom 28 and first and second opposing sides 24a and 24b. In another embodiment, the bucket 14 can include multiple pieces, e.g., a three piece design that includes the bottom 28 and first and second opposing sides 24a and 24b as separate components. Similar to the embodiments described above, it will be appreciated by those of ordinary skill in the art that the bucket 14 and upper housing 26 provide a "clamshell design," where at least a portion of the bottom edge 19a of the first side panel 18a and the bottom edge 19b of the second side panel 18b meet edge to edge with or abut one another and the front bottom edge 12a of the strongback 12 meets edge to edge with or abuts the top edge 14a of the bucket 14. In a preferred embodiment, in the closed position, other than the rear top edge 28b of the bottom 28 of the bucket 14 and the area adjacent thereto and the strongback 12, there is little to no overlap between the bucket 14 and the upper housing 26. In other words, in a preferred embodiment, the bucket 14 does not enter the upper portion of the bin interior 36, which is defined by the upper housing 26, when the bucket 14 is pivoted to the closed position.

When the bucket 14 is pivoted to the closed position, the first and second sides 24a and 24b of the bucket 14 are not received in the upper portion of the bin interior 36. In other words, the first top edge 25*a* of the first side 24*a* of the bucket 14 does not pass or overlap with the first bottom edge 19*a* of the first side panel 18*a* when the bucket 14 is pivoted to the closed position. And, the second top edge 25*b* of the second side 24*b* of the bucket 14 does not pass or overlap with the second bottom edge 19*b* of the second side panel 18*b* when the bucket 14 is pivoted to the closed position. Preferably, the first top edge 25*a* abuts the first bottom edge 19*a*, and the second top edge 25*b* abuts the second bottom edge 19*b*. However, an embodiment is possible where the first and second top edges 25*a* and 25*b* and first and second bottom edges 19*a* and 19*b* or the front bottom edge 12*a* of the strongback 12 and front top edge 28*a* of the bucket 14 are horizontally separated from one another, but, in a vertical direction, the first and second top edges 25*a* and 25*b* do not pass or overlap with the first and second bottom edges 19*a* and 19*b* and/or the front bottom edge 12*a* and front top edge 28*a* do not pass or overlap when the bucket 14 is pivoted to the closed position.

As shown in FIGS. 21-34, first and second side panels 18*a* and 18*b* include first and second clevis assemblies 142*a* and 142*b* that house first and second pivot mechanisms 16*a* and 16*b* together with other components as described below. Generally, first and second pivot mechanisms 16*a* and 16*b* are operatively associated with the bucket 14, and allow the bucket 14 to pivot with respect to the upper housing 26 between an open position and a closed position. It will be appreciated that the first and second pivot mechanisms 16*a* and 16*b* or axles define a pivot axis. In a preferred embodiment, the first and second pivot mechanisms 16*a* and 16*b* are axially aligned.

Figure 22:
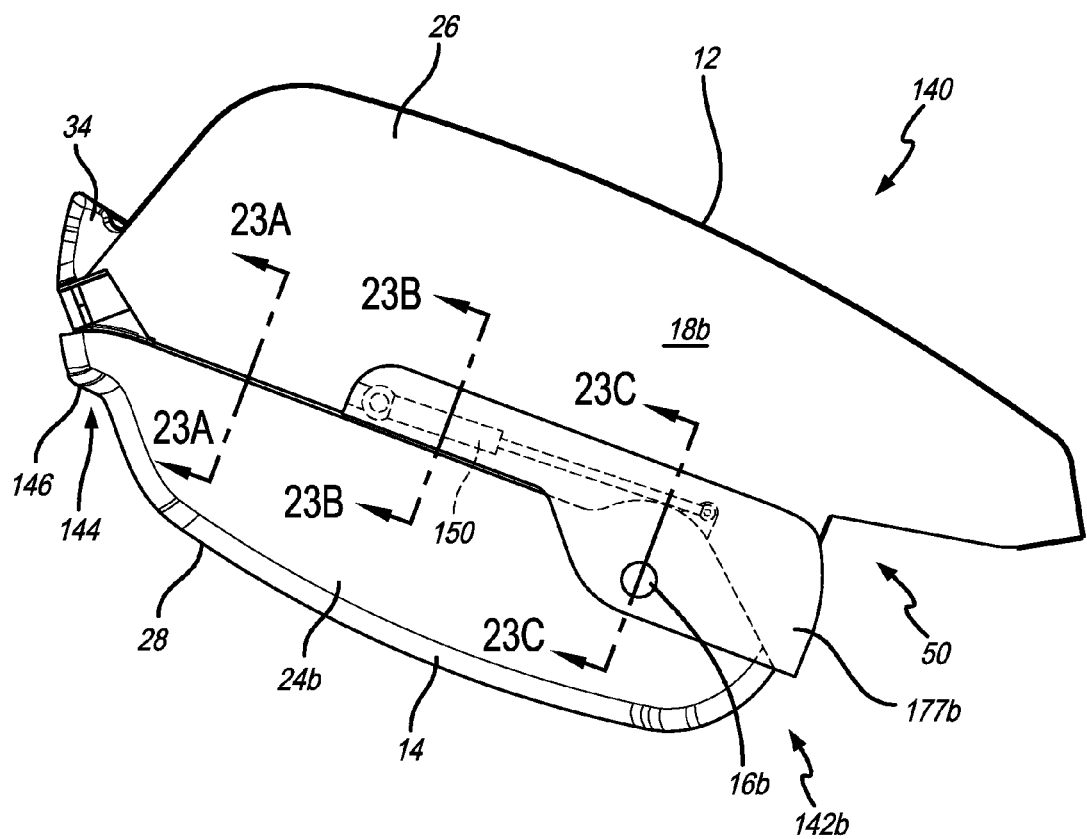
FIG. 22 is a side elevational view of the pivot bin assembly of FIG. 21 with the bucket in the closed position.

As shown in FIGS. 21-22, in a preferred embodiment, pivot bin 140 includes a connecting unit 150 (described more fully below) on each side thereof, that, together with first and second pivot bin mechanisms 16*a* and 16*b* are housed within clevis assemblies 142*a* and 142*b*. First and second clevis assemblies 142*a* and 142*b* are connected to the first and second side panels 18*a* and 18*b* and extend downwardly to surround a portion of the sides first and second sides 24*a* and 24*b* of bucket 14. In this embodiment, the pivot axles 16*a* and 16*b* are essentially the clevis pins and the clevis is comprised of an inner plate 175 and an outer plate 177 that each include an opening 179 therein, through which the pivot axle/pin 16 extends.

Figure 23C:
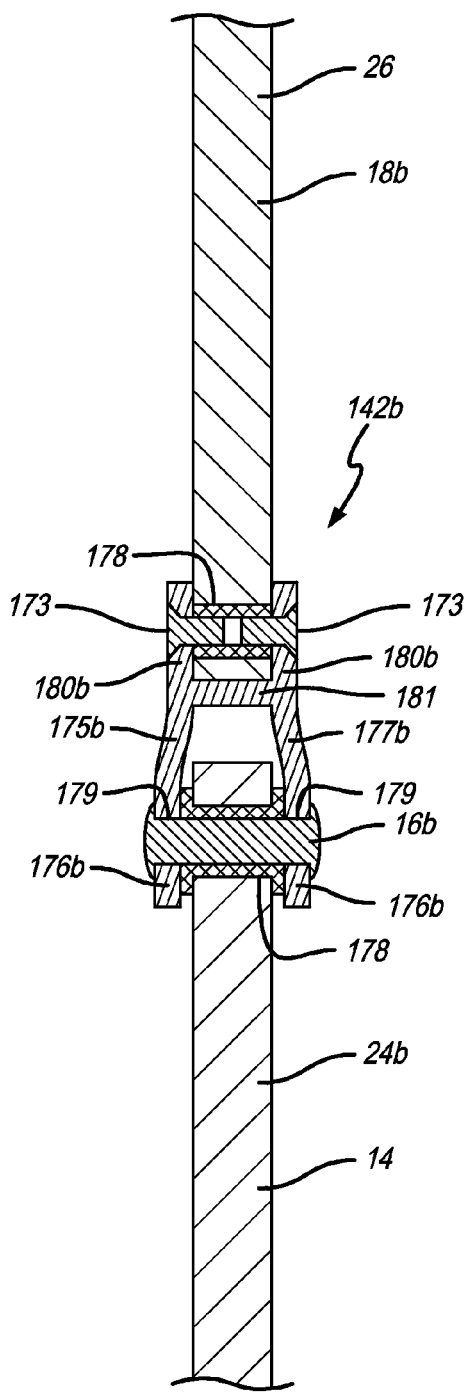
FIG. 23C is a cross-sectional view taken along line 23C-23C of FIG. 22.

With reference to FIG. 23C, pivot axle 16*b* extends through lower arms 176*b* of the clevis assembly 142*b*, which, together with the clevis assembly and pivot axle on the other side of the bucket 14 provide a pivotal connection between the upper housing 26 and the bucket 14. The first and second clevis assemblies 142*a* and 142*b* can be connected to the upper housing 26 and bucket 14 by fasteners, threaded fasteners, bonding or the like. In another embodiment, the clevis assemblies 142*a* and 142*b* are integral with the upper housing 26. In another embodiment, the clevis assemblies can be integral with the bucket 14 or can be attached/secured to the bucket and the pivot axles can extend through the upper housing. As shown in FIG. 23C, in a preferred embodiment, second clevis assembly 142*b* includes threaded fasteners 173 that extend into a bushing 178 positioned in an opening in the side 18*b*. Pivot axle 16*b* can also extend through a bushing 178 positioned in openings 179 in the inner and outer plates 175 and 177 and an opening 182 in the side of the bucket 14. In another embodiment, bushing 178 can be omitted. It will be appreciated that the clevis assemblies 142*a* and 142*b* (and the inner and outer plates 175 and 177 thereof) can each be a unitary structure or they can be a plurality of plates that together form the clevis assembly. As shown in FIG. 23C, the clevis assembly can include a horizontal plate 181 that connects the inner and outer plates 175 and 177. In another embodiment, the pivot axle can be unitary with or secured to the inside surfaces of the inner and outer plates/lower arms or at least one of the inner or outer plates/lower arms. In another embodiment, the clevis assemblies can include a single inner or outer plate that extends between and is secured to the upper housing and the bucket.

Figure 23D:
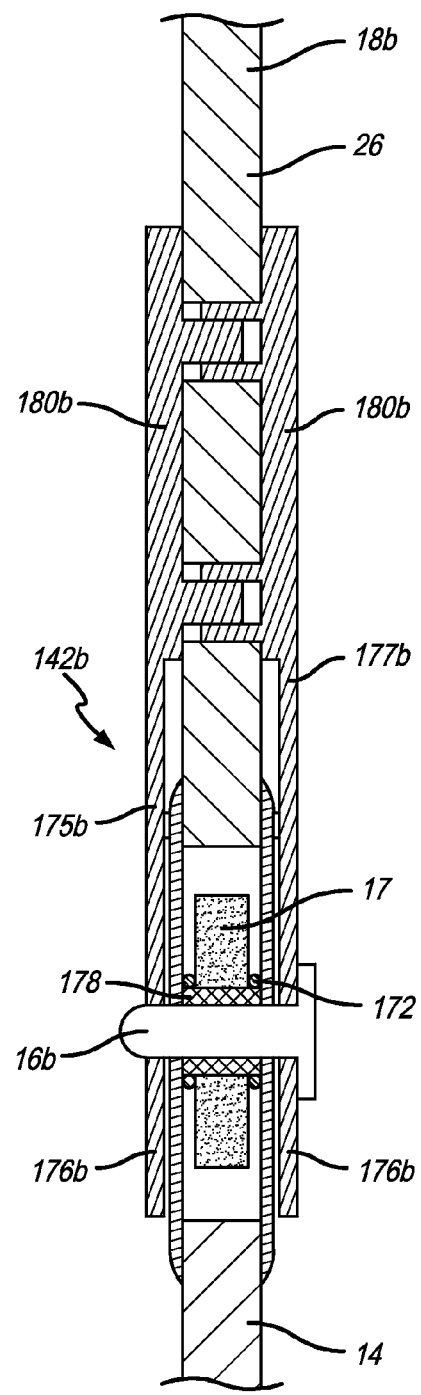
FIG. 23D is a cross-sectional view taken along the same line as 23C-23C of FIG. 22 and showing an embodiment that includes a rotary damper and coil spring.

As shown in FIG. 23D, in an embodiment that includes the rotary damper 17 and/or an assist spring 172 (described below), these components are also housed within the clevis assembly 142*b*. FIG. 23D also shows clevis assembly 142*b* including connectors that are unitary with the inside surface of upper arms 180*b* of the clevis.

In a preferred embodiment, the pivot bin assembly 140 includes a system that provides a user with assistance in closing an open bucket 14 with a predetermined minimal amount of force, and may also provide the means for a fully loaded closed bucket 14 to open in a controlled manner (damped). This can be accomplished in several ways. FIGS. 24-30 show a preferred embodiment for providing these features. Within the aircraft industry certain dimensions, weights, forces and other measurements, etc. are required or desired for opening and closing overhead bins and for the forces necessary for particular sized men and women to close the bins. Such considerations are taken into account in the description herein. However, it will be appreciated that the particular numbers, measurements, dimensions, etc. set forth herein are only exemplary and not limiting on the present invention.

Figure 24:
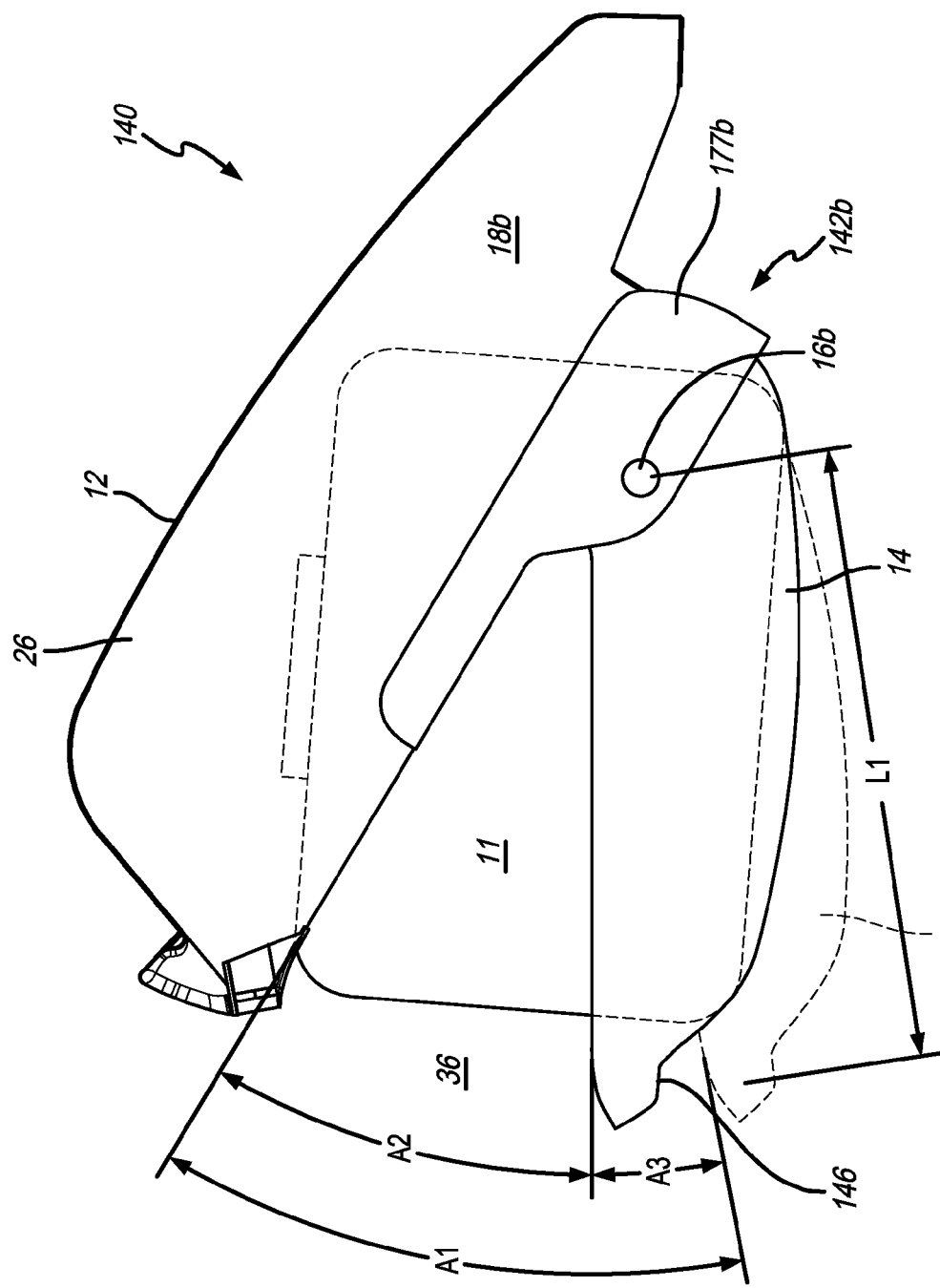
FIG. 24 is a side elevational view of the pivot bin assembly of FIG. 21 with the bucket shown in solid lines in the intermediate open position and the bucket shown in dashed lines in the open position.

FIG. 24 shows a side view of pivot bin assembly 140 in the open position. Two different open positions for the bucket 14 are shown. This is referred to herein as a two stage opening bucket or bin. The position shown in the solid lines is the bucket 14 in the open position when the pivot bin is empty (referred to herein as the "intermediate open position"). The position shown in dotted lines is the bucket 14 in the open position when the pivot bin is loaded beyond a predetermined weight (referred to herein as the "open position"). The bucket 14 can open fully to a certain angle or arc, which is shown in FIG. 24 as A1. When the bucket 14 is open to A1, it is in the open position (stop members 15 maintain the bucket 14 in the open position). When the bucket 14 is in the intermediate open position (which is a resting position, not just a position taken as a "snapshot" while the bin is opening) it has moved through an angle or arc labeled A2 in FIG. 24. The angle or arc between the intermediate open position and the open position is shown as A3 in FIG. 24. In an exemplary embodiment, A1 is 42°, A2 is 31° and A3 is 11°. However, these angles are not a limitation on the invention. For example, in another exemplary embodiment, A1 can be between 30° and 60°, A2 can be between 20° and 40° and A3 can be between 5° and 20°. An assist spring or springs can be used to hold the bucket 14 in the intermediate open position, as will be described further below. In another embodiment, the two stage opening can be omitted and the bucket 14 can open all the way through arc A1 when opened.

In a preferred embodiment, the bin is damped when opened. This prevents the bucket 14 from slamming open as a result of gravity. Damping can be provided in several ways, as described below.

In a preferred embodiment, a closing assist force is provided along at least a portion of the closing arc of the bucket 14 (shown as an exemplary A3 in FIG. 24). As a result, when the bucket 14 is empty, the bucket 14 will be positioned in the intermediate open position. However, when the bucket 14 is loaded with a predetermined weight of luggage or when a user pulls down with enough force to overcome the spring force, the bucket 14 will be positioned in the open position. When a user pushes to close the bucket 14, the closing assist force created by the preloaded spring will help along arc A3, which is the portion of the closing arc that requires the most force by a user.

As is shown in FIGS. 24-27, in a preferred embodiment, pivot bin assembly 140 also provides a closing channel 144 that defines a closing surface 146 that when contacted or pushed by a user defines a closing point lever arm L1. In the prior art, oftentimes, a user places their hand somewhere in the middle of a pivot bin in an attempt to close it. However, in the present invention, with the closing channel 144 defined in the bucket 14, a user will be inclined to press on the closing surface 146 to close the bucket 14. The closing surface 146 is located on the bucket 14 at an area that is relatively far from the pivot point, therefore providing a longer closing point lever arm L1 (than if a user places their hand in the middle of the bucket). This makes it easier for the user to close the bucket 14 than if they pushed on the bucket 14 at a point closer to the pivot point. When the bucket 14 is in the intermediate open position or (fully) open position, the closing surface 146 is also oriented such that the application of the closing force on the closing surface 146 by a user will generally be in line with the closing motion of the bucket 14 (see arrow F1 in FIG. 27). This positioning and orientation of the closing surface 146 helps ensure that the user pushes at an efficient point, which generally is a point far from the pivot point and close to perpendicular of the lever arm.

Figure 25A:
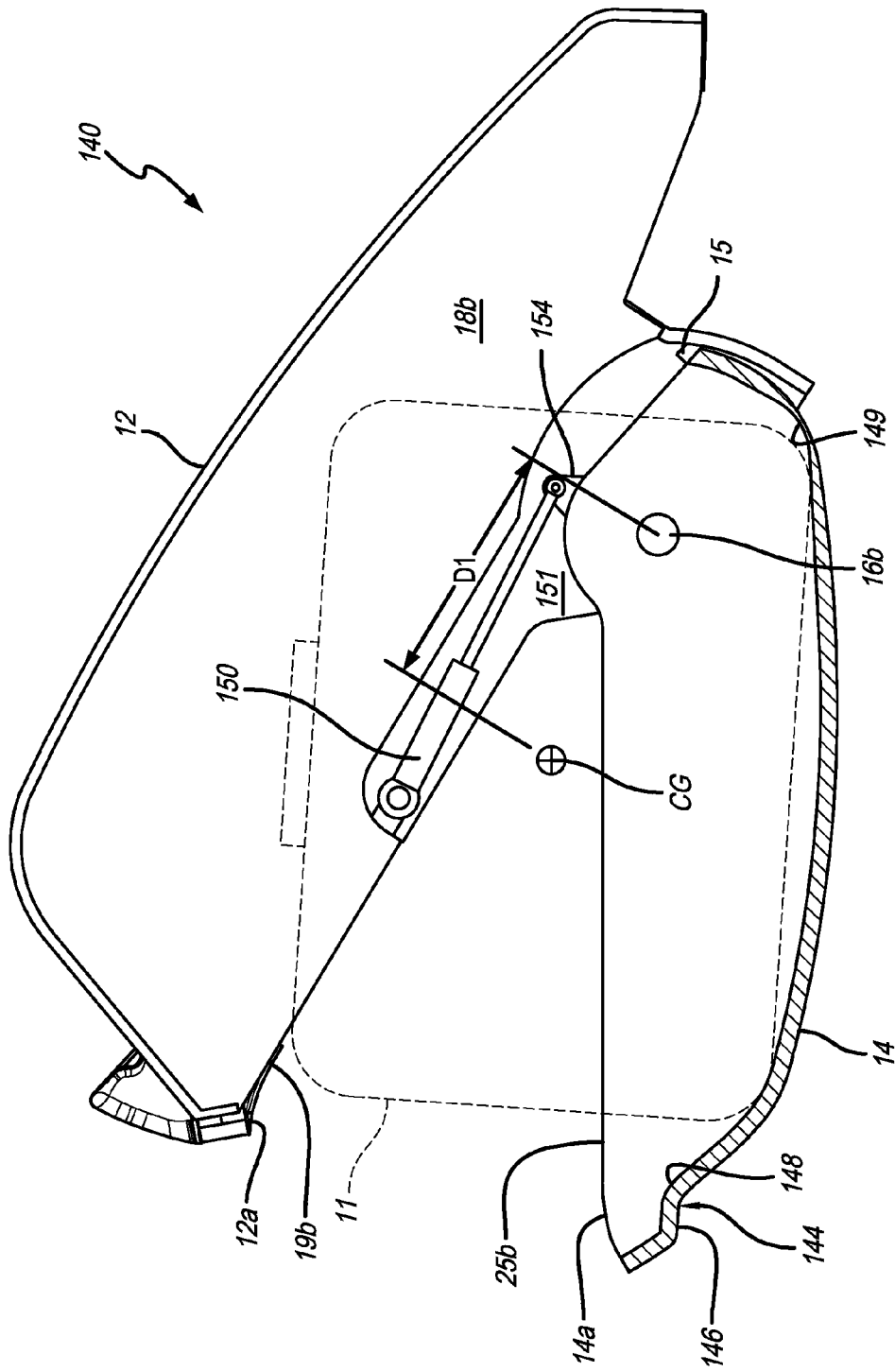
FIG. 25A is a side elevational view of the pivot bin assembly of FIG. 21 with the bucket in cross-section and in the open position and the inner and outer plates removed.
Figure 25B:
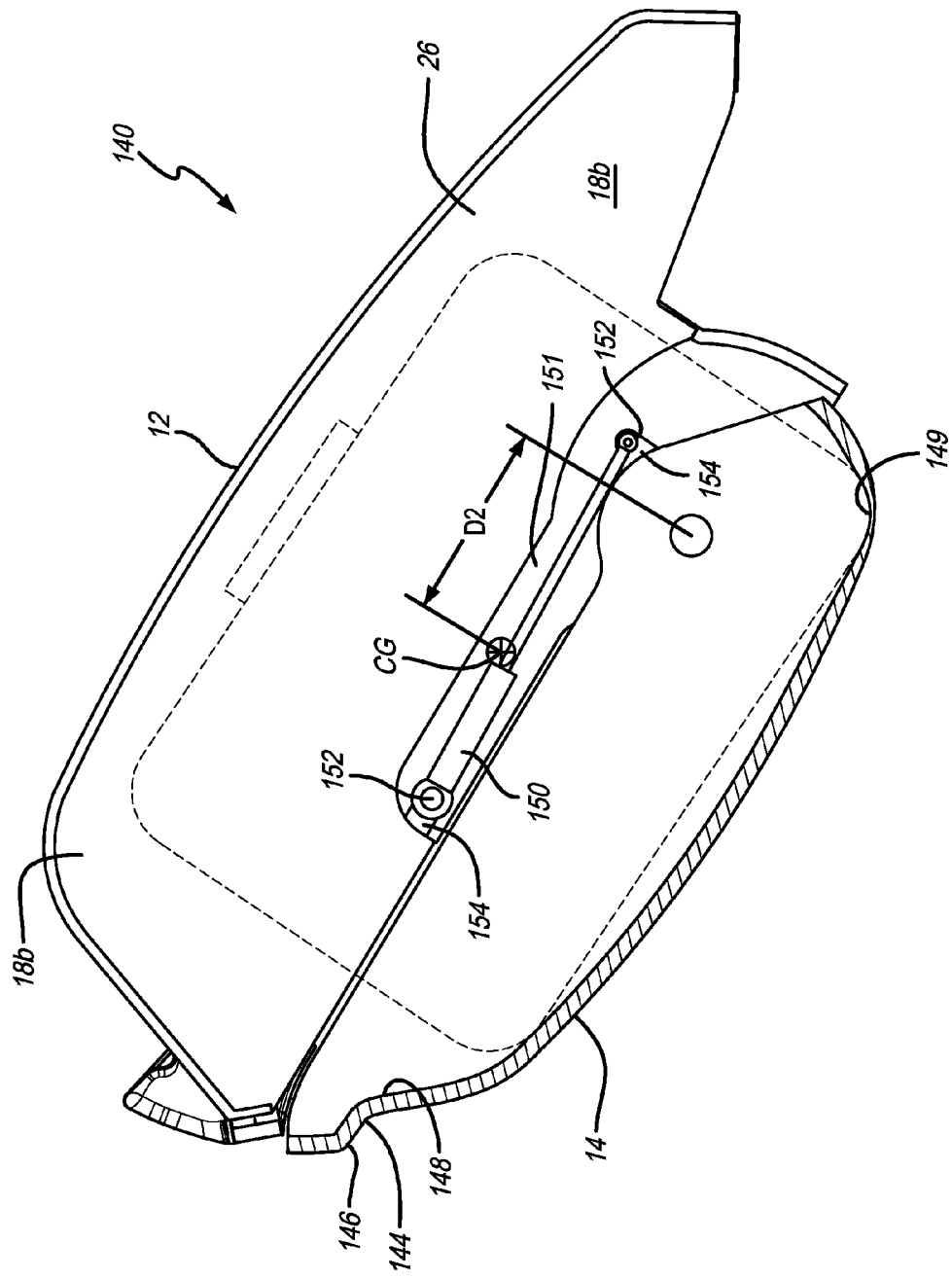
FIG. 25B is a side elevational view of the pivot bin assembly of FIG. 21 with the bucket in cross-section and in the closed position and the inner and outer plates removed.

In a preferred embodiment, as shown in FIGS. 25A-25B, the bucket 14 is also shaped such that the center of gravity CG of the luggage is positioned for easier closing of the bucket 14. When compared with the prior art pivot bins in most aircraft, the bucket 14 is shaped to position the luggage within the bucket so that the center of gravity of the luggage is closer to the pivot point. In a preferred embodiment, this is achieved by providing an integrated ramp 148 at the leading edge of the bucket 14 which ensures the proper position of the luggage (more outboard on a single aisle aircraft) during the start of the upward motion (where a user experiences the highest hand loads). As shown in FIG. 25A, preferably, the ramp 148 is essentially the inverse of the closing channel 144.

As shown in FIG. 25A-25B, in a preferred embodiment, a local "crush" of the bucket 14 or luggage indentation 149 is defined in the inner surface of the bucket to allow the luggage 11 to move or shift further outboard when the bucket 14 is closed. This movement can be seen in a comparison of FIGS. 25A and 25B, which show the distance from the center of gravity CG of the luggage 11 to the pivot point as D1 and D2, where D2 is shorter. The luggage indentation 149 is localized around the outboard lower corner of the luggage 11.

As discussed above, the damping and closing assist can be provided in a number of different ways. As shown in FIGS. 25A-25B, in a preferred embodiment of the present invention, the pivot bin assembly 140 includes a connector unit 150 that is connected at one end to the bucket 14 and at the other end to the upper housing 26 (preferably, one of the side walls 18). As shown in FIG. 25B, in a preferred embodiment, the connector unit 150 is positioned in a cut out 151 in the side 18b of the upper housing 26. The connector unit 150 generally can be used for either one or both of damping the opening of the bucket 14 or assisting with the closing of the bucket 14.

Figure 28:
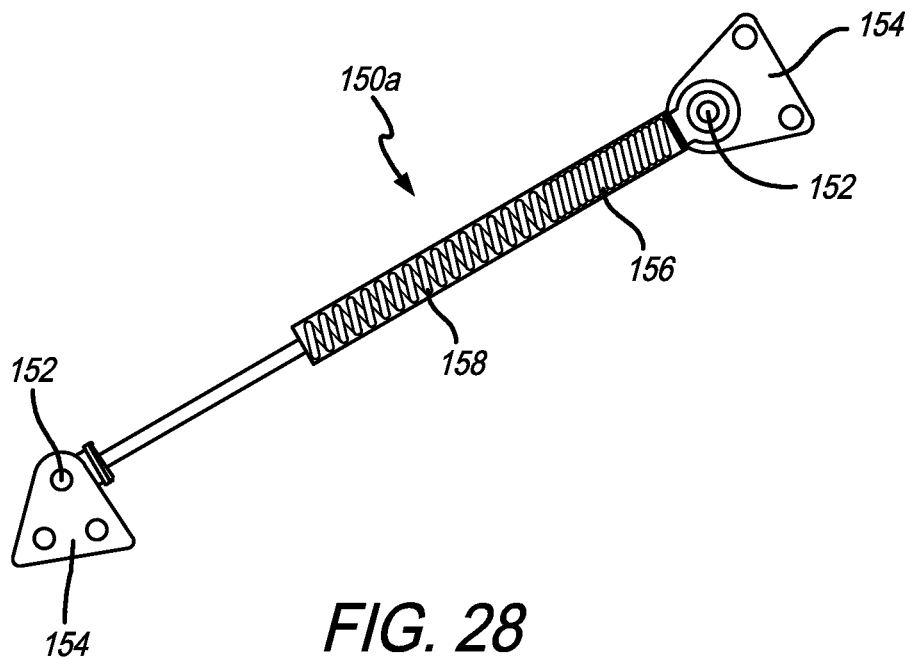
FIG. 28 is a side elevational schematic view of a connecting unit in accordance with a preferred embodiment of the present invention.
Figure 29:
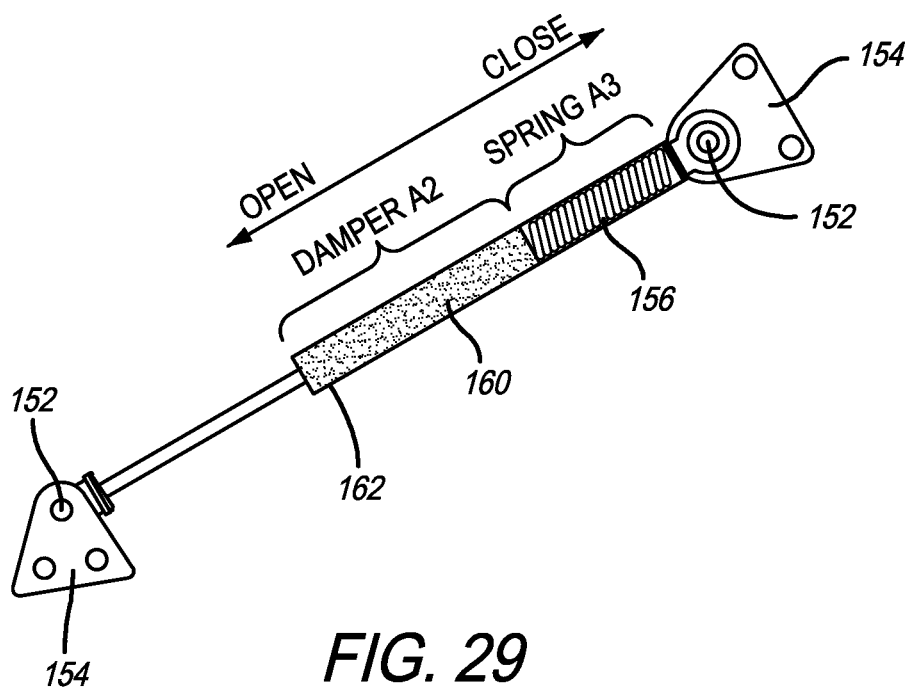
FIG. 29 is a side elevational schematic view of a connecting unit in accordance with another preferred embodiment of the present invention.

FIGS. 28-29 show schematic views of connector units 150a and 150b. Both connector units 150a and 150b include pivotal connections 152 (e.g. ball joints) at the opposite ends thereof that connect the unit to brackets 154 or the like that is located on the bucket 14 and the side wall 18 respectively. In use, the connecting units 150 pivot about pivotal connections 152 as necessary and lengthen or contract as necessary during opening or closing of the bucket 14. Connecting unit 150a includes two different springs 156 and 158 that are used to provide closing assist over two different portions of the closing arc A1. In another embodiment, a variable or two stage spring can be used to provide the same result. These two different portions may coincide with arcs A2 and A3 or they may not. In another embodiment, connecting unit 150a can also include damping capability. Connecting unit 150b includes closing assist over at least a portion of closing arc A1 and also provides damping during opening of the bucket 14. As shown in FIG. 29, in a preferred embodiment, spring assist is provided over closing during bucket travel along A3 and damping while opening over at least A2 (and preferably all of A1). Damping can be provided in any known way. In an exemplary embodiment, damping is provided by fluid 160 disposed within a cylinder 162, as shown in FIG. 29. Pneumatic or gas cylinders can also be used.

As will appreciated by those of ordinary skill in the art, closing of the bucket 14 is most difficult at the beginning of the process (e.g., A3, as shown in FIG. 24). Therefore, the connecting units 150 preferably provide a spring lift assist during at least this portion of the closing process.

It will be appreciated that connecting units 150 are provided on both sides of the bucket 14 and can be connected to the bucket 14 and upper housing 26 by any connection method or interface and preferably using brackets 154 with an opening therethrough or a stud extending therefrom.

Figure 30:
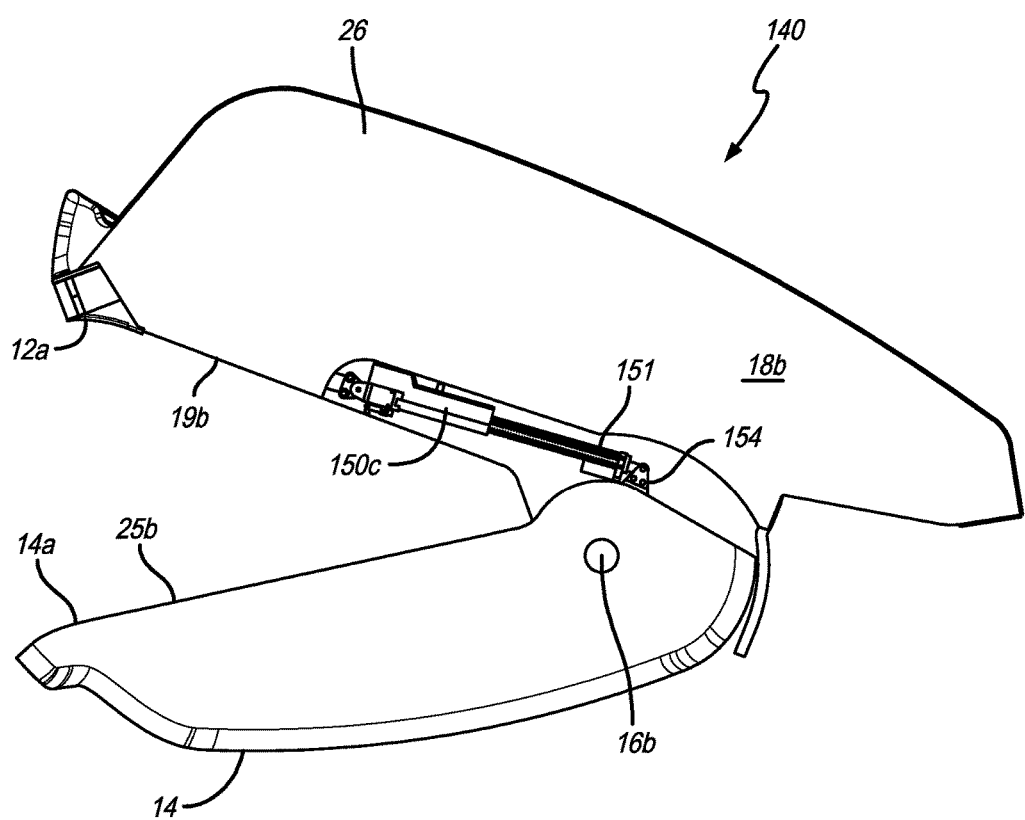
FIG. 30 is a side elevational view of the pivot bin assembly of FIG. 21 with the bucket in the open position and the inner and outer plates removed to show a connecting unit with powered lift assist.
Figure 31:
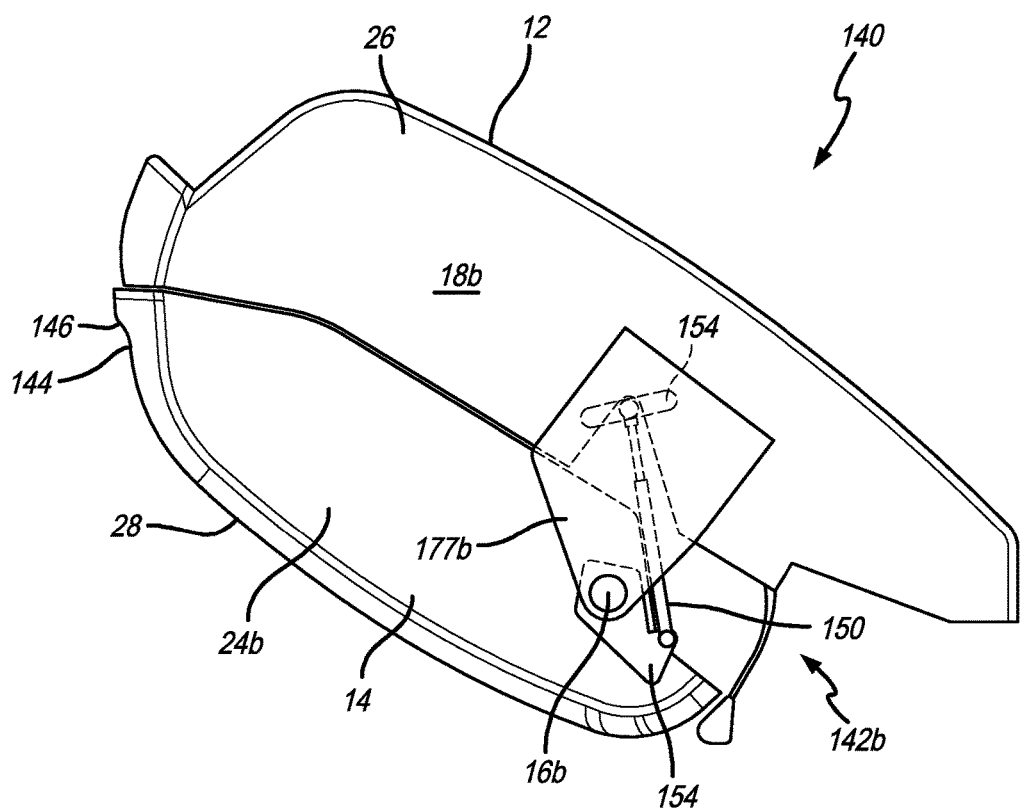
FIG. 31 is a side elevational view of a pivot bin assembly with the bucket in the closed position in accordance with another preferred embodiment of the present invention.
Figure 32:
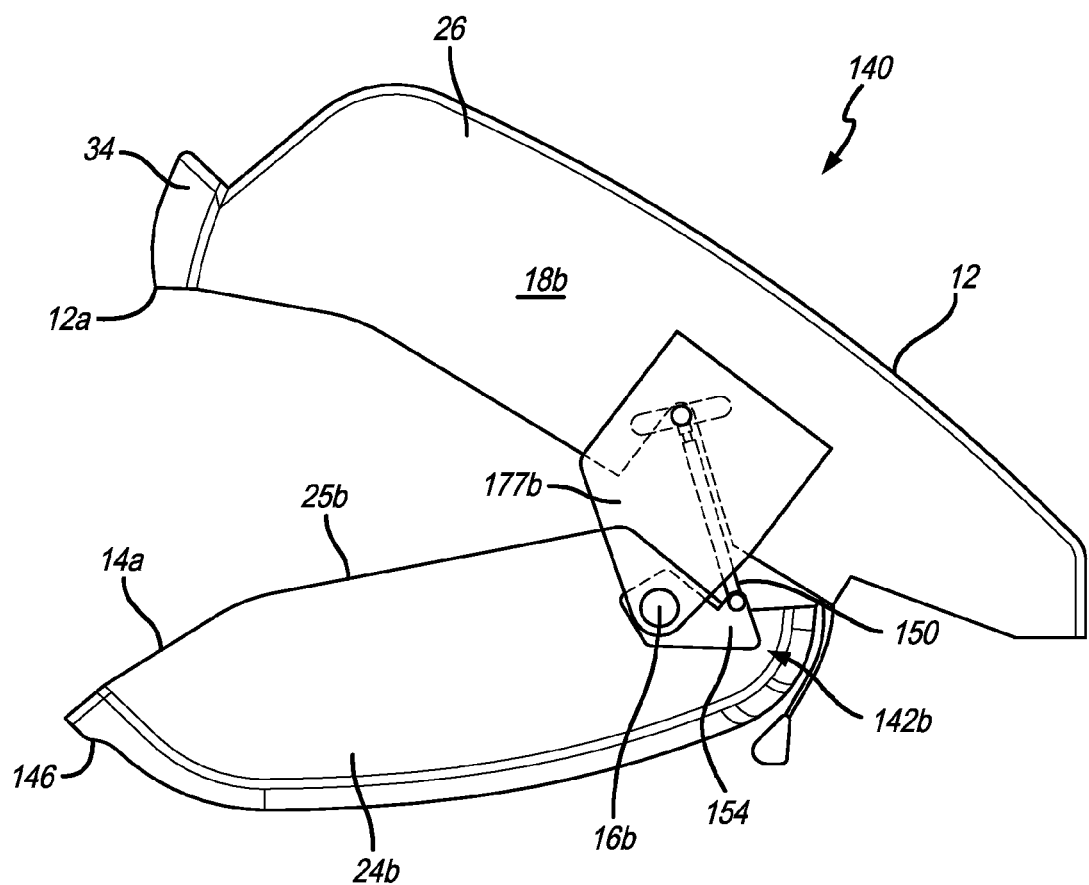
FIG. 32 is a side elevational view of the pivot bin assembly of FIG. 31 with the bucket in the open position.
Figure 33:
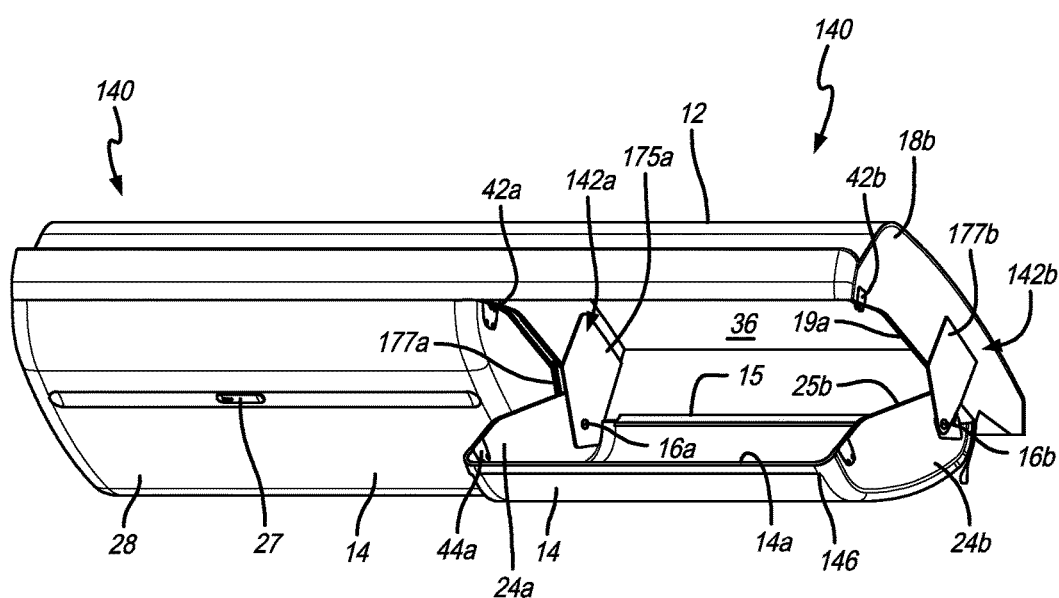
FIG. 33 is a perspective view of two pivot bin assemblies of FIG. 31 showing the first pivot bin assembly in an open position and the second pivot bin assembly in a closed position.
Figure 34:
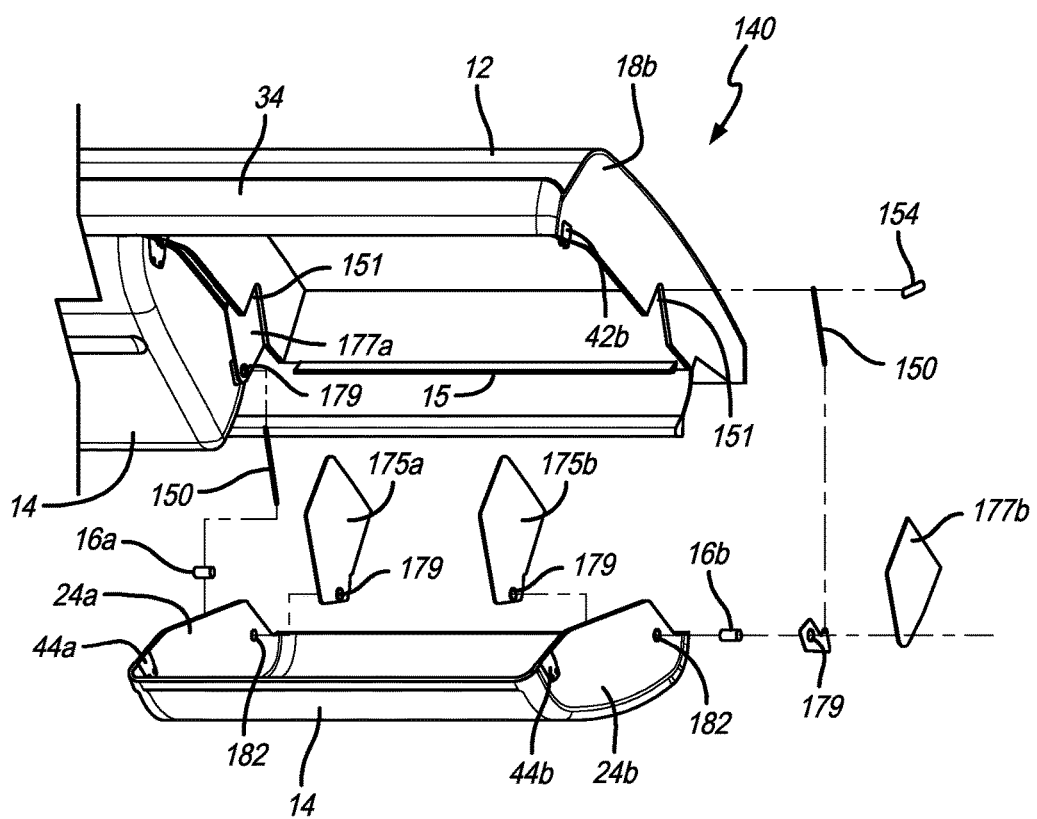
FIG. 34 is an exploded perspective view of the pivot bin assembly of FIG. 31.

In another preferred embodiment, as shown in FIG. 30, the pivot bin assembly 140 can include a powered lift assist connecting unit 150c, which provides powered lift assist over at least a portion of or the entire closing arc A1. Powered opening/damping can also be provided. Preferably, when powered lift assist is desired, a powered lift assist connecting unit 150c is used on one side of the bucket 14 and a connecting unit 150 with only damping capability is used on the other side of the bucket 14. In another embodiment, powered lift assist connecting units 150c can be used on both sides of the bucket 14. It will be appreciated that all of the connecting units 150a, 150b and 150c (and any connecting units 150 with only damping capability) are all interchangeable and use the same interface (e.g., brackets 154) to connect to the bucket 14 and upper housing 26. In an embodiment, the brackets 154 may have to be moved to accommodate the powered lift assist connecting unit 150c as opposed to the other connecting units 150. It will be appreciated that the powered lift assist connecting unit 150c is in electrical communication with the release button 27 of the associated bucket 14. In another embodiment, a separate button for closing can be provided.

FIG. 23D shows another embodiment that provides damping of the opening bucket and/or mechanical/spring assistance in closing the bucket 14. FIG. 23D is a cross-section that is taken at the same cut line as FIG. 23C in a pivot bin assembly with the embodiment now being described. As shown, the pivot assembly 142b includes a rotary damper 17 (as described above), and at least one assist spring 172. In a preferred embodiment, the assist spring 172 is a coil spring that is co-axial with pivot axle 16. In use, at least one end of the spring abuts a stop such that when the bucket 14 is opened passed a predetermined point (e.g., after A2), the spring 172 is preloaded. In the example shown in FIG. 24, spring 172 holds the empty bucket in the intermediate open position. Once a user pulls down or a bag of sufficient weight is placed on the bin, the bucket opens further and spring 172 is preloaded. This provides a user closing the bin with assistance. It will be appreciated that once the bucket 14 is loaded, the bucket 14 only moves between the open and closed positions. In this configuration it bypasses the intermediate open position as the weight of the luggage overcomes the spring force.

In another embodiment, the assist spring 172 can be a spiral spring or other type of spring. This embodiment can include the same benefits as those discussed above with respect to the various connecting units 150. For example, coil spring 172 can provide closing assist over a portion of the closing arc or over the entire closing arc or a variable/two stage spring or multiple springs can be used to provide differing amounts of closing force assistance over the closing arc. Furthermore, rotary damper 17 can provide damping during a portion or all of the opening arc. In a preferred embodiment of the present invention, the pivot bin assembly 140 includes any of the connecting units 150 discussed above and rotary dampers 17 with coil springs 172. For example, in this embodiment, closing assist can be provided during one portion of the closing arc by coil springs 172 and during another portion of the closing arc by spring 156 in connecting unit 150.

In summary, the pivot bin assembly 140 can include a) damping capability, b) damping capability and closing assist, c) damping capability and two or more stage closing assist, or d) damping capability and powered lift assist.

FIGS. 31-34 show another arrangement of the clevis assemblies 142a and 142b together with the cut out 151 in the side 18b of the upper housing 26 and the connecting unit 150. In this embodiment, inner plates 175a and 175b and outer plates 177a and 177b and cut outs 151 are shaped differently and connecting units 150 are oriented differently. Also, the pivot axles 16a and 16b extend through the lower brackets 154. However, this embodiment operates the same as that described above.

Generally, when a two stage opening bucket/bin is in use, when the latches are released, the damping capability of the pivot bin assembly 10 or 140 allows damped opening of the bucket 14 to an angle (the intermediate open position) that provides easy access for most luggage, even when empty. Furthermore, compared to the prior art, in the intermediate open position, the pivot bin assemblies 10 or 140 increase the headroom in the cabin when the buckets 14 are open and empty (in the intermediate open position). Next, once passenger luggage 11 is positioned on the lip of the bucket 14 or once a typical bag/luggage is in the bucket 14, the bucket 14 will drop to the open position in a controlled/damped manner. This allows for placement of all luggage sizes.

With reference to FIGS. 24-27, an example of an operation cycle of loading and unloading a two stage opening bucket or bin with luggage before and after a flight will now be described. As discussed above, all angles, weights, loads, dimensions, times, etc. used herein are exemplary. First, the release button 27 of an empty bucket 14 is pressed by a user. The bucket 14 opens 31° (A2) at a damped rate to the intermediate open position (see the bucket in dashed lines in FIG. 26). The springs (springs 156 in the connector assemblies and/or coil springs 172) are now ready to be engaged.

The user then places luggage 11 on the lip of the bucket 14 (or pulls down with their hand). The potential energy from the luggage 11 lowers the bucket 14 through an additional 11° (A3) to the open position, which displaces the springs 156, 158 and/or 172 on both sides of the bucket 14 and loads them with enough energy to create 13 ft-lbs of torque (for example). The user then slides their luggage fully into the bucket 14 (see FIG. 27). To accommodate more luggage, the users bag is preferably turned so that it rests on a side. In a preferred embodiment, the bucket 14 is damped while it is lowered.

Figure 27:
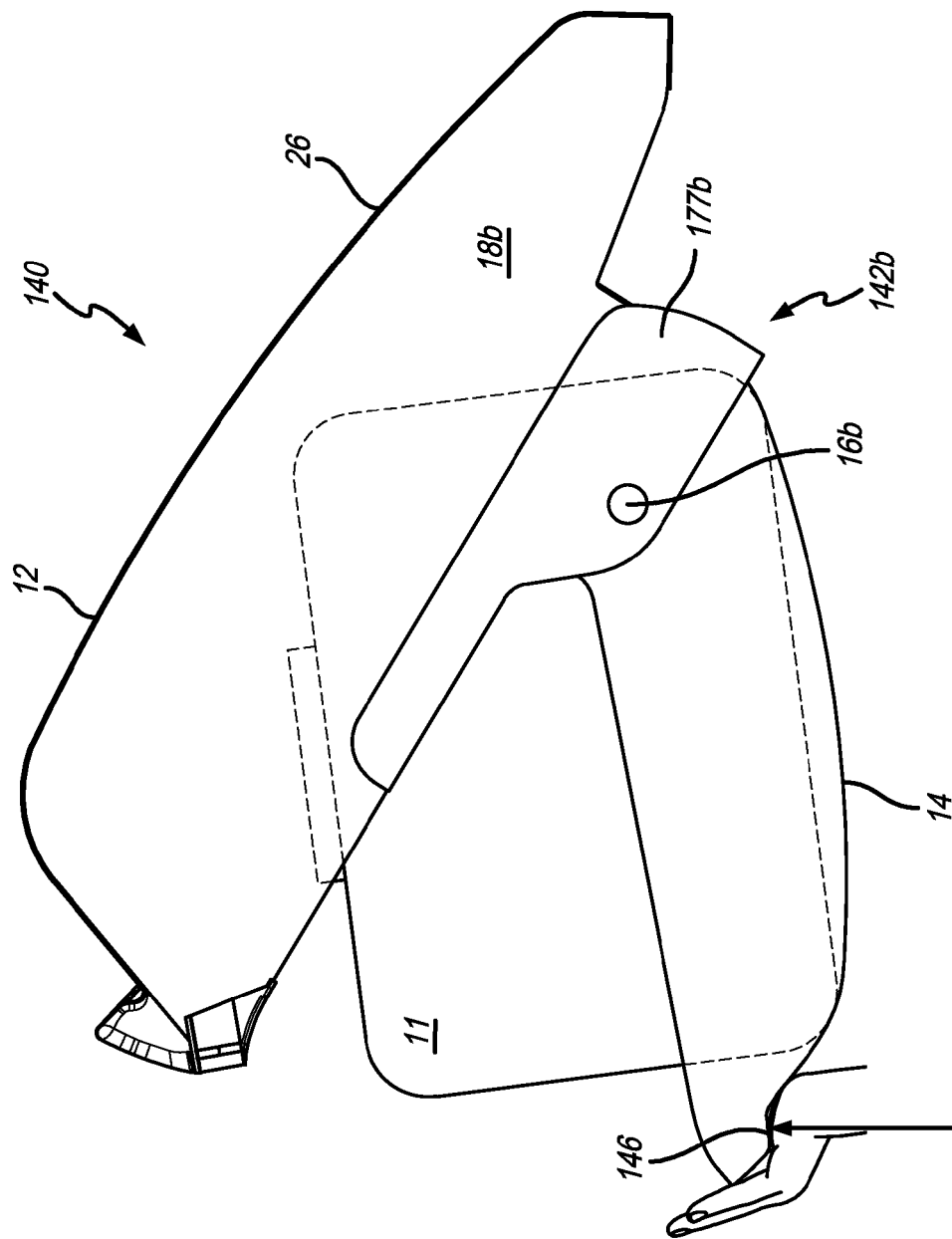
FIG. 27 is a side elevational view of the pivot bin assembly of FIG. 21 with the bucket in the open position.

Assuming other luggage has now been placed in the same bucket 14, in this scenario, the bucket 14 is now completely filled and the luggage weighs approximately 88 lbs in total. As shown in FIG. 27, a user now pushes approximately vertically on the closing surface 146 with approximately 27 lbs of force (see arrow F1). The springs 156 and/or 172 apply an assist load of 7 lbs over the first 11° of the bucket 14 closing arc (A3). The user then continues pushing the bucket 14 closed through the remaining 31° (A2). In the embodiment with a variable spring or with a second spring 158, assist can also be provided over some or all of the remainder of the closing arc. As can be seen in FIG. 27, F1 is approximately vertical. With the orientation of the bucket 14 shown in this embodiment, the closing surface 146 is configured such that it is parallel or close to parallel with the ground. This prompts a user to press up in the direction of F1, which makes closing the bucket easier than pushing elsewhere on the bucket or pushing on a surface that is at a steep angle compared to horizontal.

After the flight (or at any time during the flight), to open the bucket 14, the user presses the release button 27 and the fully loaded bucket 14 opens the full 42° (A1) to the open position at a damped rate. The user can then pull their luggage 11 from the fully opened bucket 14.

In an exemplary embodiment, the bucket 14 free falls from the closed to open position in 2.5±1 seconds while loaded with luggage anywhere between 0-80 lbs in weight. In the exemplary scenarios given herein the bucket 14 itself weighs approximately 10 lbs. This results in a combined weight range of 10-90 lbs (but could be higher). In an exemplary closing force scenario it is desired for the closing force (provided by the user) not to exceed 27 lbs. In order to achieve this, a closing assist force of approximately 7 lbs is provided over the first 11° (A3) of the bucket 14 closing motion. This equates to approximately 13 ft-lbs of torque at the pivot point.

Figure 26:
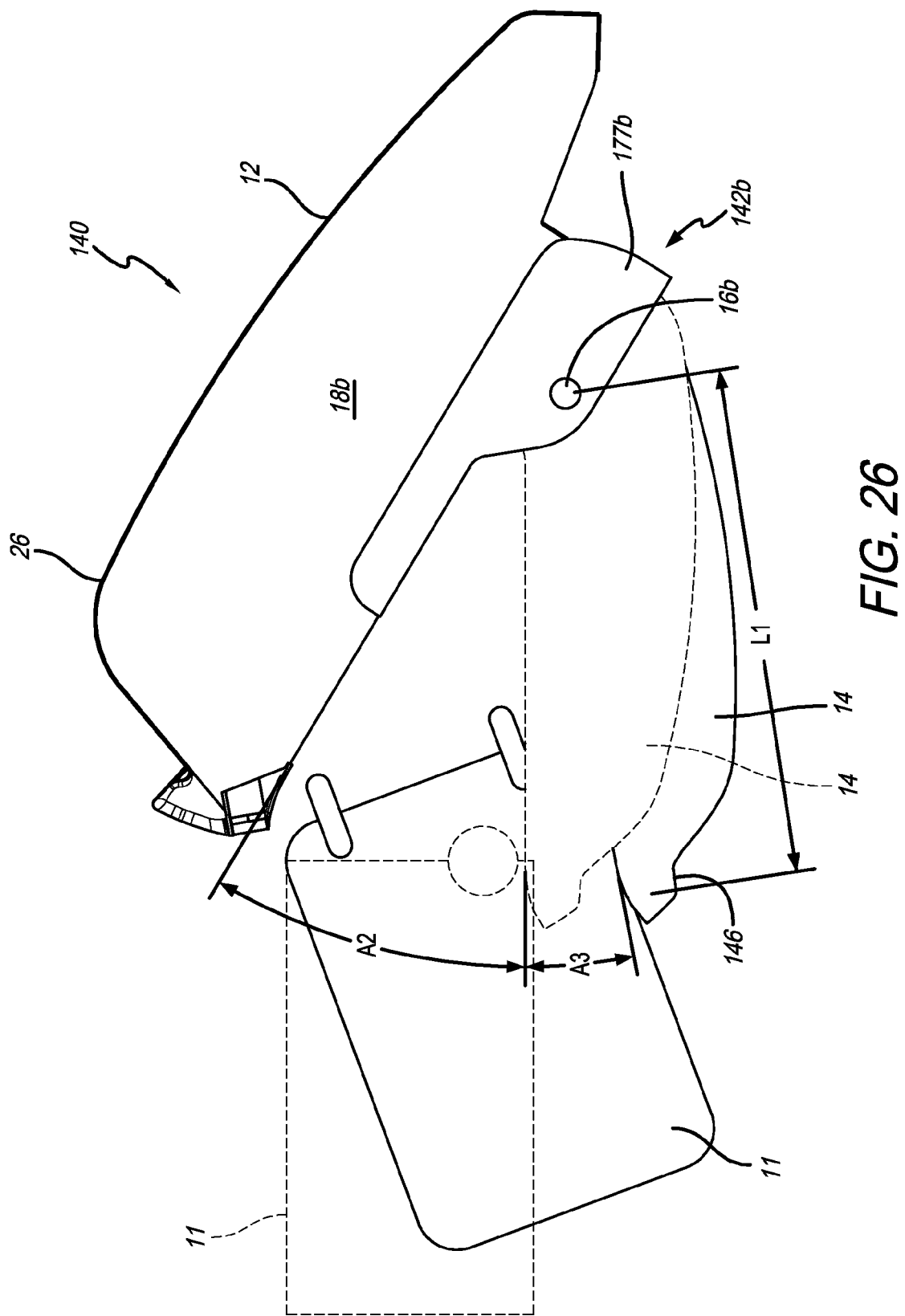
FIG. 26 is a side elevational view of the pivot bin assembly of FIG. 21 with the bucket shown in solid lines in the open position and the bucket shown in dashed lines in the intermediate open position.

As shown in FIG. 26, the two stage opening bucket also provides for two different orientations for placing standard luggage in the bin interior 36. In a preferred embodiment, A2 is dimensioned such that when the bucket 14 is in the intermediate open position, a bag can be placed in the bucket 14 on its top or bottom, as shown in dashed lines in FIG. 26 and A1 is dimensioned such that when the bucket 14 is in the open position, a bag can be placed in the bucket 14 on its side, as shown in solid lines in FIG. 26. In another example, when the bucket 14 is in the intermediate open position, a user can place their bag on the lip of the bucket 14 on its top or bottom, allow the weight of the bag to open the bin to the open position and then turn the bag on its side and slide it all the way into the bin interior 36. It will be appreciated that the two stage opening capability can be applied to other overhead bins, e.g., bins that open by translating or moving downwardly as opposed to pivoting open.

FIGS. 35-42 show another embodiment of a pivot bin assembly 200. Like numerals in FIGS. 35-42 refer to like components in FIGS. 1-34. In an exemplary embodiment, pivot bin assembly 200 can be used on smaller jets made by companies like Embraer where aisle space is desirable. However, this is not a limitation on the present invention, and the pivot bin assembly 200 can be used where desired.

Figure 35:
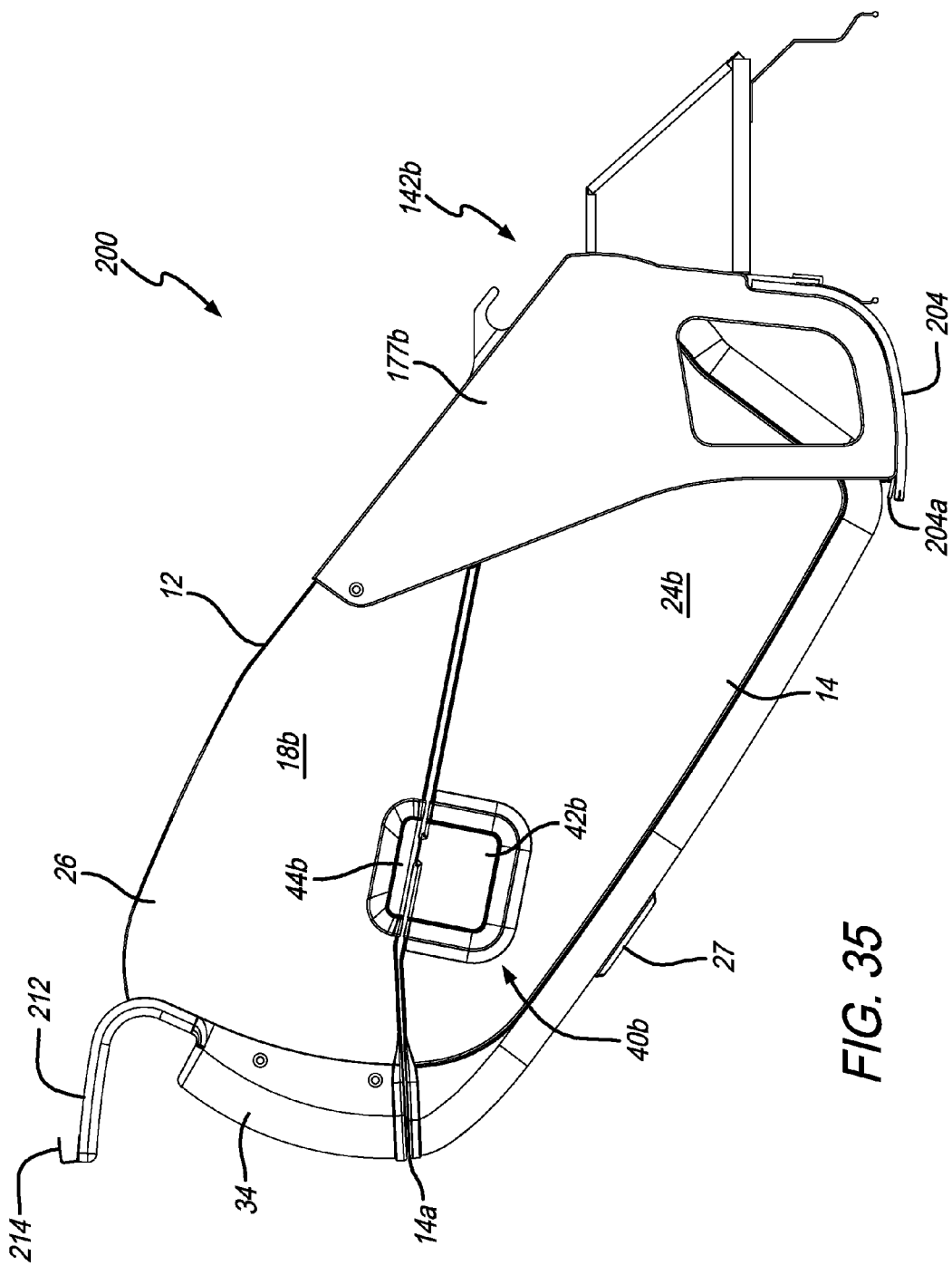
FIG. 35 is a side elevational view of a pivot bin assembly in the closed position in accordance with another preferred embodiment of the present invention.
Figure 36:
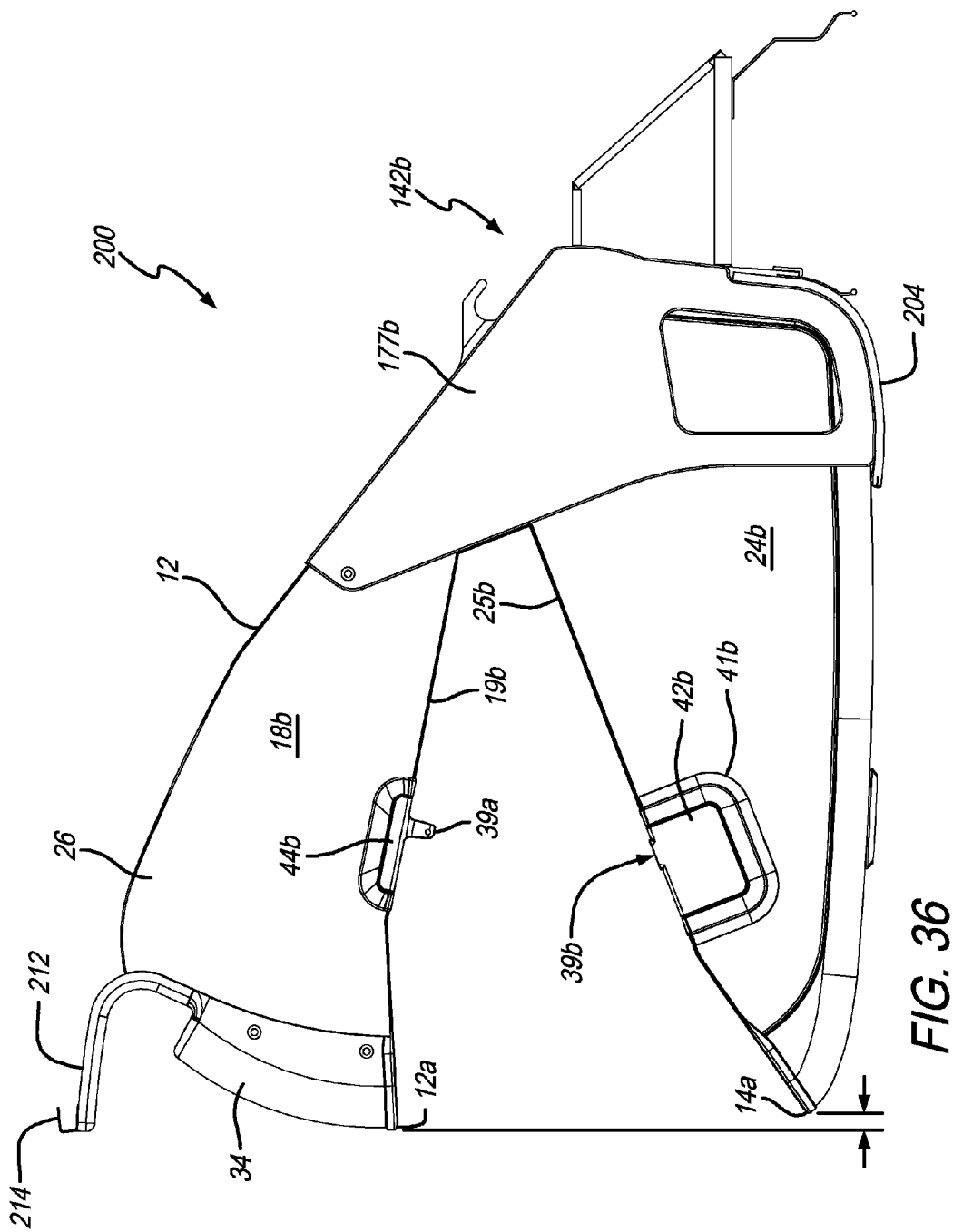
FIG. 36 is a side elevational view of the pivot bin assembly of FIG. 35 in the open position.
Figure 37:
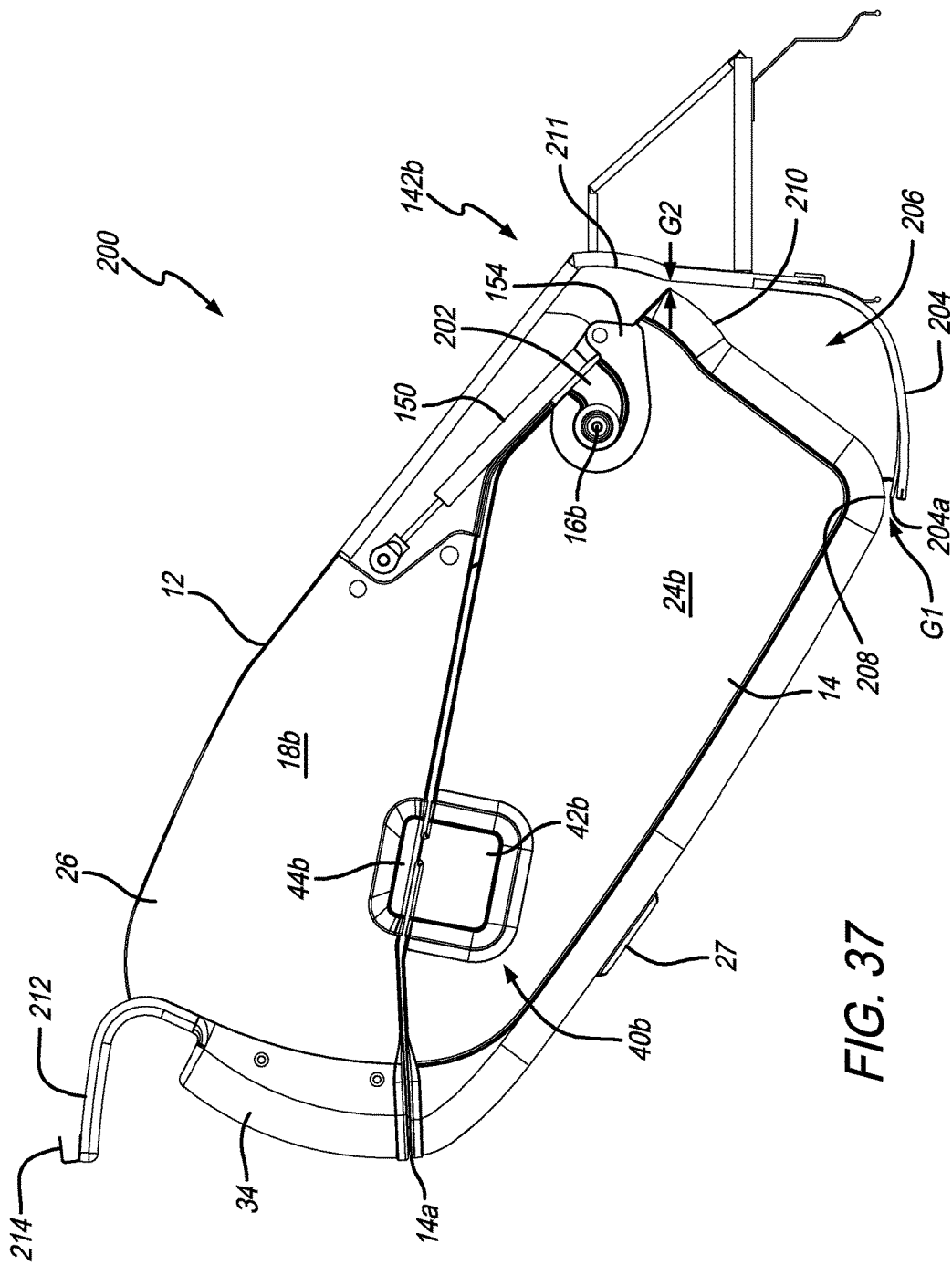
FIG. 37 is a side elevational view of the pivot bin assembly of FIG. 35 in the closed position with the outer clevis plate removed.
Figure 38:
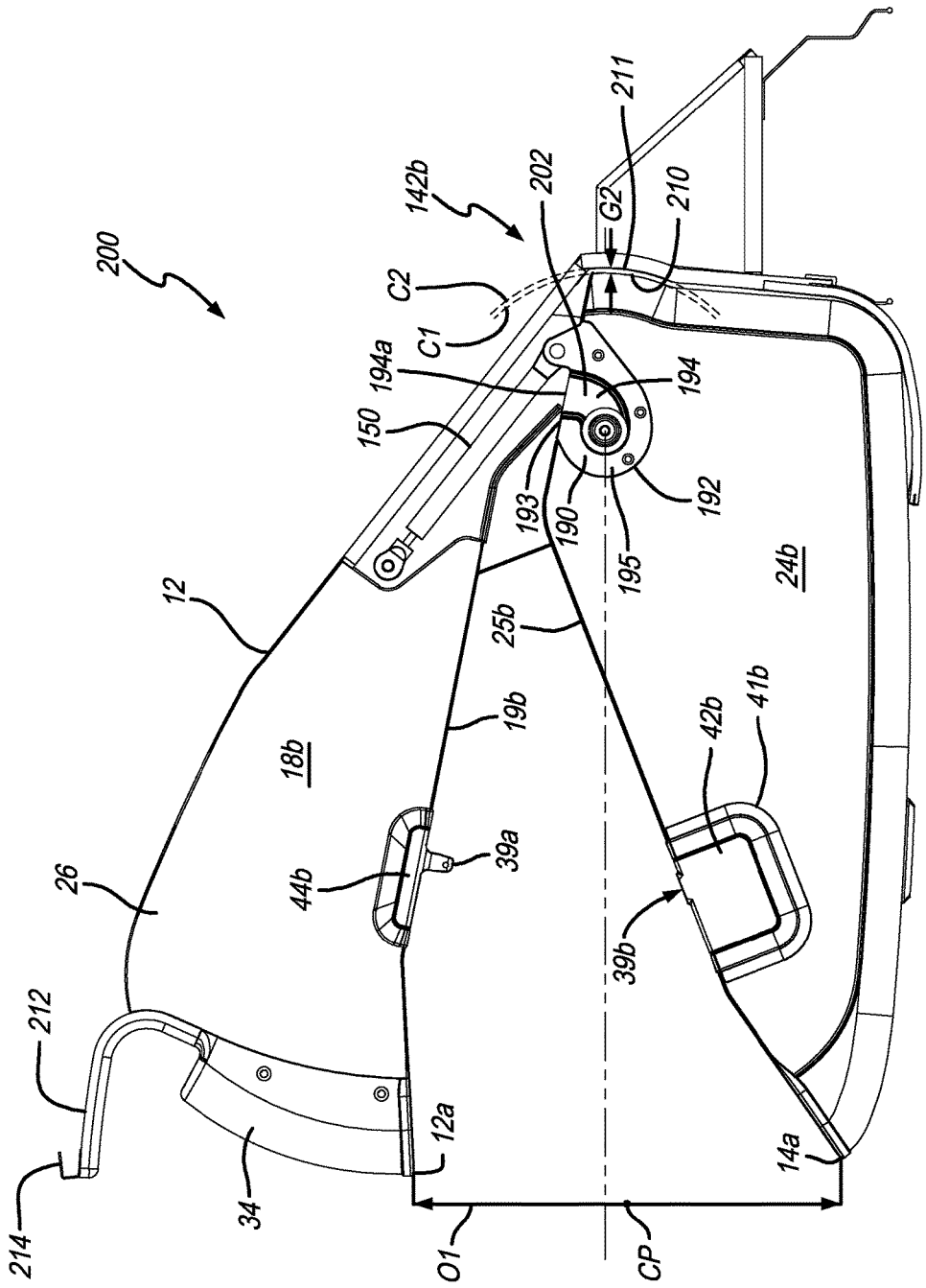
FIG. 38 is a side elevational view of the pivot bin assembly of FIG. 35 in the open position with the outer clevis plate removed.
Figure 40:
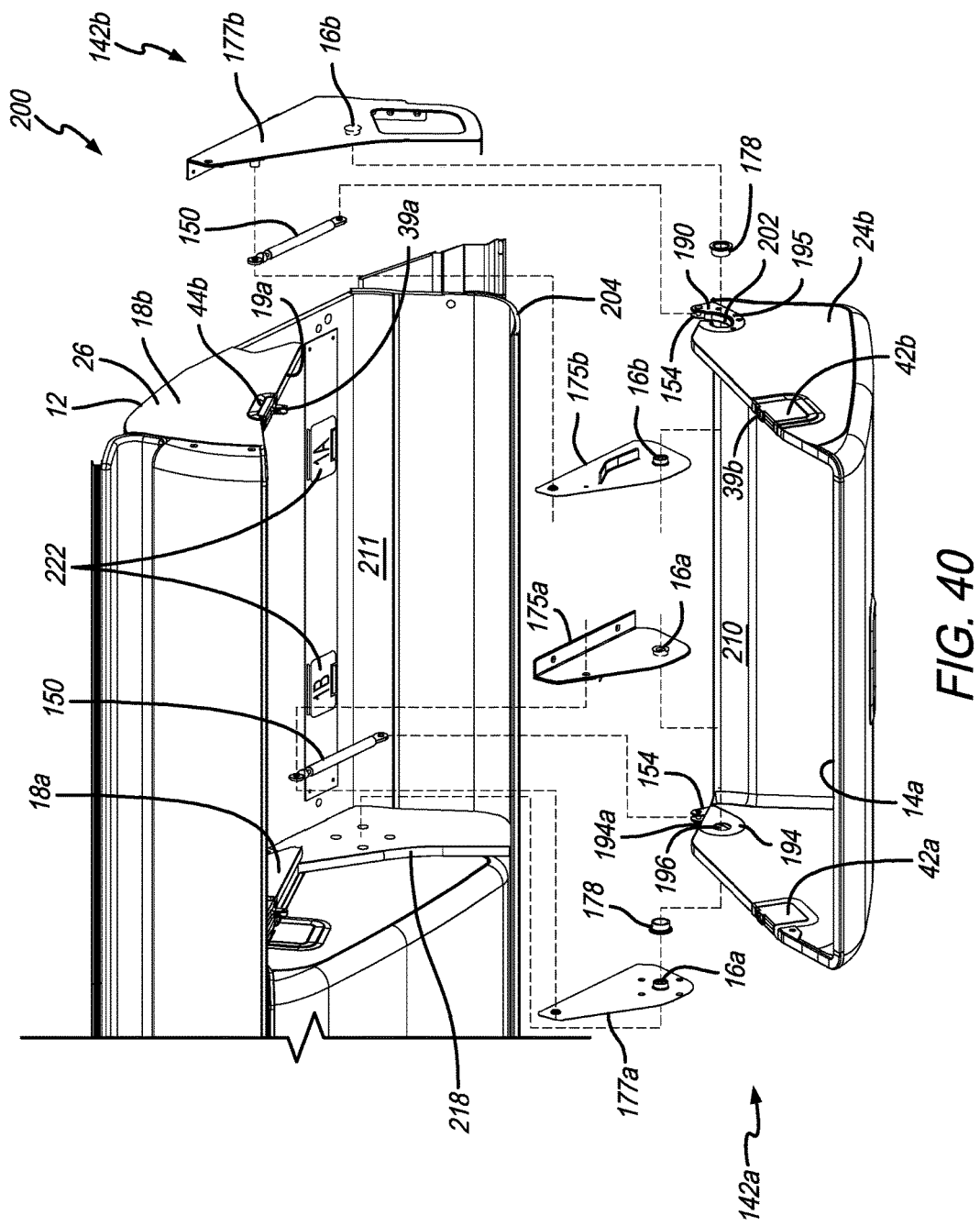
FIG. 40 is an exploded perspective view of the dual pivot bin assembly.

Generally, the pivot bin assembly 200 includes upper housing 26 that includes first and second side panels 18a and 18b, and bucket 14 pivotally connected to the upper housing 26 by first and second clevis assemblies 142a and 142b. FIGS. 35 and 37 show the bucket 14 in the closed position, but FIG. 37 has the outer plate 177b of the clevis assembly 142b omitted to show the components therebehind. FIGS. 36 and 38 show the bucket 14 in the open position, but FIG. 38 has the outer plate 177b of the clevis assembly 142b omitted to show the components therebehind. It will be appreciated from a review of the arrows shown in FIG. 36, that the geometry of the pivotal connection between the bucket 14 and the upper housing 26 causes the top edge or lip 14a of the bucket 14 to be positioned outboard (away from the center aisle) in the open position compared to when it is in the closed position. The geometry that provides the outboard pivoting is also shown in FIG. 38, which shows a vertical line that demonstrates the vertical opening distance of the bucket 14 between the open and closed positions (labeled O1), a horizontal line extending through the pivot point or pivot axis, and the center point CP of the vertical opening distance O1. As shown, the pivot point horizontal line extended is positioned vertically above the center point CP of the vertical opening distance O1. FIG. 38 also shows a bracket 190 that includes the slot 202 and is positioned in a recess 192 in the top edge 25b of the side wall 24b of the bucket 14. As shown in FIG. 40, the bracket 190 includes an upper surface 193, an inner wall 194 with a closed top 194a, an outer wall 195 and a pivot opening 196 defined therethrough.

Figure 41:
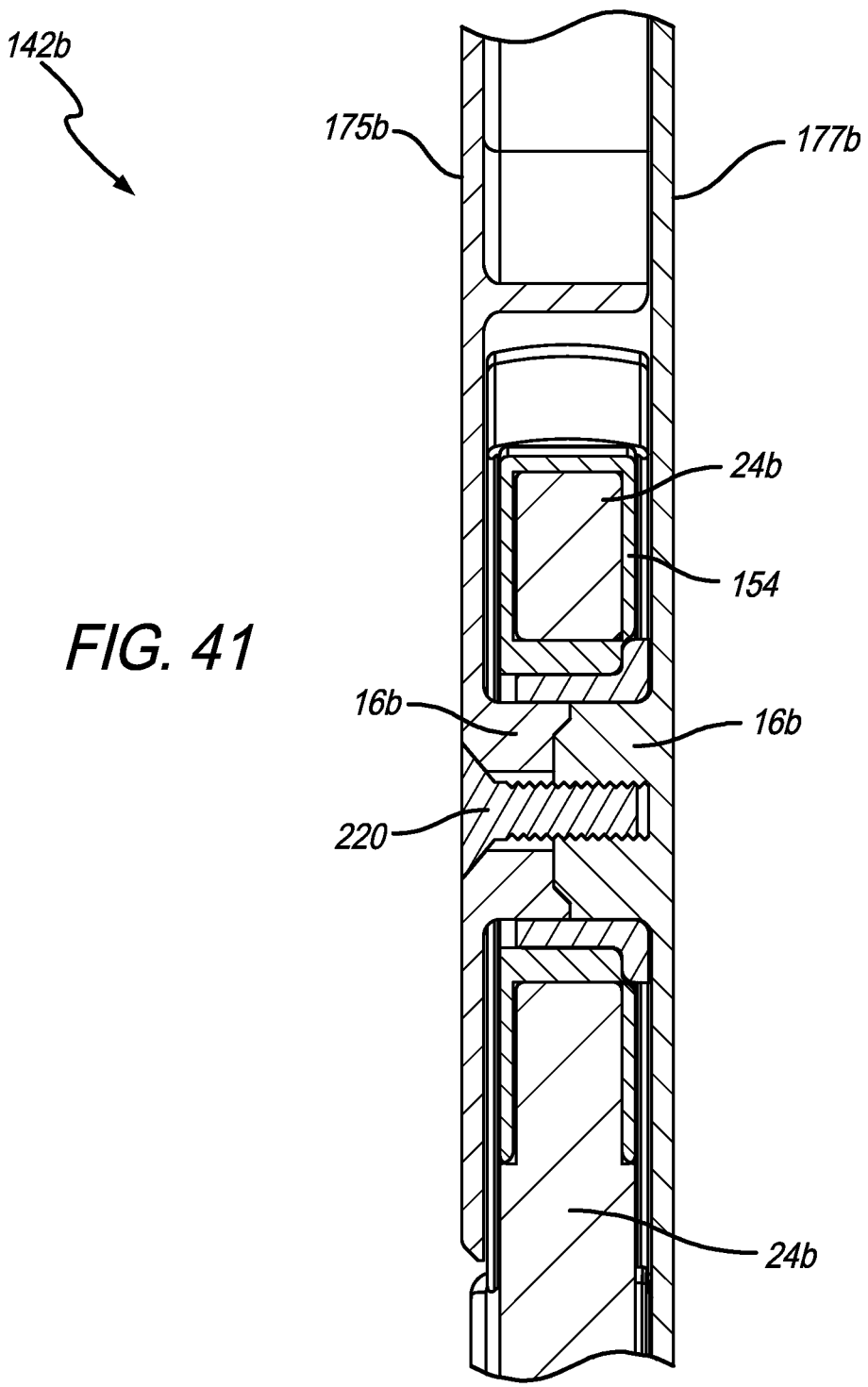
FIG. 41 is a cross-sectional view through the clevis assembly in accordance with a preferred embodiment of the invention.

Also, compare D3 and D4 in FIG. 41, which shows two pivot bin assemblies 200 on opposite sides of an aisle. D3 shows the distance between the front or inboard edges of the buckets 14 in the closed position and D4 shows the distance between the front or inboard edges of the buckets 14 in the open position. D3 is greater than D4. Described with respect to a single pivot bin assembly 200, the horizontal distance D5 between a vertical line that extends through the pivot point and the front edge of the bucket in the closed position is greater than the horizontal distance D6 between the vertical line that extends through the pivot point and the front edge of the bucket in the open position.

As shown in FIG. 37, in a preferred embodiment, the bucket 14 includes a curved raceway or slot 202 defined in the side panel 18b (and in side panel 18a) that receives the pivot mechanism 16b and a bushing 178. This provides the ability to disconnect bucket 14 from the upper housing 26 with minimal disassembly. In a preferred embodiment, the upper housing 26 includes an extension member 204 that extends downwardly and inwardly therefrom. When the bucket 14 is in the closed position, the extension member 204, defines an opening space 206 that receives a portion of the bucket 14 when the bucket 14 is pivoted to the open position, as shown in FIG. 38. The extension member 204 also includes a front edge 204a that defines a gap G1 with a bottom corner 208 of the bucket 14. In use, gap G1 is sized to prevent users from placing fingers or other objects between the extension member 204 and the bucket 14. This embodiment also shows the parts of the latch assemblies 40a and 40b reversed compared to the previously described embodiments. As shown in FIGS. 35-40, the second striker portion 44b is positioned on the top with the striker 39a extending downwardly from the bottom edge 19a of the side panel 18b, and the second hook portion 42b is positioned on the bottom and within recess 41b. The striker 39a is received in an opening 39b and the hook in the As shown in FIGS. 37-38, in a preferred embodiment, gap control is provided between the upper rear edge of the bucket 14 and the inner surface of the back 12 of the upper housing 26. In use, a gap G2 is provided and sized to prevent users from placing fingers or other objects (luggage, coats, etc.) between the upper rear edge of the bucket 14 and the inner surface of the back 12 of the upper housing 26. In a preferred embodiment, the rear portion of the bucket 14 includes a bulge portion 210. The bulge portion 210 has an outer surface that is shaped to define a circle C1 having the pivot point as its center. The back 12 of the upper housing 26 includes an indented portion 211 adjacent to and spaced from the bulge portion 210. The indented portion 211 has an inner surface that is shaped to define a circle C2 having the pivot point as its center. The radius of C2 is larger than the radius of C1. The bulge portion 210 and the indented portion 211 work together to provide a generally constant clearance or gap G2 between the upper rear portion of the bucket 14 and the inner surface of the upper housing 26. As shown in FIGS. 37-38, the remainder of the rear portion of the bucket is not curved like the bulge portion 210 and neither is the portion of the upper housing 26 below the indented portion 211.

Figure 39:
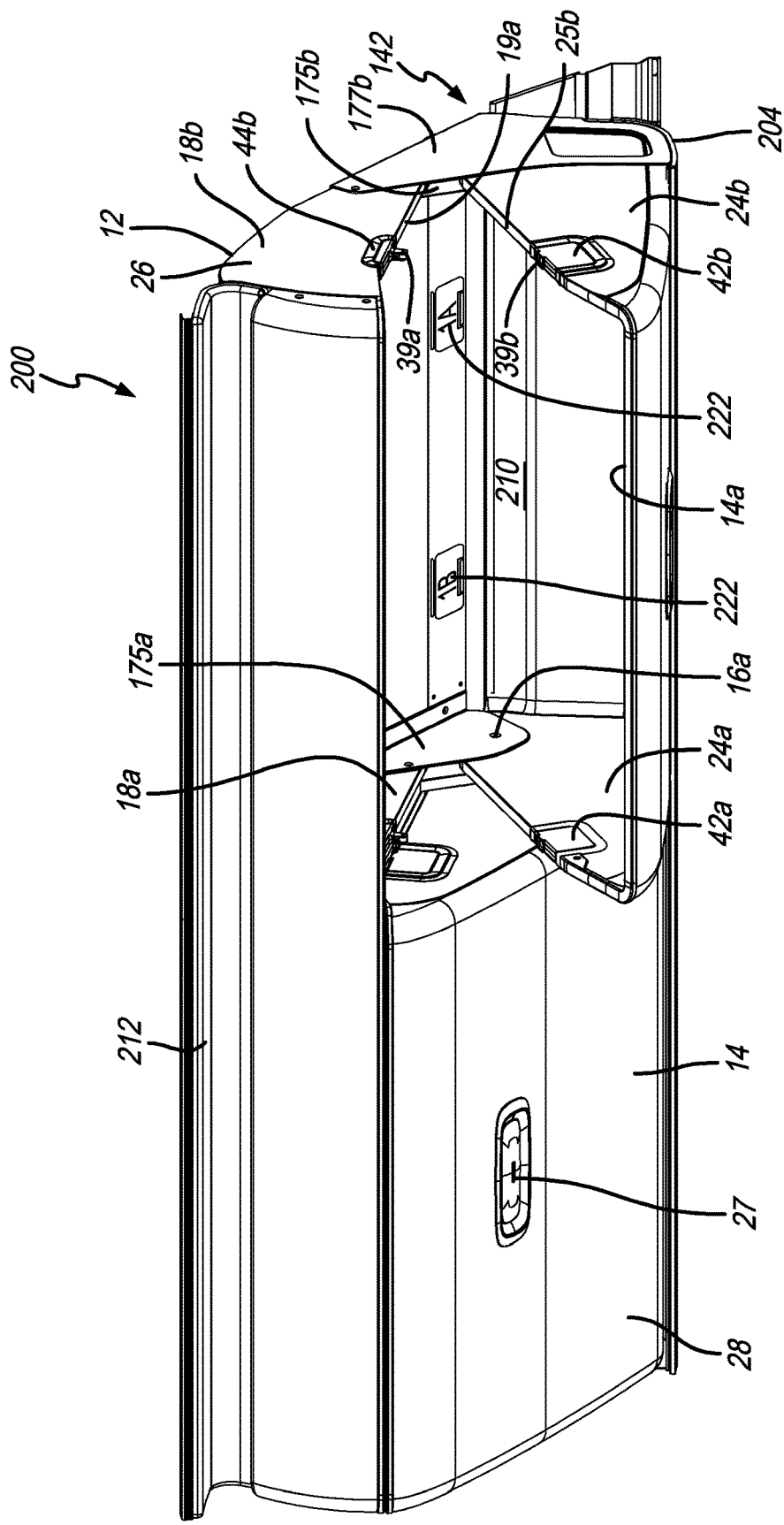
FIG. 39 is a perspective view of a dual pivot bin assembly of FIG. 35.

As shown in FIG. 39, in a preferred embodiment, the pivot bin assembly 200 includes seat indicia 222 that specify the portion of the bin interior that is designated for a particular passenger. For example, as shown in FIG. 39, the seat indicia 222 includes 1A and 1B, thereby specifying that the portion of the bin interior adjacent thereto is designated for the passengers seated in seats 1A and 1B, respectively.

Figure 42:
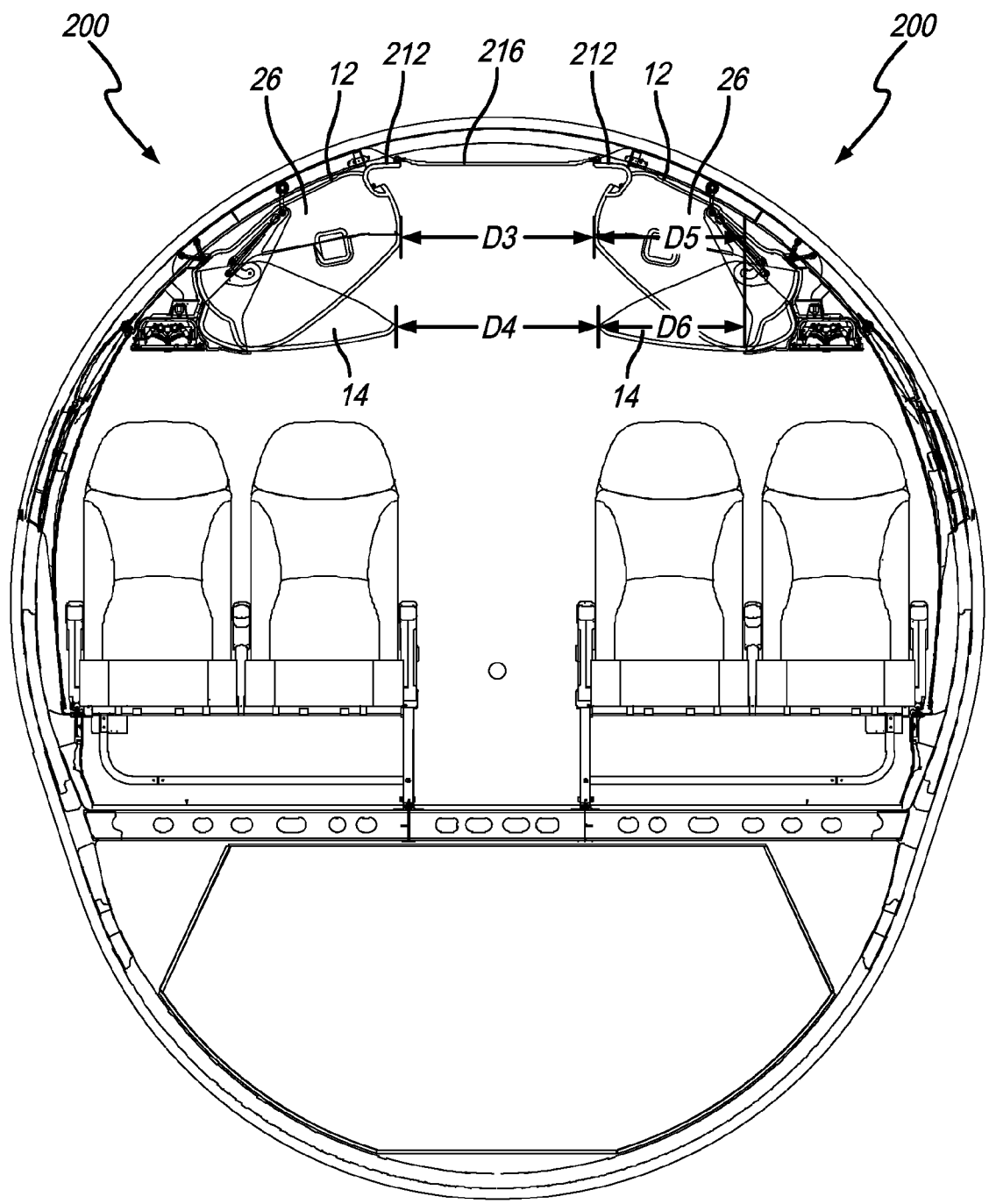
FIG. 42 is an elevational view of the interior of an aircraft with the pivot bin assemblies of FIG. 35 on both sides and showing the buckets in the open and closed positions.

In a preferred embodiment, the pivot bin assembly 200 includes a top closeout member 212 extending upwardly and outwardly from the upper housing 26. As shown in FIG. 42, when the pivot bin assembly 200 is installed in an aircraft, the top closeout member 212 spans the space between upper housing 26 and the ceiling of the aircraft. Preferably, the top closeout member 212 includes a bracket 214 for connection to the ceiling. As shown in FIG. 42, in a preferred embodiment, a single ceiling panel 216 extends between the brackets 214 on opposite sides of the aisle.

As shown in FIG. 40, in an embodiment where two pivot bin assemblies 200 are part of a dual pivot bin assembly, a center side panel 218 is included. Preferably, outer plate 177a is connected to the center side panel 218, as depicted by the dashed lines in FIG. 41. Outer plate 177b of the adjacent pivot bin assembly 200 (the one shown in the closed position in FIG. 41) is attached to the opposite side of the center side panel 218. In another embodiment, the center side panel 218 is the outer plate 177a and/or 177b of the clevis. senger. For example, FIG. 40

As shown in FIG. 41, in a preferred embodiment, the clevis assembly includes a pivot mechanism or pivot axle 16b that is comprised of two halves or protrusions that extend from the inner and out plates 175b and 177b, that are secured together with a threaded fastener 220 or the like and are received in a bushing 178, which is received in the slot 202 and opening 202a in the side 24b of the bucket 14. This explanation applies for clevis assembly 142a as well. However, this is not a limitation and the clevis assembly and/or pivot axle can be any described herein.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

The teachings of the disclosure provided herein can be applied to other systems, not necessarily the system described above. The elements and acts of the various embodiments described above can be combined to provide further embodiments. Any measurements or dimensions described or used herein are merely exemplary and not a limitation on the present invention. Other measurements or dimensions are within the scope of the invention.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will include the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A bucket for use with an aircraft storage bin, the bucket comprising:
   a bottom and first and second opposing side walls extending upwardly from the bottom, wherein the first and second side walls each include a top edge, wherein the first side wall includes a first bracket that is received in a first recess defined in the top edge of the first side wall, wherein the first bracket includes an upper surface, an inner wall and an outer wall, wherein the inner wall has a closed top, wherein a first slot extends downwardly from the upper surface and is defined in the outer wall, wherein the first bracket includes a first opening defined transversely through the inner and outer walls, wherein the second side wall includes a second bracket that is received in a second recess defined in the top edge of the second side wall, wherein the second bracket includes an upper surface, an inner wall and an outer wall, wherein the inner wall has a closed top, wherein a second slot extends downwardly from the upper surface and is defined in the outer wall, wherein the second bracket includes a second opening defined transversely through the inner and outer walls, wherein the first slot is configured to receive a first pivot axle therein, and wherein the second slot is configured to receive a second pivot axle therein.

2. The bucket of claim 1 wherein the first bracket includes at least one connection member extending upwardly therefrom, and wherein the second bracket includes at least one connection member extending upwardly therefrom.

3. The bucket of claim 2 wherein the connection members each include an opening defined transversely therethrough.

4. The bucket of claim 3 wherein the first bracket includes two spaced apart connection members extending upwardly therefrom, and wherein the second bracket includes two spaced apart connection members extending upwardly therefrom.

5. The bucket of claim 1 further comprising a first hook portion or a first striker portion secured to the first side wall, and a second hook portion or a second striker portion secured to the second side wall.

6. The bucket of claim 1 further comprising a first hook portion secured to the first side wall, and a second hook portion secured to the second side wall.

7. The bucket of claim 6 wherein the hook portion includes a housing having an opening therein that faces upwardly and is configured to receive a striker.

8. An aircraft storage bin comprising:
   an upper housing, and
   a bucket pivotally connected to the upper housing that cooperates with the upper housing to define a bin interior, wherein the bucket includes a bottom and first and second opposing side walls extending upwardly from the bottom, wherein the first and second side walls each include a top edge, wherein the first side wall includes a first bracket that is received in a first recess defined in the top edge of the first side wall, wherein the first bracket includes an upper surface, an inner wall and an outer wall, wherein the inner wall has a closed top, wherein a first slot extends downwardly from the upper surface and is defined in the outer wall, wherein the first bracket includes a first opening defined transversely through the inner and outer walls, wherein the second side wall includes a second bracket that is received in a second recess defined in the top edge of the second side wall, wherein the second bracket includes an upper surface, an inner wall and an outer wall, wherein the inner wall has a closed top, wherein a second slot extends downwardly from the upper surface and is defined in the outer wall, wherein the second bracket includes a second opening defined transversely through the inner and outer walls, wherein the first slot receives a first pivot axle therein, wherein the second slot receives a second pivot axle therein, and wherein the bucket pivots about a pivot axis with respect to the upper housing between an open position and a closed position.

9. The aircraft storage bin of claim 8 wherein the first bracket includes at least one connection member extending upwardly therefrom, and wherein the second bracket includes at least one connection member extending upwardly therefrom.

10. The aircraft storage bin of claim 9 wherein a first connecting unit extends between the connection member of the first bracket and the first side panel of the upper housing, and wherein a second connecting unit extends between the connection member of the second bracket and the second side panel of the upper housing.

11. The aircraft storage bin of claim 10 wherein the first bracket includes two spaced apart connection members extending upwardly therefrom, wherein an end of the first connecting unit is secured between the two connection members, wherein the second bracket includes two spaced apart connection members extending upwardly therefrom, and wherein an end of the second connecting unit is secured between the two connection members.

12. The aircraft storage bin of claim 8 further comprising first and second latch assemblies, wherein the first latch assembly includes a first hook portions and a first striker portions, wherein one of the first hook portion and the first striker portion extends downwardly from a bottom edge of the first side panel or upwardly from the first side wall of the bucket, and the other of the first hook portion and the first striker portion is positioned in a first recess defined in the first side wall of the bucket or the first side panel, and wherein the second latch assembly includes a second hook portion and a second striker portion, wherein one of the second hook portion and the second striker portion extends downwardly from a bottom edge of the first side panel or upwardly from the second side wall of the bucket and the other of the second hook portion and the second striker portion is positioned in a second recess defined in the first side wall of the bucket or the first side panel.

* * * * *